(12) United States Patent
Kuwata et al.

(10) Patent No.: US 9,237,268 B2
(45) Date of Patent: *Jan. 12, 2016

(54) INFORMATION PROCESSING SYSTEM, INFORMATION PROCESSING APPARATUS AND METHOD

(71) Applicant: Sony Corporation, Tokyo (JP)

(72) Inventors: Masayuki Kuwata, Tokyo (JP); Shuji Okegawa, Chiba (JP); Yuji Matsui, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,240

(22) Filed: Aug. 7, 2013

(65) Prior Publication Data
US 2013/0321665 A1 Dec. 5, 2013

Related U.S. Application Data

(63) Continuation of application No. 12/909,894, filed on Oct. 22, 2010, now Pat. No. 8,522,295, which is a continuation of application No. 10/399,804, filed on Aug. 26, 2003, now Pat. No. 7,836,477, which is a continuation of application No. PCT/JP02/08314, filed on Aug. 16, 2002.

(30) Foreign Application Priority Data

Aug. 21, 2001 (JP) ................................. 2001-250476
Aug. 16, 2002 (WO) ........................ PCT/JP02/08314

(51) Int. Cl.
*H04N 5/232* (2006.01)
*H04N 1/00* (2006.01)
(Continued)

(52) U.S. Cl.
CPC ....... *H04N 5/23206* (2013.01); *H04N 1/00209* (2013.01); *H04N 1/00222* (2013.01);
(Continued)

(58) Field of Classification Search
CPC . H04N 5/23206; H04N 5/23293; H04N 5/76; H04N 1/00209; H04N 1/00222; H04N 1/00233; H04N 1/00244; H04N 1/32177
USPC ................ 725/105; 348/207.1, 211.99–211.5
See application file for complete search history.

(56) References Cited

U.S. PATENT DOCUMENTS 5,784,461 A 7/1998 Shaffer et al.
6,003,082 A 12/1999 Gampper et al.
(Continued)

FOREIGN PATENT DOCUMENTS

EP 0 614 308 9/1994
EP 0 930 757 7/1999
(Continued)

OTHER PUBLICATIONS

Patent Abstracts of Japan, vol. 2000, No. 15, Apr. 6, 2001 & JP 2000 341644 A (Canon Inc), Dec. 8, 2000.
(Continued)

*Primary Examiner* — Daniel M Pasiewicz
(74) *Attorney, Agent, or Firm* — Frommer Lawrence & Haug LLP; William S. Frommer; Ellen Marcie Emas

(57) ABSTRACT

The present invention relates to an information processing apparatus by which image data can be downloaded simply. A video camera 11 receives thumbnail images corresponding to one or more images included in an album from a video camera image station 41 and displays the thumbnail images on an LCD unit. If one or more images to be downloaded are selected, then the video camera 11 acquires image information of the selected image or images from a video camera image station 41, analyzes the image information and discriminates it one by one image whether or not the selected image data are downloadable. Every time one image is discriminated to be downloadable, the video camera 11 accesses a corresponding URL designated for each image, downloads the image from the URL and records the image onto a recording medium. The video camera 11 successively downloads the selected images in this manner.

23 Claims, 36 Drawing Sheets

(51) Int. Cl.
*H04N 1/32* (2006.01)
*H04N 1/327* (2006.01)
*H04N 5/76* (2006.01)
*G06F 17/30* (2006.01)
*H04N 101/00* (2006.01)

(52) U.S. Cl.
CPC ....... *H04N1/00233* (2013.01); *H04N 1/00244* (2013.01); *H04N 1/00347* (2013.01); *H04N 1/32117* (2013.01); *H04N 1/32561* (2013.01); *H04N 1/32771* (2013.01); *H04N 1/32776* (2013.01); *H04N 5/23293* (2013.01); *H04N 5/76* (2013.01); *G06F 17/30884* (2013.01); *H04N 2101/00* (2013.01); *H04N 2201/0084* (2013.01); *H04N 2201/0087* (2013.01); *H04N 2201/3205* (2013.01); *H04N 2201/325* (2013.01)

(56) References Cited

U.S. PATENT DOCUMENTS

| | | |
|---|---|---|
| 6,567,983 B1 | 5/2003 | Shiimori |
| 6,701,058 B1 | 3/2004 | Tsubaki |
| 7,034,880 B1 | 4/2006 | Endsley et al. |
| 7,075,573 B2 | 7/2006 | Imaeda |
| 7,197,531 B2 | 3/2007 | Anderson |
| 7,327,387 B2 | 2/2008 | Tanaka et al. |
| 7,568,221 B2 | 7/2009 | Matsui et al. |
| 7,664,342 B2 | 2/2010 | Kuwata et al. |
| 7,836,477 B2 | 11/2010 | Kuwata et al. |
| 2001/0022621 A1* | 9/2001 | Squibbs ............ 348/232 |
| 2003/0093493 A1 | 5/2003 | Watanabe et al. |

FOREIGN PATENT DOCUMENTS

| | | |
|---|---|---|
| EP | 0 930 774 | 7/1999 |
| EP | 0 936 502 | 8/1999 |
| EP | 0 949 805 | 10/1999 |
| EP | 1 075 138 | 2/2001 |
| JP | 11-203359 | 7/1999 |
| JP | 11-353330 | 12/1999 |
| JP | 2000-32482 | 1/2000 |
| JP | 2000 322338 | 11/2000 |
| JP | 2001-56796 | 2/2001 |
| JP | 2001-109878 | 4/2001 |
| JP | 2001 197429 | 7/2001 |

OTHER PUBLICATIONS

Patent Abstracts of Japan, vol. 2000, No. 19, Jun. 5, 2001 & JP 2001 056796 A (Sony Corp), Feb. 27, 2001.

* cited by examiner

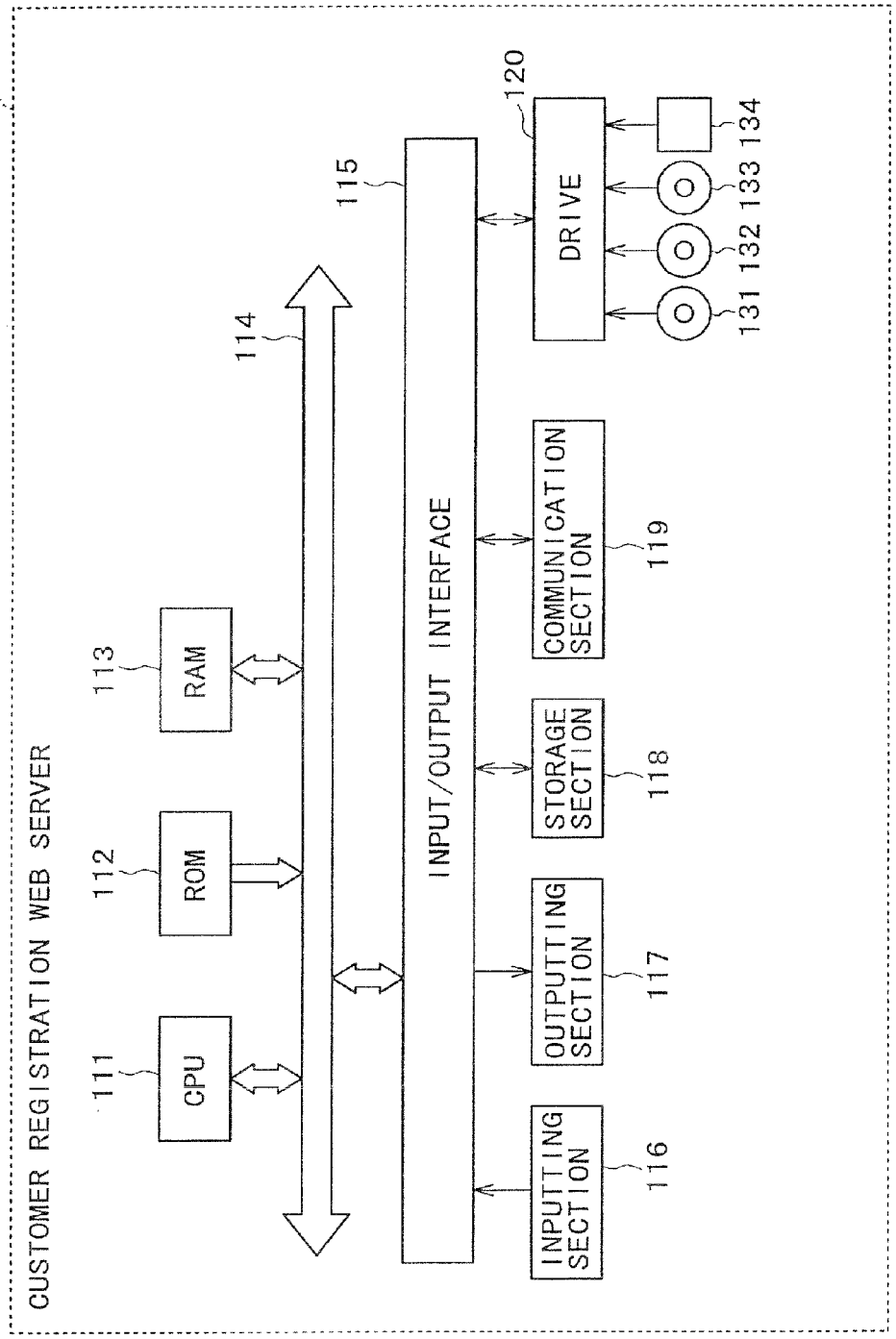

FIG. 12

```
PPP LOGIN:
  □□□@△△△
PPP PASSWORD:
  ○×△□#&★φ
ACCESS POINT TELEPHONE NUMBER:
  ＊＊-$$$$-¥¥¥¥
POP ID:
  □□□
POP PASSWORD:
  ○×△□#&★φ
E-MAIL ADDRESS:
  □□□@△△△.xxxx.ne.jp
POP SERVER:
  pop.△△△.xxxx.ne.jp
SMTP MAIL SERVER:
  mail.△△△.xxxx.ne.jp
NEWS SERVER:
  news01.xxxxx.ne.jp
```

FIG. 13

```
DI CUSTOMER ID:
  ＊＊000000
DI PASSWORD:
  ######
ACCESS POINT TELEPHONE NUMBER:
  ＊＊-$$$$-¥¥¥¥
```

FIG. 14A

| GENERAL ISP SETTING ITEMS |
|---|
| ·PPP CONNECTION ID<br>·PPP CONNECTION PASSWORD<br>·ACCESS POINT TELEPHONE NUMBER<br>·Primary DNS Server<br>·Secondary DNS Server<br>·Proxy Server<br>·Port Number<br>·POP AUTHENTICATION ID<br>·POP AUTHENTICATION PASSWORD<br>·POP Server<br>·SMTP Server<br>·MAIL ADDRESS |

FIG. 14B

| CONNECTION SETTING ITEMS |
|---|
| ·Unified ID<br>·PASSWORD<br>·ACCESS POINT TELEPHONE NUMBER |

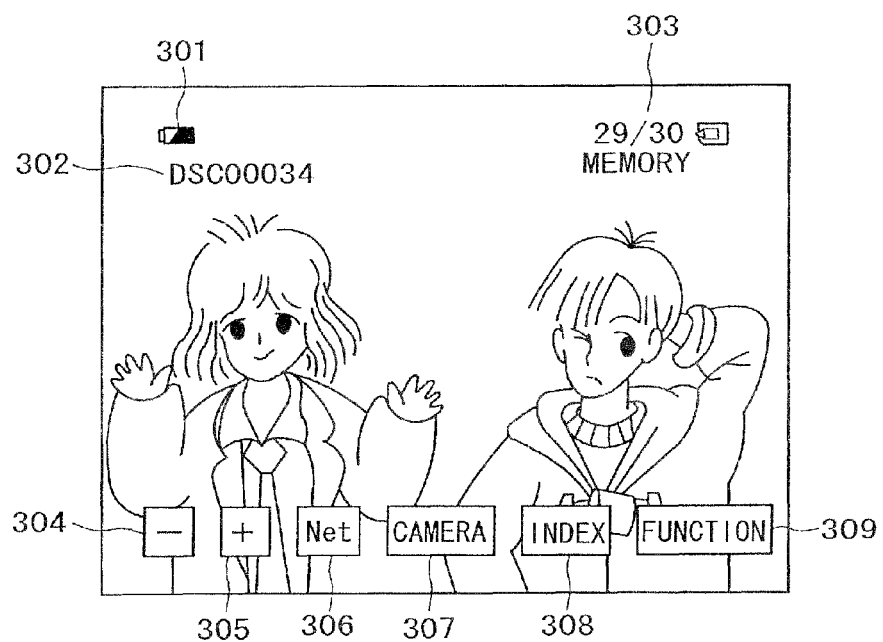
F I G. 19

F I G. 2 0
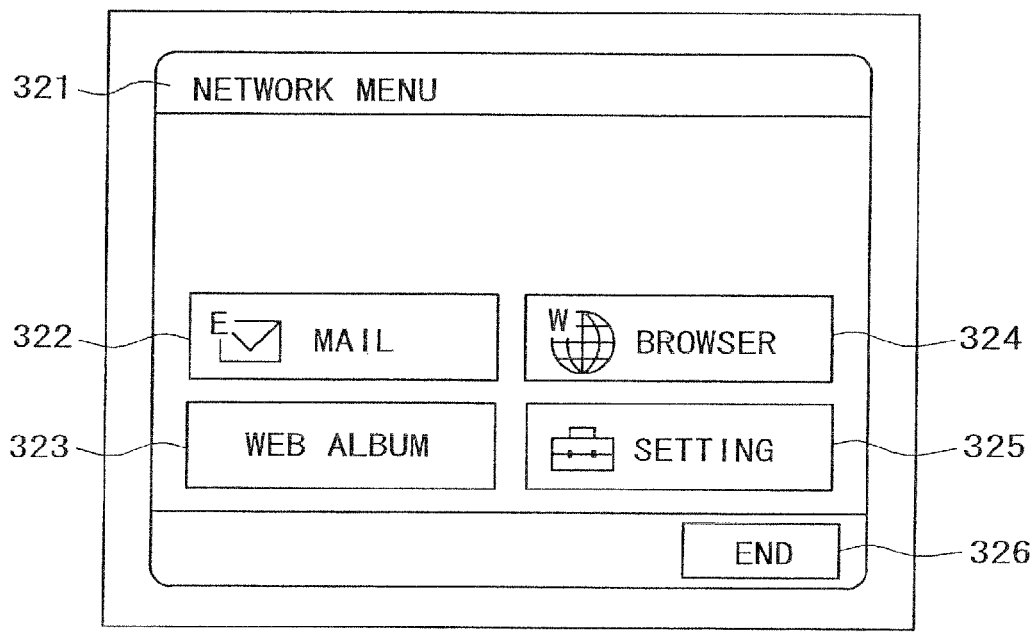
F I G. 2 1
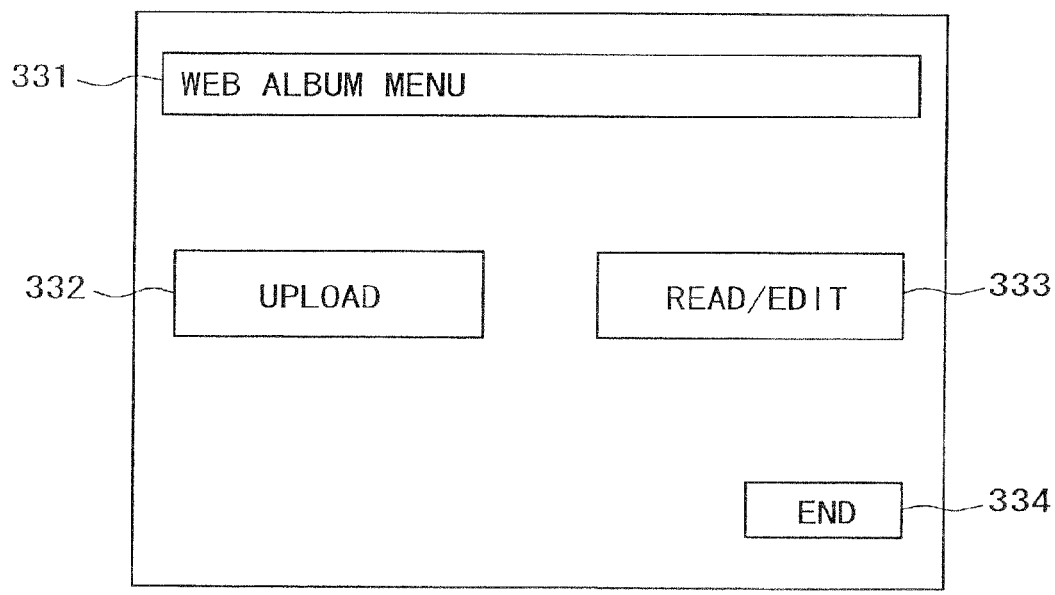

F I G. 2 3
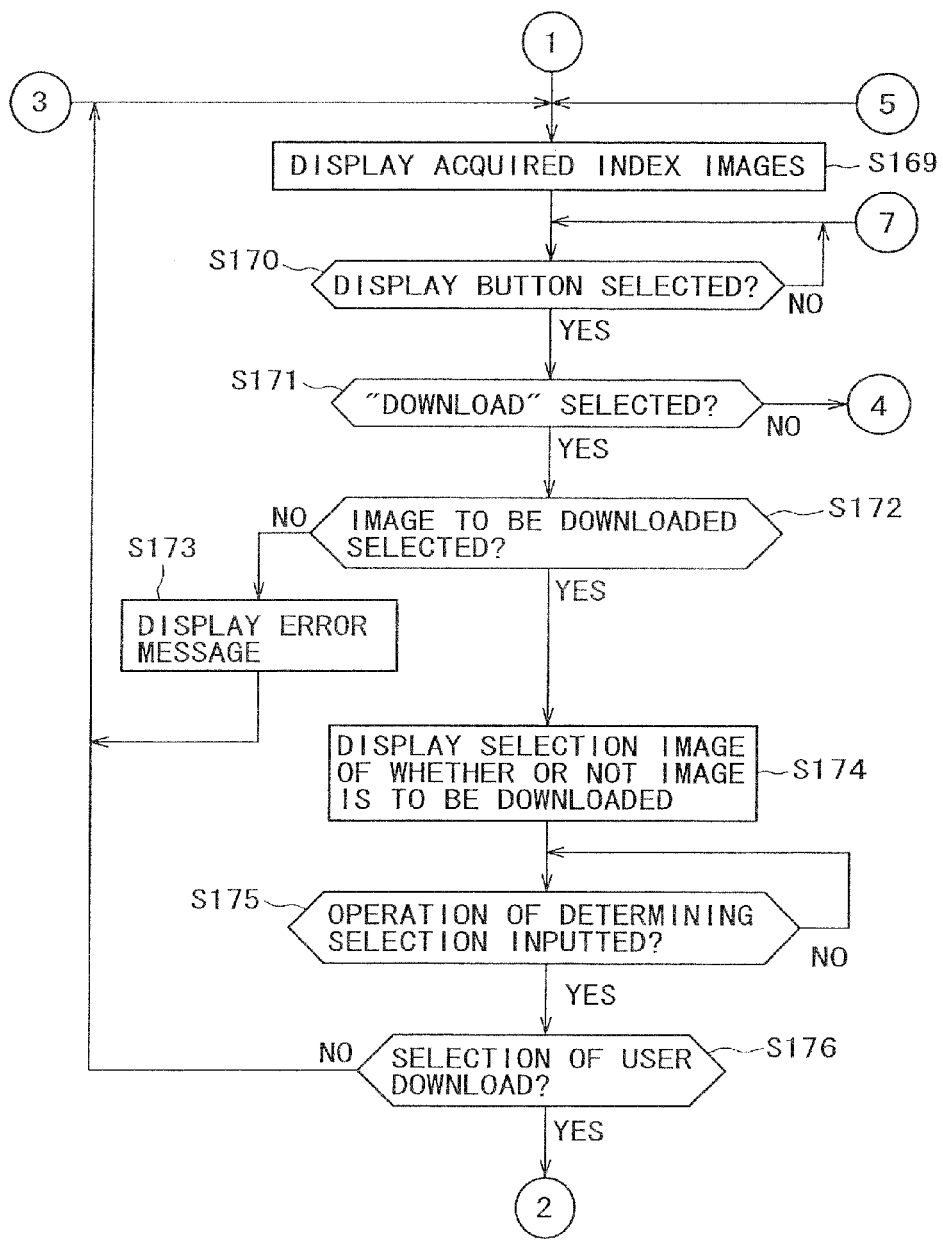

F I G. 4 1
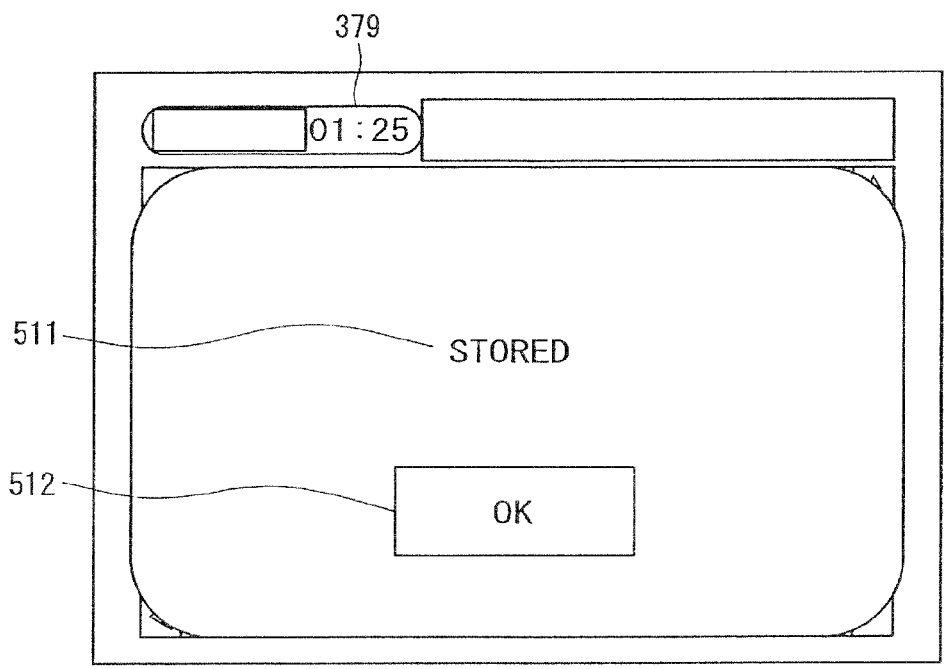
F I G. 4 2
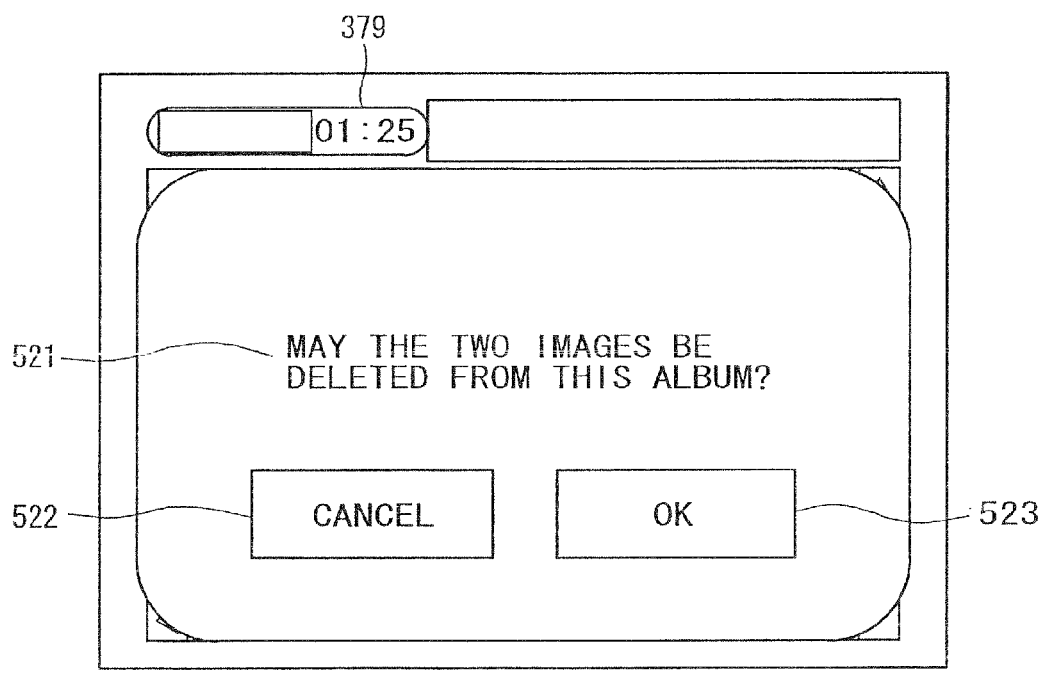

INFORMATION PROCESSING SYSTEM, INFORMATION PROCESSING APPARATUS AND METHOD

This is a continuation of application Ser. No. 12/909,894, filed Oct. 22, 2010, which is a continuation of application Ser. No. 10/399,804, filed Aug. 26, 2003, now U.S. Pat. No. 7,836,477, which is based on International Application PCT/JP02/08314, filed Aug. 16, 2002 pursuant to 35 USC 371, which is entitled to the priority filing date of Japanese Application No. 2001-250476, filed on Aug. 21, 2001, the entirety of which is incorporated herein by reference.

TECHNICAL FIELD

The present invention relates to an information processing system, an information processing apparatus and method, and more particularly to an information processing system, an information processing apparatus and method by which image data stored in a database can be downloaded efficiently.

BACKGROUND ART

An undertaker (hereinafter referred to as album service providing undertaker) is available which provides a service for providing an album on a network, that is, a service of storing image data of still pictures, moving pictures and so forth picked up by a user using an image pickup apparatus into a database through a network to the user. An outline of the service is described with reference to FIG. 1.

A personal computer 1 for use by a user is connected to a server 2 of an album service providing undertaker through the Internet 3.

Image data picked up by the user using an image pickup apparatus (not shown) are recorded onto a recording medium. The personal computer 1 fetches the image data from, for example, the recording medium. Further, the personal computer 1 establishes a connection to the Internet 3 and fetches image data from an information providing server not shown or the like.

The personal computer 1 can access the server 2 of the album service providing undertaker through the Internet 3 and store the image data fetched by such a method as described above into a database of the server 2. Further, the personal computer 1 can read or erase the image data stored in the database of the server 2 or transmit them as annexed data to an electric mail to another user. Further, the user can download, when necessary, desired image data from the database of the server 2 to the personal computer 1.

However, there is a subject that, when image data picked up by an image pickup apparatus are uploaded to the server 2 and when image data stored in the database are downloaded, the user is obliged to designate object images one by one to upload or download them one by one, and as a result, much time is required.

Further, there is another subject that, since operation of a personal computer is complicated, a user unfamiliar to a method of use of a personal computer cannot easily enjoy provision of the service.

DISCLOSURE OF INVENTION

The present invention has been made in view of such circumstances as described above and makes it possible to download image data simply using an image pickup apparatus.

An information processing system of the present invention is characterized in that a first information processing apparatus includes first requesting means for issuing a request for transmission of indices to images managed by second information processing apparatus to the second information processing apparatus through a network, acceptance means for displaying the indices to the images transmitted from the second information processing apparatus and accepting selection of one or more of the images desired to be downloaded by a user, second requesting means for issuing a request for transmission of discrimination information of the image data corresponding to the image or images whose selection has been accepted by the acceptance means to the second information processing apparatus, discrimination means for discriminating whether or not the image data are downloadable based on the discrimination information transmitted from the second information processing apparatus, third requesting means for issuing a request for transmission of the image data to the second information processing apparatus if it is discriminated by the discrimination means that the image data are downloadable, and recording means for recording the image data transmitted from the second information processing apparatus onto a recording medium, and the second information processing apparatus includes storage means for storing the image data transmitted from the first information processing apparatus for each user, specification means for accepting an access from the first information processing apparatus to specify the user of the first information processing apparatus, first transmission means for transmitting, in response to the transmission request for indices to the images from the first information processing apparatus, indices to the images to the first information processing apparatus, second transmission means for transmitting the discrimination information to the first information processing apparatus in response to the transmission request for discrimination information from the first information processing apparatus, and third transmission means for transmitting the image data to the first information processing apparatus in response to the transmission request for the image data from the first information processing apparatus.

The indices to the images may include thumbnail images of the images.

The discrimination information may include information regarding a file size of the image data and a type of a format of the image data as well as a URL corresponding to the image data.

The third requesting means may access, when to issue a request for transmission of the image data, the URL included in the discrimination information and issues a request for transmission of the image data.

A first information processing apparatus of the present invention is characterized in that it includes first requesting means for issuing a request for transmission of indices to images managed by a different information processing apparatus to the different information processing apparatus through a network, first acceptance means for displaying the indices to the images transmitted from the different information processing apparatus and accepting selection of one or more of the images desired to be downloaded by a user, second requesting means for issuing a request for transmission of discrimination information of the image data corresponding to the image or images whose selection has been accepted by the first acceptance means to the different information processing means, discrimination means for discriminating whether or not the image data are downloadable based on the discrimination information transmitted from the different information processing apparatus, third requesting means for issuing a request for transmission of the image data to the different information processing apparatus if it is discriminated by the discrimination means that the image data are downloadable, and recording means for recording the image data transmitted from the different information processing apparatus onto a recording medium.

The indices to the images may include thumbnail images of the images.

The discrimination information may include information regarding a file size of the image data and a type of a format of the image data as well as a URL corresponding to the image data.

The discrimination means may compare the file size of the image data with a free storage capacity of the recording medium to discriminate whether or not the image data are downloadable.

The discrimination means may discriminate whether or not the image data are downloadable based on the information regarding the type of the format of the image data.

The third requesting means may access, when to issue a request for transmission of the image data, the URL included in the discrimination information and issues a request for transmission of the image data.

The discrimination means may select the image data one by one from among the image data corresponding to the one or more images accepted by the first acceptance means and discriminate whether or not the selected image data are downloadable, and the third requesting means may issue a request for transmission of the one image data every time it is discriminated by the discrimination means that one of the image data is downloadable.

The information processing apparatus may further include image pickup means for picking up an image of an image pickup object.

The network may be the Internet.

The information processing apparatus may further include fourth requesting means for issuing a request for transmission of a list of groups to the different information processing apparatus, and second acceptance means for displaying the list of the groups transmitted from the different information processing apparatus and accepting selection from among the groups, and the first requesting means may issue a request for indices to the image data classified in the group accepted by the second acceptance means.

A first information processing method of the present invention is characterized in that it includes a first requesting step of issuing a request for transmission of indices to images managed by a different information processing apparatus to the different information processing apparatus through a network, an acceptance step of displaying the indices to the images transmitted from the different information processing apparatus and accepting selection of one or more of the images desired to be downloaded by a user, a second requesting step of issuing a request for transmission of discrimination information of the image data corresponding to the image or images whose selection has been accepted by the process at the acceptance step to the different information processing means, a discrimination step of discriminating whether or not the image data are downloadable based on the discrimination information transmitted from the different information processing apparatus, a third requesting step of issuing a request for transmission of the image data to the different information processing apparatus if it is discriminated by the process at the discrimination step that the image data are downloadable, and a recording step of recording the image data transmitted from the different information processing apparatus onto a recording medium.

A first recording medium of the present invention is characterized in that a program includes a first requesting step of issuing a request for transmission of indices to images managed by a different information processing apparatus to the different information processing apparatus through a network, an acceptance step of displaying the indices to the images transmitted from the different information processing apparatus and accepting selection of one or more of the images desired to be downloaded by a user, a second requesting step of issuing a request for transmission of discrimination information of the image data corresponding to the image or images whose selection has been accepted by the process at the acceptance step to the different information processing means, a discrimination step of discriminating whether or not the image data are downloadable based on the discrimination information transmitted from the different information processing apparatus, a third requesting step of issuing a request for transmission of the image data to the different information processing apparatus if it is discriminated by the process at the discrimination step that the image data are downloadable, and a recording step of recording the image data transmitted from the different information processing apparatus onto a recording medium.

A first program of the present invention causes a computer to execute a first requesting step of issuing a request for transmission of indices to images managed by a different information processing apparatus to the different information processing apparatus through a network, an acceptance step of displaying the indices to the images transmitted from the different information processing apparatus and accepting selection of one or more of the images desired to be downloaded by a user, a second requesting step of issuing a request for transmission of discrimination information of the image data corresponding to the image or images whose selection has been accepted by the process at the acceptance step to the different information processing means, a discrimination step of discriminating whether or not the image data are downloadable based on the discrimination information transmitted from the different information processing apparatus, a third requesting step of issuing a request for transmission of the image data to the different information processing apparatus if it is discriminated by the process at the discrimination step that the image data are downloadable, and a recording step of recording the image data transmitted from the different information processing apparatus onto a recording medium.

A second information processing apparatus of the present invention is characterized in that it includes storage means for storing image data transmitted thereto from a different information processing apparatus for each user, specification means for accepting an access from the different information processing apparatus to specify the user of the different information processing apparatus, first transmission means for transmitting, in response to a transmission request for indices to the images from the different information processing apparatus, indices to the images to the different information processing apparatus, second transmission means for transmitting discrimination information to the different information processing apparatus in response to a transmission request for discrimination information from the different information processing apparatus, and third transmission means for transmitting predetermined image data from within the image data stored in the storage means to the different information processing apparatus in response to a transmission request for the image data from the different information processing apparatus.

The storage means may store a plurality of the image data in a classified state in a plurality of groups, and the information processing apparatus may further include fourth transmission means for transmitting a list of the groups to the different information processing apparatus based on a transmission request for the list of the groups from the different information processing apparatus.

A second information processing method of the present invention is characterized in that it includes a storage step of storing image data transmitted thereto from a different information processing apparatus for each user, a specification step of accepting an access from the different information processing apparatus to specify the user of the different information processing apparatus, a first transmission step of transmitting, in response to a transmission request for indices to the images from the different information processing apparatus, indices to the images to the different information processing apparatus, a second transmission step of transmitting discrimination information to the different information processing apparatus in response to a transmission request for discrimination information from the different information processing apparatus, and a third transmission step of transmitting predetermined image data from within the image data stored by the process of the storage step to the different information processing apparatus in response to a transmission request for the image data from the different information processing apparatus.

A second recording medium of the present invention is characterized in that a program includes a storage step of storing image data transmitted thereto from a different information processing apparatus for each user, a specification step of accepting an access from the different information processing apparatus to specify the user of the different information processing apparatus, a first transmission step of transmitting, in response to a transmission request for indices to the images from the different information processing apparatus, indices to the images to the different information processing apparatus, a second transmission step of transmitting discrimination information to the different information processing apparatus in response to a transmission request for discrimination information from the different information processing apparatus, and a third transmission step of transmitting predetermined image data from within the image data stored by the process of the storage step to the different information processing apparatus in response to a transmission request for the image data from the different information processing apparatus.

A second program of the present invention causes a computer to execute a storage step of storing image data transmitted thereto from a different information processing apparatus for each user, a specification step of accepting an access from the different information processing apparatus to specify the user of the different information processing apparatus, a first transmission step of transmitting, in response to a transmission request for indices to the images from the different information processing apparatus, indices to the images to the different information processing apparatus, a second transmission step of transmitting discrimination information to the different information processing apparatus in response to a transmission request for discrimination information from the different information processing apparatus, and a third transmission step of transmitting predetermined image data from within the image data stored by the process of the storage step to the different information processing apparatus in response to a transmission request for the image data from the different information processing apparatus.

In the information processing system of the present invention, the first information processing apparatus issues a request for transmission of indices to images managed by the second information processing apparatus to the second information processing apparatus through the network, displays the indices to the images transmitted from the second information processing apparatus and accepts selection of one or more of the images desired to be downloaded by a user. Further, the first information processing apparatus issues a request for transmission of discrimination information of the image data corresponding to the image or images whose selection has been accepted to the second information processing apparatus, discriminates whether or not the image data are downloadable based on the discrimination information transmitted from the second information processing apparatus, issues a request for transmission of the image data to the second information processing apparatus if it is discriminated that the image data are downloadable, and records the image data transmitted from the second information processing apparatus onto a recording medium. The second information processing apparatus stores the image data transmitted from the first information processing apparatus for each user, accepts an access from the first information processing apparatus, specifies the user of the first information processing apparatus, transmits, in response to the transmission request for indices to the images from the first information processing apparatus, indices to the images to the first information processing apparatus, transmits the discrimination information to the first information processing apparatus in response to the transmission request for discrimination information from the first information processing apparatus, and transmits the image data to the first information processing apparatus in response to the transmission request for the image data from the first information processing apparatus.

In the first information processing apparatus and method, recording medium and program of the present invention, a request for transmission of indices to images managed by a different information processing apparatus is issued to the different information processing apparatus through the network, and the indices to the images transmitted from the different information processing apparatus are displayed and selection of one or more of the images desired to be downloaded by a user is accepted. Further, a request for transmission of discrimination information of the image data corresponding to the image or images whose selection has been accepted by the first acceptance means is issued to the different information processing means, and it is discriminated based on the discrimination information transmitted from the different information processing apparatus whether or not the image data are downloadable. Then, a request for transmission of the image data to the different information processing apparatus is issued if it is discriminated that the image data are downloadable, and the image data transmitted from the different information processing apparatus are recorded onto a recording medium.

In the second information processing apparatus and method, recording medium and program of the present invention, image data transmitted thereto from a different information processing apparatus are stored for each user, and an access from the different information processing apparatus is accepted and the user of the different information processing apparatus is specified. Then, in response to a transmission request for indices to the images from the different information processing apparatus, indices to the images are transmitted to the different information processing apparatus, and then discrimination information is transmitted to the different information processing apparatus in response to a transmission request for discrimination information from the different information processing apparatus. Then, predetermined image data from within the image data stored in the storage means are transmitted to the different information processing apparatus in response to a transmission request for the image data from the different information processing apparatus.

BRIEF DESCRIPTION OF DRAWINGS

FIG. 4 is a block diagram showing a configuration of a customer registration web server of FIG. 1;

FIG. 12 is a view showing an example of Internet service provider setting information at step S79 of FIG. 10;

FIG. 13 is a view showing an example of setting information for the video camera at step S80 of FIG. 10;

FIG. 14A is a view illustrating setting items upon connection to the Internet through a conventional common Internet service provider;

FIG. 14B is a view illustrating setting items upon connection to the Internet through the Internet service provider to which the present invention is applied;

FIG. 19 is a view showing an example of an LCD screen on which an image stored in a memory card is displayed;

FIG. 20 is a view showing an example of a screen displayed on the LCD after a network button of FIG. 19 is selected;

FIG. 21 is a view showing an example of a screen displayed on the LCD after a Web album button of FIG. 20 is selected;

FIG. 23 is a flow chart continuing from that of FIG. 22 illustrating the editing/reading process of the video camera of FIG. 1;

FIG. 41 is a view showing an example of a screen displayed on the LCD at step S186 of FIG. 24;

FIG. 42 is a view showing an example of a screen displayed on the LCD at step S190 of FIG. 25.

BEST MODE FOR CARRYING OUT THE INVENTION

Figure 1:
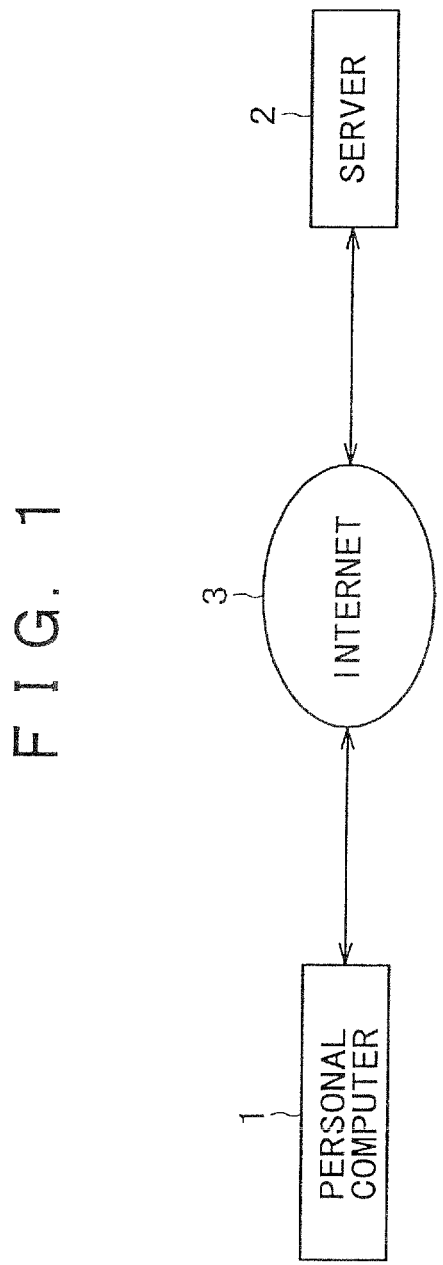
FIG. 1 is a view showing a configuration of a conventional service providing system.
Figure 2:
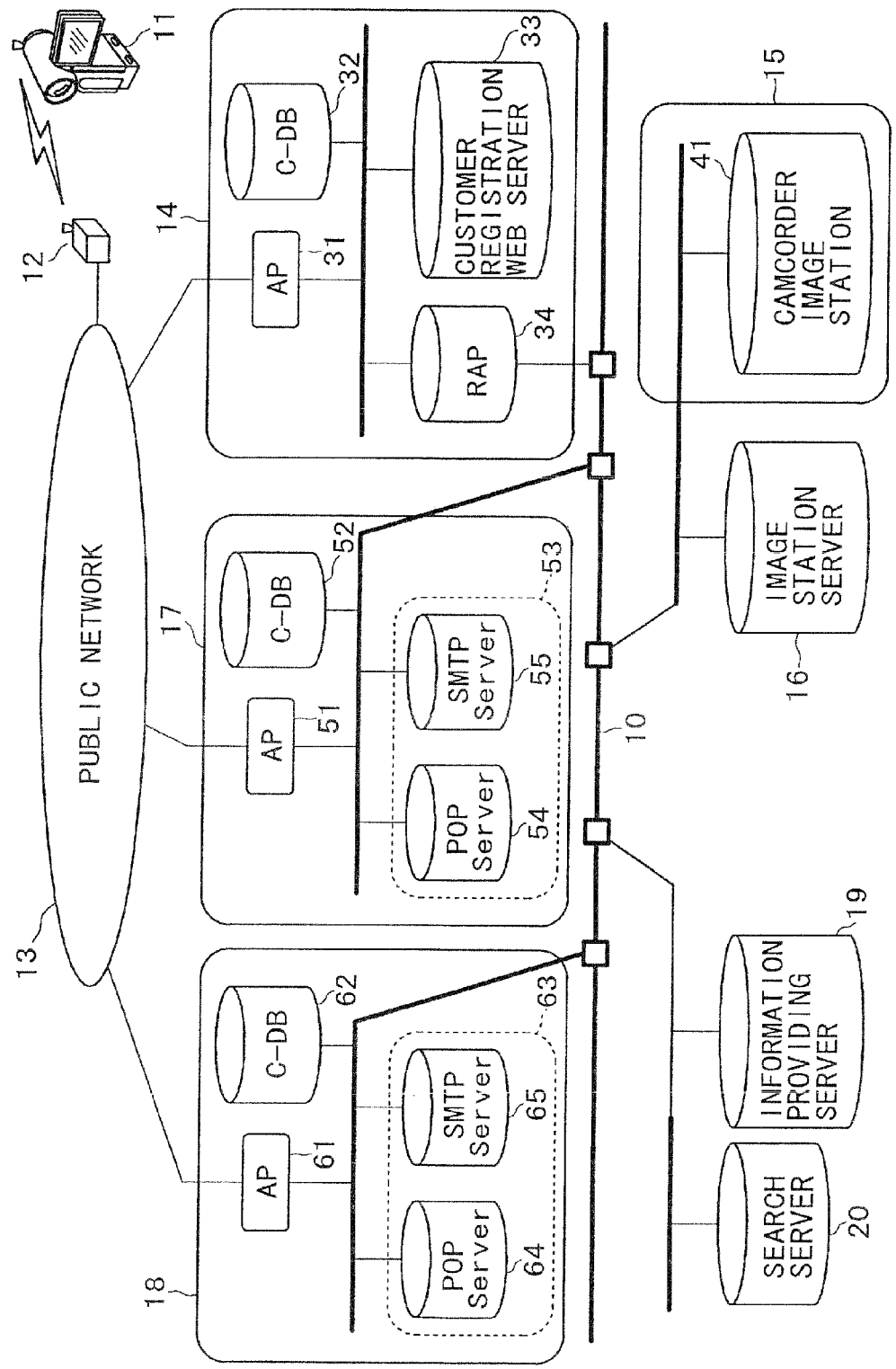
FIG. 2 is a view showing a configuration of a service providing system to which the present invention is applied.

FIG. 2 shows an example of a configuration of a service providing system to which the present invention is applied. In the service providing system, a network system 14, a network service business center 15, an image station server 16, Internet service providers (ISP) 17 and 18, an information providing server 19, and a search server 20 are connected to the Internet 10.

Further, the network system 14, Internet service provider 17 and Internet service provider 18 are connected to a public network 13. Also the Bluetooth adapter 12 is further connected to the public network 13. A video camera 11 can be connected to the Bluetooth adapter 12 through short distance radio communication in accordance with the Bluetooth (trademark) and further connected to the network system 14, the Internet service provider 17, or the Internet service provider 18 through the public network 13.

The network system 14 includes an access point (AP) 31, a customer database (C-DB) 32, a customer registration web server 33 and a registration authentication platform (RAP) 34.

The access point 31 is connected to the public network 13. The customer database 32 records several kinds of information of a user who has purchased the video camera 11. The customer registration web server 33 controls a registration process of the video camera 11. The registration authentication platform 34 executes an authentication process of the user in the network system 14.

While, in the example of FIG. 2, the access point 31, customer database 32, customer registration web server 33 and registration authentication platform 34 are formed individually, otherwise they can be formed integrally.

The network service business center 15 has an image station 41 for a video camera. The video camera image station 41 registers and manages image data transmitted from the video camera 11.

The image station server 16 registers and manages image data transmitted from a personal computer not shown.

The Internet service provider 17 includes an access point 51, a customer database 52 and a mail server 53. The mail server 53 includes a POP server 54, and an SMTP server (Simple Mail Transfer Protocol) 55.

The access point 51 performs a communication process with the public network 13. The customer database 52 registers various kinds of information of the user of the Internet service provider 17. The POP server 54 principally manages a process of transmission and reception of a mail to and from the video camera 11. The SMTP server 55 principally manages transmission and reception of a mail to and from another SMTP server (in the case of the present example, an SMTP server 65 of the Internet service provider 18).

The Internet service provider 18 includes an access point 61 and a customer database 62, and further includes a mail server 63 which in turn includes a POP server 64 and the SMTP server 65. This basic configuration is similar to that of the Internet service provider 17.

The information providing server 19 provides various kinds of information regarding, for example, commodities of a predetermined enterprise. The search server 20 provides a service of searching for various kinds of information laid open on the Internet 10.

Figure 3:
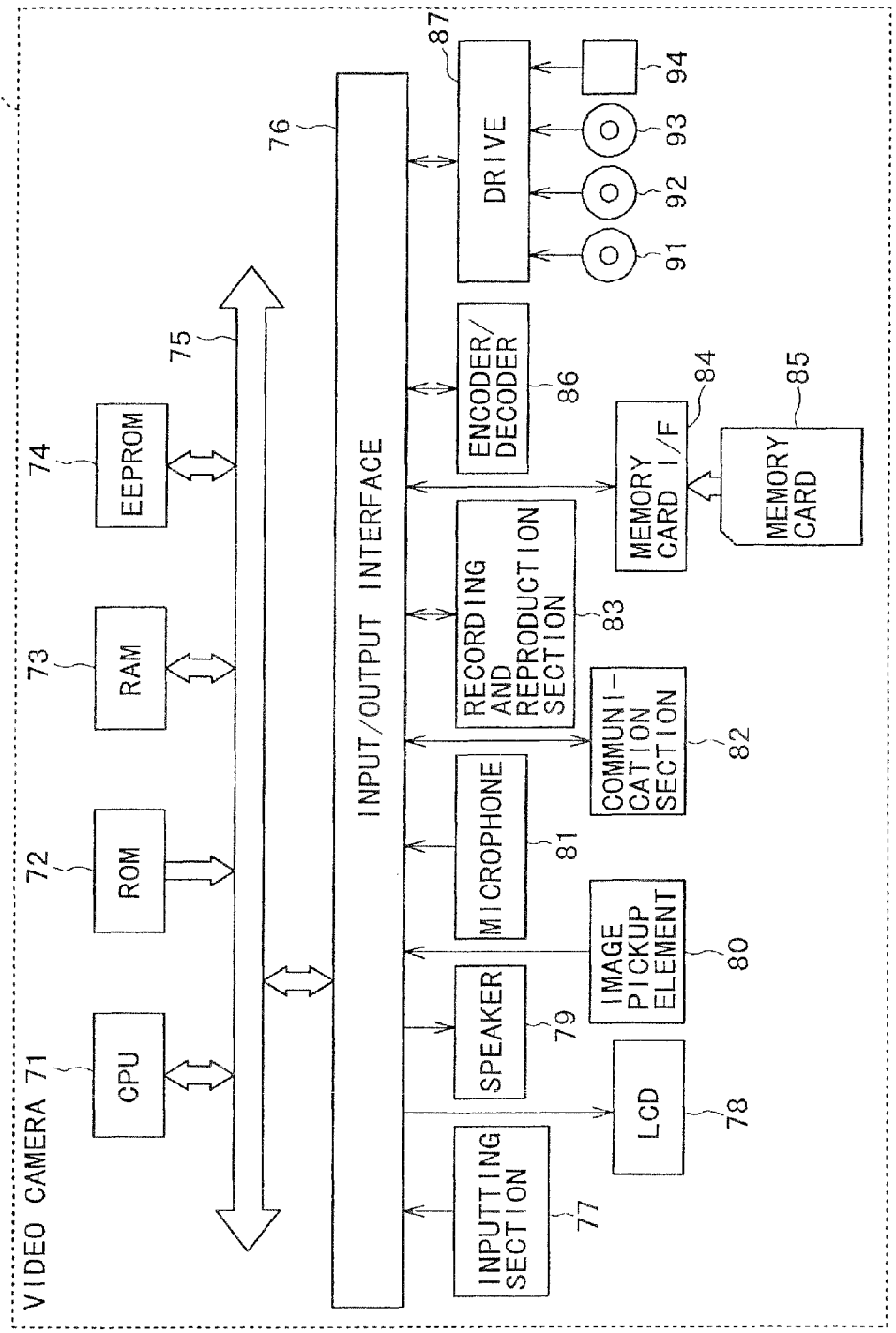
FIG. 3 is a block diagram showing a configuration of a video camera of FIG. 1.

FIG. 3 shows an example of a configuration of the video camera 11. The video camera 11 is a video tape recorder of the type integrated with a camera and has an accessing function to the Internet 10. Referring to FIG. 3, a CPU (Central Processing Unit) 71 executes various processes in accordance with programs stored in a ROM (Read Only Memory) 72 or programs loaded in a RAM (Random Access Memory) 73. Also data necessary for execution of various processes by the CPU 71 and so forth are stored suitably into the RAM 73. Data necessary to be kept stored also after the power supply is disconnected are stored into an EEPROM (Electrically Erasable Programmable Read Only Memory) 74.

The CPU 71, ROM 72, RAM 73 and EEPROM 74 are connected to each other by a bus 75. Also an input/output interface 76 is connected to the bus 75.

Further connected to the input/output interface 76 are an inputting section 77 including various buttons, switches and so forth, an LCD (Liquid Crystal Display) unit 78, a speaker 79, an image pickup element 80 formed from a CCD (Charge Coupled Device) image pickup element and so forth, a microphone 81 for fetching a sound signal, and a communication section 82 which performs short distance radio communication with the Bluetooth adapter 12 in accordance with the Bluetooth.

A recording and reproduction section 83 records image data picked up by the image pickup element 80, sound data gathered by the microphone 81 and so forth onto a cassette magnetic tape loaded therein. Further, the recording and reproduction section 83 reproduces image data and sound data recorded on a cassette magnetic tape, and outputs an image corresponding to the video data to the LCD unit 78 so that the image data are displayed on the LCD unit 78 while it supplies the sound data to the speaker 79 so that the sound data are outputted from the speaker 79.

A memory card interface 84 executes, when a memory card 85 as a portable semiconductor memory is loaded therein, a writing process and a reading out process of data into and from the memory card 85. Into the memory card 85, not only image data picked up by the image pickup element 80 and sound data gathered by the microphone 81 can be recorded, but also various kinds of data acquired from the communication section 82 through the Internet 10 can be stored.

Image data picked up by the image pickup element 80 are stored into the memory card 85 where a memory mode is set, but are recorded onto the cassette magnetic tape where a camera mode is set.

An encoder/decoder 86 encodes or decodes image data in accordance with the MPEG (Moving Picture Experts Group) system or the JEPG (Joint Photographic Coding Experts Group) system.

When necessary, a drive 87 is connected to the input/output interface 76, and a magnetic disk 91, an optical disk 92, a magneto-optical disk 93 or a semiconductor memory 94 is suitably loaded into the input/output interface 76 and a computer program read out from it is installed into the RAM 73 when necessary.

FIG. 4 shows an example of a configuration of the customer registration web server 33. Referring to FIG. 4, a CPU 111 executes various processes in accordance with programs stored in a ROM 112 or programs loaded into a RAM 113 from a storage section 118. Also data necessary for execution of various processes by the CPU 111 and so forth are stored suitably into the RAM 113.

The CPU 111, ROM 112 and RAM 113 are connected to each other by a bus 114. Also an input/output interface 115 is connected to the bus 114.

Further connected to the input/output interface 115 are an inputting section 116 formed from a keyboard, a mouse and so forth, an outputting section 117 formed from a display unit such as a CRT or an LCD unit, a speaker and so forth, a storage section 118 formed from a hard disk or the like, and a communication section 119 formed from a modem, a terminal adapter and so forth. The communication section 119 performs a communication process through a network including the Internet 10.

When necessary, a drive 120 is connected to the input/output interface 115, and a magnetic disk 131, an optical disk 132, a magneto-optical disk 133 or a semiconductor memory 134 is suitably loaded into the input/output interface 115 and a computer program read out from it is installed into the storage section 118 when necessary.

Where the access point 31, customer database 32 and registration authentication platform 34 are formed separately from the customer registration web server 33, though not shown, they have a configuration basically similar to that of the customer registration web server 33.

Figure 5:
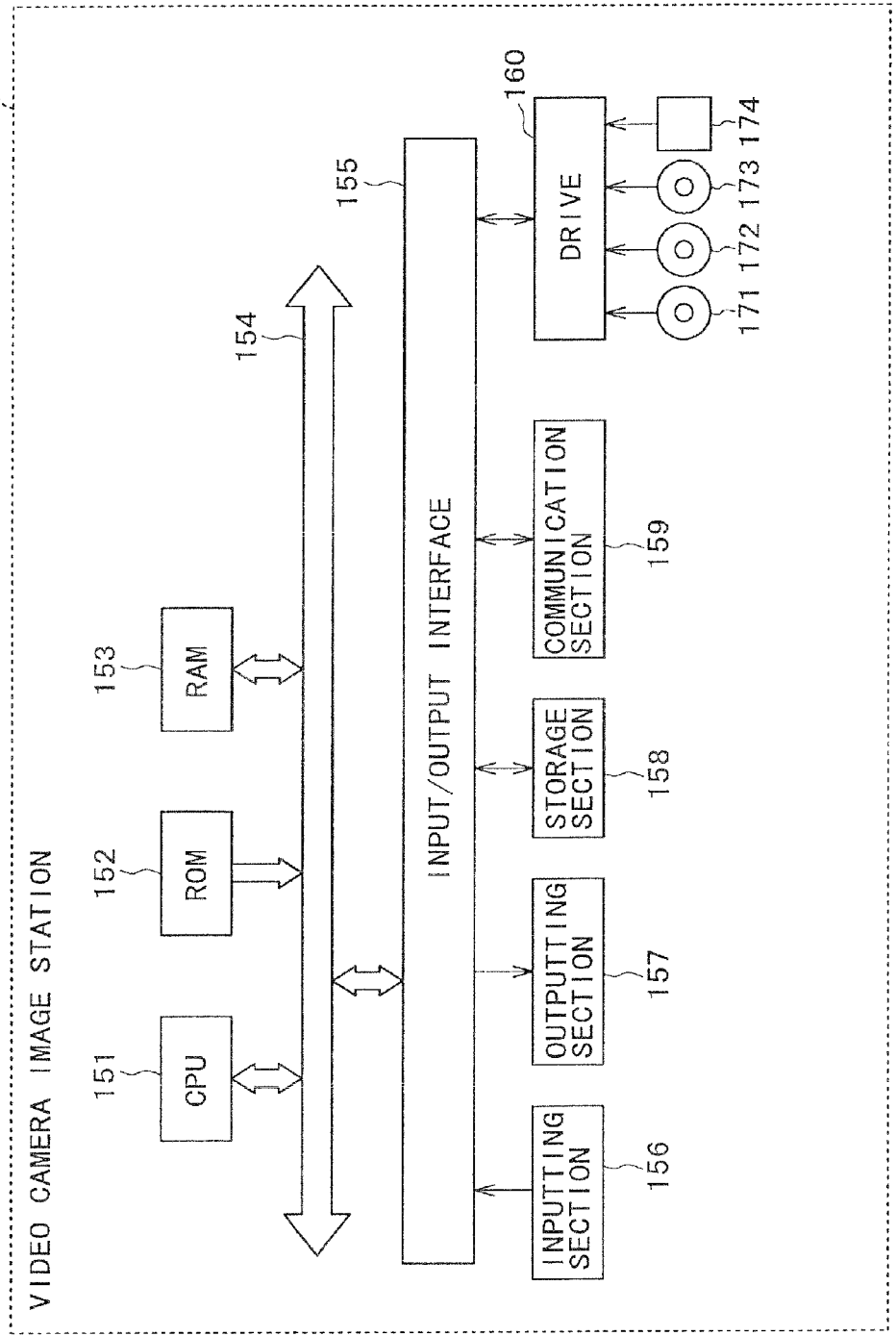
FIG. 5 is a block diagram showing a configuration of an image station for a video camera of FIG. 1.

FIG. 5 shows an example of a configuration of the video camera image station 41 which composes the network business center 15. Components of the video camera image station 41 from a CPU 151 to a semiconductor memory 174 have a configuration basically similar to those of the components of the customer registration web server 33 of FIG. 4 from the CPU 111 to the semiconductor memory 134, and those elements having corresponding names have corresponding functions. Accordingly, description of them is omitted to avoid redundancy.

Figure 6:
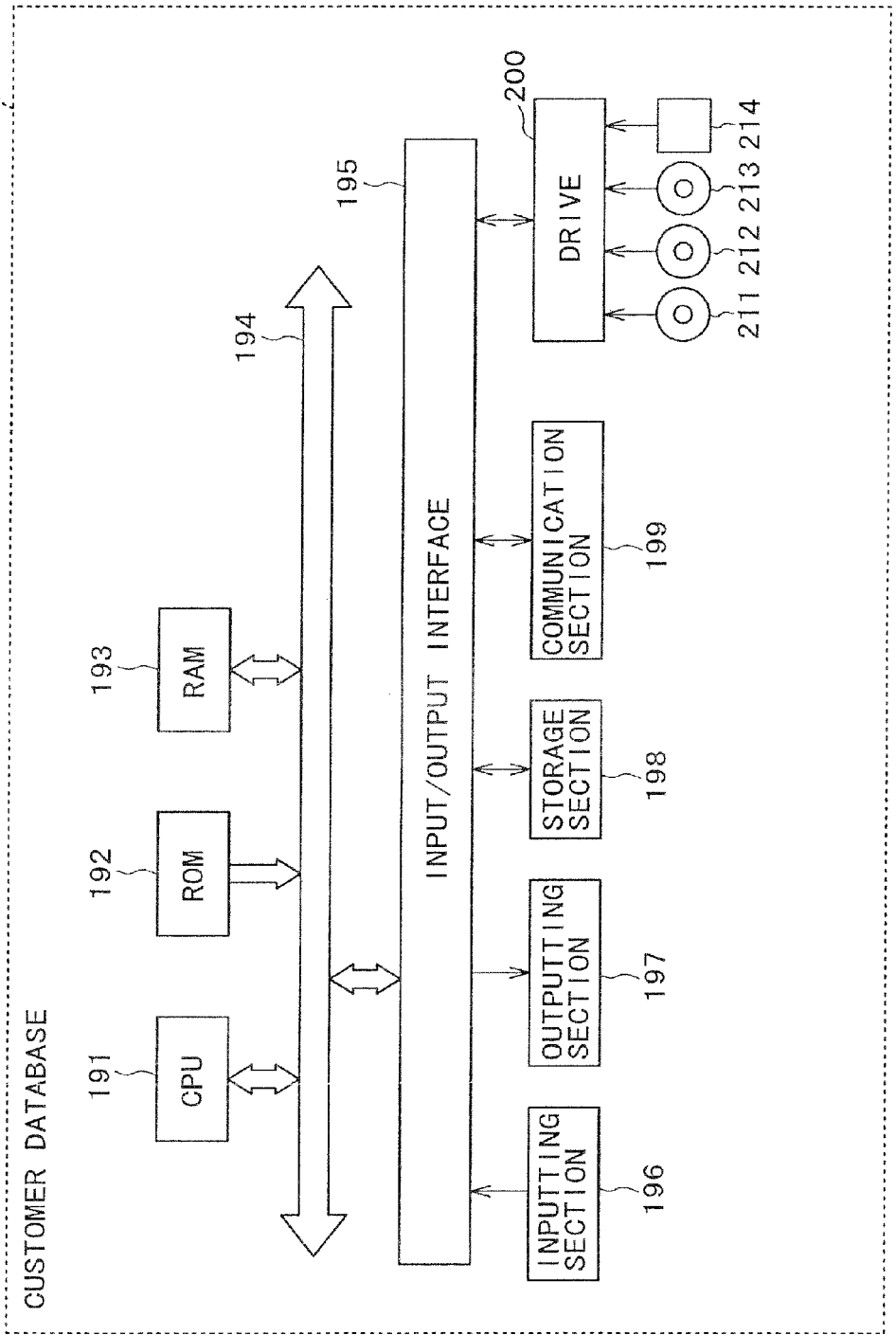
FIG. 6 is a block diagram showing a configuration of a customer database of FIG. 1.

FIG. 6 shows an example of a configuration of the customer database 52 of the Internet service provider 17. Also components of the customer database 52 from a CPU 191 to a semiconductor memory 214 have a configuration basically similar to that of the components of the customer registration web server 33 of FIG. 4 from the CPU 111 to semiconductor memory 134, and those components having corresponding names have corresponding functions. Therefore, overlapping description of them is omitted to avoid redundancy.

Where the access point 51 and the mail server 53 (POP server 54 and SMTP server 55) are formed separately from the customer database 52, also they have a configuration basically similar to that of the customer database 52 of FIG. 6.

A user who has purchased the video camera 11 can enjoy a service provided by the service providing system of FIG. 2. To this end, the user of the video camera 11 will execute a process of registering the video camera 11 (the user thereof) into the network system 14. When the video camera 11 is purchased, the Bluetooth adapter 12 is annexed as an accessory to the video camera 11 (if the Bluetooth adapter 12 is not annexed, then it is purchased separately), and the user can connect the Bluetooth adapter 12 to the public network 13 to register the video camera 11 (the user thereof) into the network system 14.

Figure 7:
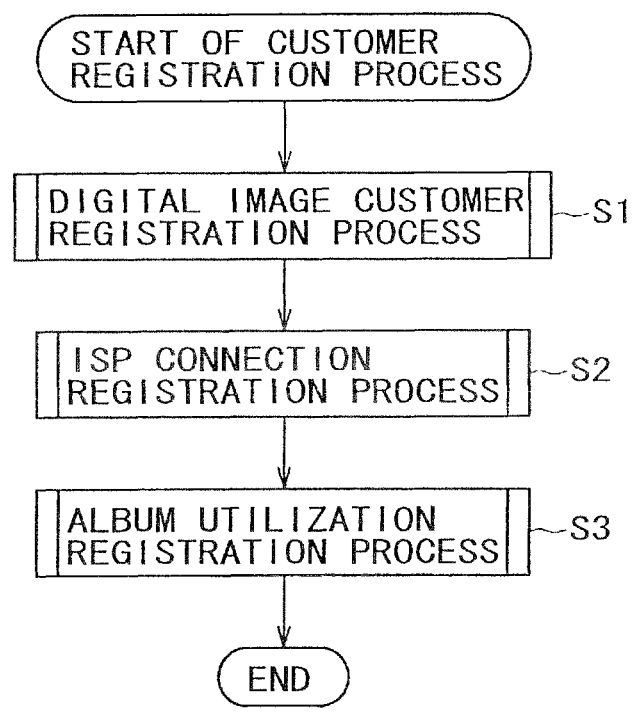
FIG. 7 is a flow chart illustrating a customer registration process in the service providing system of FIG. 1.

When this registration process is performed, a process illustrated in a flow chart of FIG. 7 is executed by the service providing system. In particular, at step S1, a digital image customer registration process is executed by the network system 14, and then at step S2, an ISP connection registration process is executed by the Internet service provider 17. Thereafter, at step S3, an album utilization registration process is executed by the network business center 15.

Thus, the processes at steps S1 to S3 are described individually below.

Figure 8:
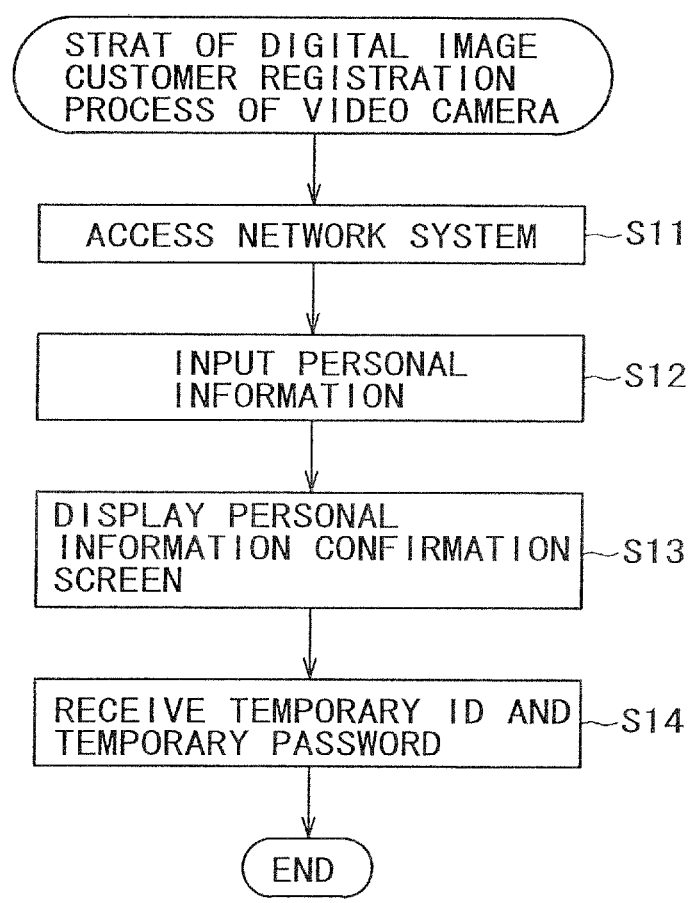
FIG. 8 is a flow chart illustrating a digital image customer registration process of the video camera of FIG. 1.

First, the digital image customer registration process by the network system 14 is described with reference to flow charts of FIGS. 8 and 9. FIG. 8 illustrates a process of the video camera 11 when the registration process is performed, and FIG. 9 illustrates a corresponding process of the customer registration web server 33.

At step S11, the user of the video camera 11 will operate the inputting section 77 to issue an instruction to access the network system 14. The destination of the access is stored in advance in the ROM 72. The CPU 71 controls the communication section 82 based on the information stored in the ROM 72 to issue an instruction to access the access point 31 of the network system 14. Upon reception of the instruction, the communication section 82 communicates with the Bluetooth adapter 12 through short distance communication to access the access point 31 of the network system 14 from the Bluetooth adapter 12 through the public network 13.

A guest ID is utilized for this first time access to the network system 14. In particular, if the user inputs, for example, "GUEST" as an ID, then the access point 31 permits the access. After the access point 31 permits the access from the video camera 11, it passes the management right for processing for the video camera 11 to the customer registration web server 33.

Figure 9:
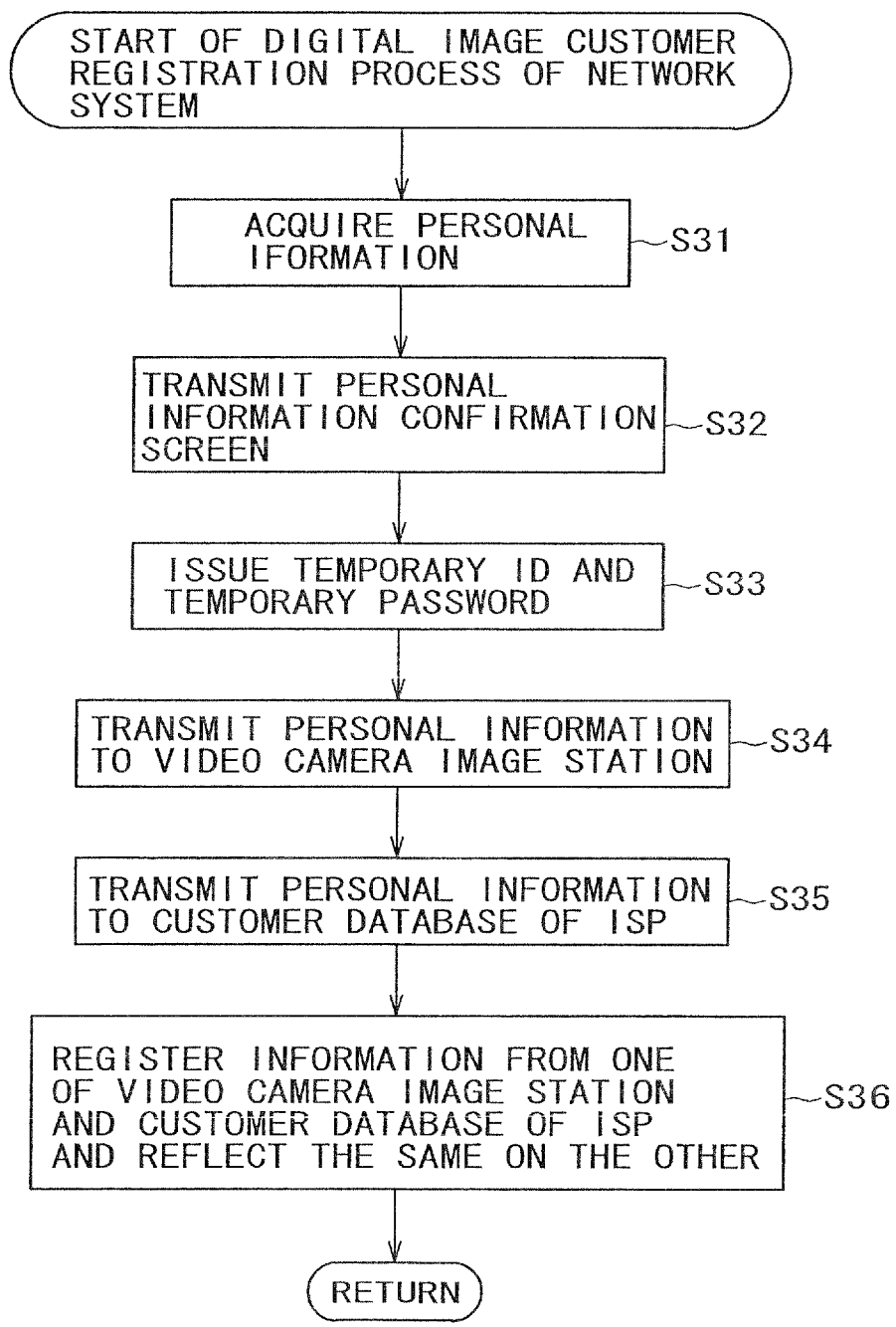
FIG. 9 is a flow chart illustrating a digital image customer registration process of a network system of FIG. 1.

The CPU 111 of the customer registration web server 33 issues, at this time at step S31 of FIG. 9, a request to input personal information to the user of the video camera 11. This request is outputted from the communication section 119 and transmitted to the video camera 11 through the access point 31, public network 13 and Bluetooth adapter 12.

Upon reception of the request from the communication section 82, the CPU 71 of the video camera 11 outputs a message corresponding to the request to the LCD unit 78 so that the message is displayed on the LCD unit 78 at step S12.

The user of the video camera 11 will operate the inputting section 77 based on the message to input its personal information. The personal information includes a registration code formed from 16 numerical and alphabetical letters of the video camera 11 (the registration code is carried on a post card annexed to the video camera 11 when it is purchased), a zip code, the name, an address, the date of birth, the sex, a telephone number, an electronic mail address and so forth of the user, a product number (serial number) and the purchased date of the video camera 11, and so forth.

When such personal information is inputted, the CPU 71 of the video camera 11 causes the personal information to be transmitted to the network system 14 at step S12.

In particular, the CPU 71 controls the communication section 82 to transmit the inputted personal information to the network system 14. The personal information is supplied to the customer registration web server 33 through the Bluetooth adapter 12, public network 13 and access point 31.

The CPU 111 of the customer registration web server 33 acquires the personal information through the communication section 119 and supplies the personal information to the RAM 113 so that the personal information is temporarily stored into the RAM 113 at step S31 of FIG. 9.

After the personal information is registered into the RAM 113, the CPU 111 produces a personal information confirmation screen and causes the personal information confirmation screen to be transmitted from the communication section 119 to the video camera 11 at step S32. The data of the personal information confirmation screen are supplied from the access point 31 to the Bluetooth adapter 12 through the public network 13 and then transmitted from the Bluetooth adapter 12 to the video camera 11.

The CPU 71 of the video camera 11 receives the data of the personal information confirmation screen through the communication section 82 and stores the data once into the RAM 73 and then reads out and outputs the data to the LCD unit 78 so that the personal information confirmation screen is displayed on the LCD unit 78 at step S13 of FIG. 8. Consequently, the personal information inputted by the user of the video camera 11 is displayed on the LCD unit 78 for confirmation by the user.

If the user operates the inputting section 77 to input that the personal information inputted by the user itself has been confirmed, then the CPU 71 controls the communication section 82 to transmit the confirmation signal to the customer registration web server 33.

The CPU 111 of the customer registration web server 33 receives the confirmation signal through the communication section 119 and transfers the personal information registered in the RAM 113 to the registration authentication platform 34 so that the personal information is stored into the registration authentication platform 34 at step S32 of FIG. 9.

Then at step S33, the registration authentication platform 34 issues a temporary ID and a temporary password to the user of the video camera 11. The temporary ID and the temporary password are supplied to the customer registration web server 33 and outputted from the communication section 119 so that they are transmitted to the video camera 11 through the access point 31, public network 13 and Bluetooth adapter 12.

The CPU 71 of the video camera 11 receives the temporary ID and the temporary password from the communication section 82 and either supplies them to the LCD unit 78 so that they are displayed on the LCD unit 78 or supplies them to the EEPROM 74 so that they are stored into the EEPROM 74 at step S14 of FIG. 8.

The registration authentication platform 34 supplies the personal information of the user of the video camera 11 to the customer database 32 so that the personal information is registered into the customer database 32 at step S33.

At step S34, the customer database 32 supplies the personal information to the video camera image station 41 of the network business center 15 through the Internet 10.

The CPU 151 of the video camera image station 41 receives the personal information transmitted from the network system 14 through the communication section 159 and supplies the personal information to the storage section 158 so that the personal information is stored into the storage section 158 (at step S121 of FIG. 16 hereinafter described).

At step S35, the customer database 32 further transmits the personal information of the video camera 11 to the customer database 52 of the Internet service provider 17.

The customer database 52 of the Internet service provider 17 registers the personal information of the video camera 11 transmitted from the network system 14 through the Internet 10 (at step S71 of FIG. 11 hereinafter described).

It is to be noted that, at step S36, when the personal information of the user of the video camera 11 is changed later in the network business center 15, the customer database 32 of the network system 14 receives this from the video camera image station 41 through the Internet 10 and stores it into the customer database 32 itself. Further, the customer database 32 supplies the updated personal information from the Internet 10 to the customer database 52 of the Internet service provider 17 so that the changed personal information is registered into the customer database 52.

On the contrary, since, when the user of the video camera 11 changes the personal information, this is registered into the customer database 52 in the Internet service provider 17, the customer database 52 issues a notification of this to the customer database 32 of the network system 14 through the Internet 10. The customer database 32 overwrites the inputted personal information on the old personal information to update the personal information.

At this time, the customer database 32 further transmits the updated personal information to the video camera image station 41 of the network business center 15 through the Internet 10.

The video camera image station 41 updates the old personal information with the inputted personal information.

In this manner, if the personal information in the network system 14, network business center 15 and Internet service provider 17 is updated in any one of them, then this is reflected immediately on the real time basis on the other two.

After the user of the video camera 11 is registered into the customer database 32 of the network system 14 in such a manner as described above, the network system 14 thereafter issues a notification of various kinds of information regarding the video camera 11 to the user of the video camera 11 when necessary through the Internet 10 or by such means as a post card.

After the digital image customer registration process is completed in such a manner as described above, the ISP connection registration process is executed subsequently. In particular, when the customer registration process is completed, the customer registration web server 33 passes the management right for later processing for the video camera 11 to the customer database 52 of the Internet service provider 17.

Figure 10:
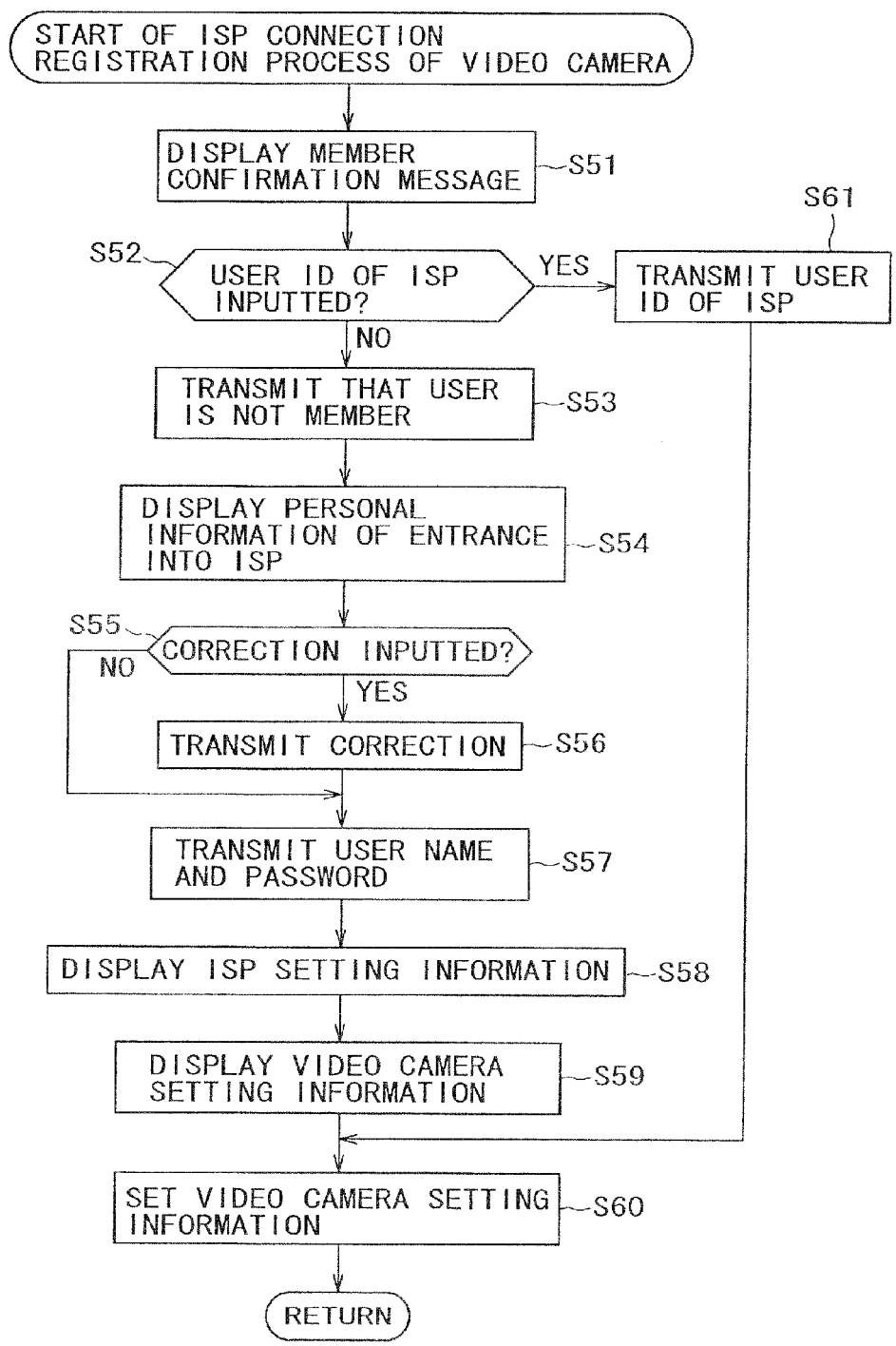
FIG. 10 is a flow chart illustrating an ISP connection registration process of the video camera of FIG. 1.

According, the ISP connection registration process is thereafter executed between the video camera 11 and the customer database 52 of the Internet service provider 17. FIG. 10 illustrates a process of the video camera 11 in this instance, and FIG. 11 illustrates a corresponding process of the customer database 52.

Figure 11:
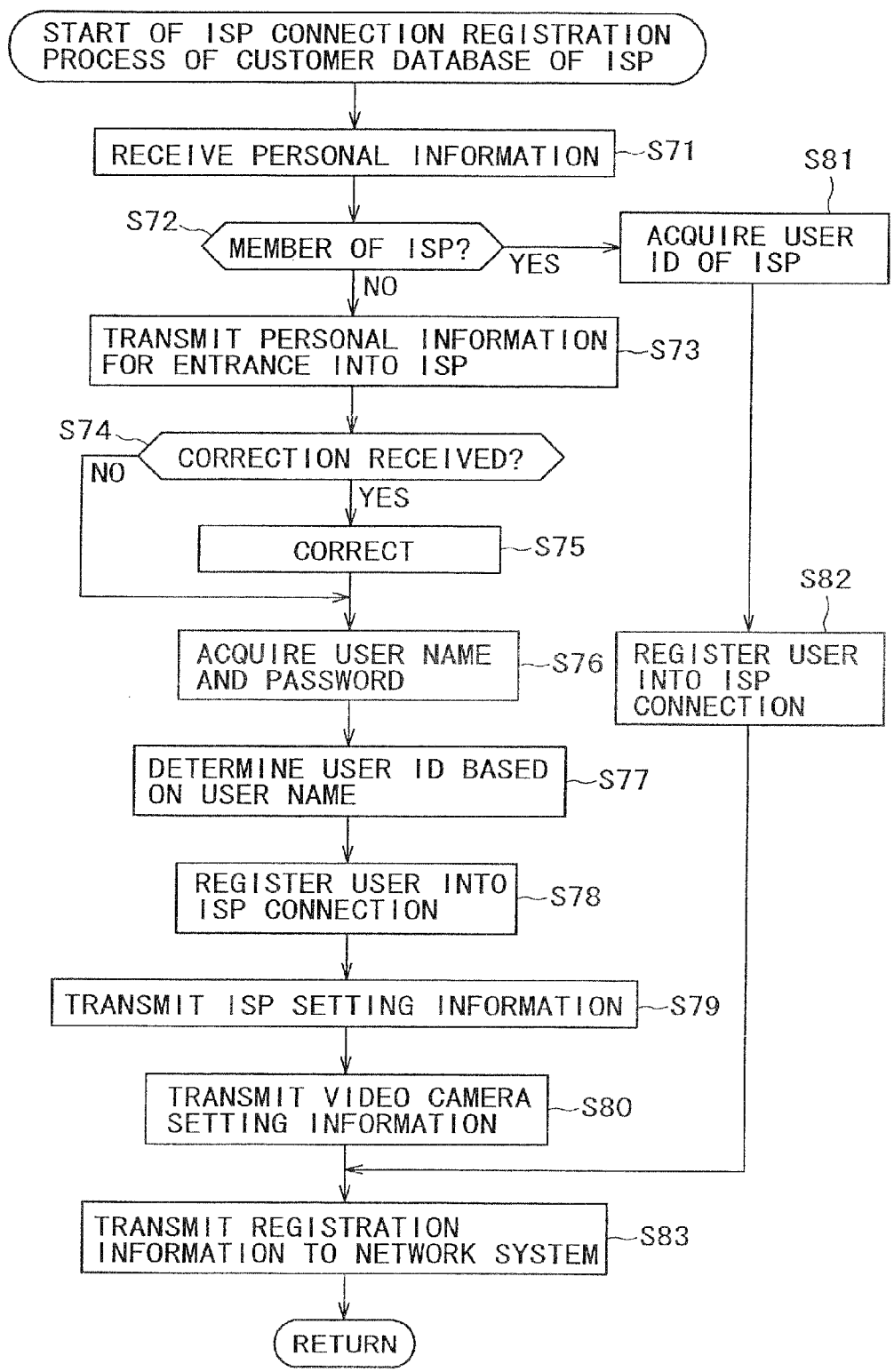
FIG. 11 is a flow chart illustrating an ISP connection registration process of the customer database of an Internet service provider of FIG. 1.

After the CPU 191 of the customer database 52 of the Internet service provider 17 receives the personal information transmitted from the customer database 32 of the network system 14 at step S35 of FIG. 9, it supplies the personal information to the storage section 198 so that the personal information is stored into the storage section 198 at step S71 of FIG. 11.

When the personal information of the video camera 11 is received at step S71, the customer database 52 of the Internet service provider 17 issues a request to the video camera 11 to input whether or not the user already is a member of the Internet service provider 17 and input, if the user is a member, the user ID of the Internet service provider 17.

The CPU 71 of the video camera 11 receives the request and outputs a corresponding message to the LCD unit 78 so that the message is displayed on the LCD unit 78 at step S51 of FIG. 10. The user will observe the display and operate, if the user itself is a member of the Internet service provider 17 already, the inputting section 77 to input its user ID. On the other hand, if the user is not a member, this will be inputted. The CPU 71 of the video camera 11 discriminates, at step S52, whether or not the user ID of the Internet service provider 17 is inputted. If it is inputted that the user is not a member of the Internet service provider 17, then the CPU 71 controls the communication section 82 to transmit a notification of this to the customer database 52 of the Internet service provider 17 at step S53.

The CPU 191 of the customer database 52 receives this input through the communication section 199 and discriminates that the user is not a member of the Internet service provider 17 at step S72 of FIG. 11. Thereafter, the processing advances to step S73, at which the CPU 191 causes personal information for entry into the Internet service provider 17 to be transmitted. As this personal information, the information transmitted from the network system 14 by the process at step S35 of FIG. 9 and received and stored at step S71 is used basically as it is.

The CPU 71 of the video camera 11 receives the personal information for entry into the Internet service provider 17 through the communication section 82 and outputs the personal information to the LCD unit 78 so that the personal information is displayed on the LCD unit 78 at step S54 of FIG. 10.

This personal information is basically free from an error because it was inputted by the user of the video camera 11 when it performed its user registration into the network system 14. However, to make sure, the user will observe the display and discriminate whether or not the personal information need be corrected. If the personal information need be corrected, then the user will operate the inputting section 77 to input correction.

Thus, at step S55, the CPU 71 of the video camera 11 discriminates whether or not correction is inputted. If correction is inputted, then the CPU 71 controls the communication section 82 to transmit the corrected item to the customer database 52 of the Internet service provider 17 at step S56. If correction is not inputted, then the process at step S56 is skipped.

The CPU 191 of the customer database 52 of the Internet service provider 17 discriminates at step S74 of FIG. 11 whether or not correction is received through the communication section 199. If correction is received, then the CPU 191 corrects the registered personal information based on the received contents of the correction at step S75. If correction is not received, then the process at step S75 is skipped.

As the personal information, the personal information when the user who purchased the video camera 11 performed its user registration into the network system 14 is displayed basically as it is as described hereinabove (from within the personal information, only that information which is necessary for the user to become an Internet service provider member is displayed). Accordingly, the user need not input items basically similar to the items which were inputted for user registration into the network system 14 again in order to become a member of the Internet service provider 17. Accordingly, the operability is improved.

Then at step S57, the CPU 71 of the video camera 11 controls the LCD unit 78 to display a message for urging the user to input a user name and a password in accordance with an input guidance from the customer database 52. The user of the video camera 11 will operate the inputting section 77 in accordance with the message to input the user name and the password which the user uses when it utilizes the Internet service provider 17. The CPU 71 controls the communication section 82 to transmit the user name and the password thus inputted to the customer database 52 of the Internet service provider 17.

The CPU 191 of the customer database 52 receives, at step S76, the user name and the password through the communication section 199 and discriminates based on the data stored in the storage section 198 whether or not the user name and the password are already used by some other user. If they are used, then a message representing this is transmitted from the communication section 199 to the video camera 11.

The CPU 71 of the video camera 11 receives the message through the communication section 82 and controls the LCD unit 78 to display the message. The user of the video camera 11 will observe the display, and if it discriminates that the user name and the password inputted are registered already, then it will input a new user name and a new password.

When the user name and the password are transmitted from the video camera 11 in such a manner as described above, the CPU 191 of the customer database 52 acquires them through the communication section 199 at step S76 of FIG. 11 and determines a user ID based on the user name at step S77. This user ID is a user ID as a member of the Internet service provider 17.

In the present service providing system, a common ID and a common password can be used in the network system 14, network business center 15 and Internet service provider 17. However, as described hereinabove, at the stage wherein user registration is performed into the network system 14, a temporary ID and a temporary password are already set to the user of the video camera 11 (at step S14 of FIG. 8, and at step S33 of FIG. 9).

In order to allow the user to enjoy a service provided by the Internet service provider 17 based on the temporary ID and the temporary password, the CPU 191 produces, at step S78, a table which describes a matching relationship for matching the temporary ID and the temporary password issued by the network system 14 at step S33 of FIG. 9 and received by the process at step S71 with the user ID determined at step S77, and registers the table into the ISP connection.

Consequently, when the user of the video camera 11 accesses the Internet service provider 17 based on the temporary ID and the temporary password issued from the network system 14 at step S33 of FIG. 9 and received by the video camera 11 at step S14 of FIG. 8, the customer database 52 searches for the user ID corresponding to the temporary ID and the temporary password from the table to allow the user of the video camera 11 to utilize a service provided by the Internet service provider 17.

When registration of the user of the video camera 11 as a member of the Internet service provider 17 is completed in such a manner as described above, the CPU 191 transmits, at step S79, setting information necessary for accessing to the Internet service provider 17 to the video camera 11.

The CPU 71 of the video camera 11 receives the Internet service provider setting information from the Internet service provider 17 and outputs it to the LCD unit 78 so that the Internet service provider setting information is displayed on the LCD unit 78 at step S58 of FIG. 10. Consequently, the user can confirm the Internet service provider setting information. The Internet service provider setting information describes, for example, as shown in FIG. 12, PPP login, a PPP password, an access point telephone number, a POP ID, a POP password, an E-mail address, a POP server, an SMTP mail server, a news server and so forth.

The user of the video camera 11 will take a note of the contents shown in FIG. 12 when necessary and operate the inputting section 77 to output a signal of confirmation to the Internet service provider 17.

The customer database 52 of the Internet service provider 17 transmits video camera setting information at step S80.

The video camera 11 receives the video camera setting information and controls the LCD unit 78 to display the camera setting information at step S59 of FIG. 10.

FIG. 13 illustrates an example of the video camera setting information transmitted from the customer database 52 to the video camera 11 in this manner. In the example illustrated, the video camera setting information is composed of a DI customer ID, a DI password and an access point telephone number.

The access point telephone number represents a telephone number of a point to be accessed when the video camera 11 establishes a connection to the Internet 10, more particularly of the access point 51 of the Internet service provider 17.

The user of the video camera 11 will operate the inputting section 77 to set the video camera setting information displayed in this manner as a requirement for connection to the Internet 10 to the video camera 11 at step S60 of FIG. 10. This setting is stored into the EEPROM 74.

For example, in order for the user who has purchased a personal computer to establish a connection to the Internet 10 through a general service provider (in the example of FIG. 2, the Internet service provider 18), it must set such totaling 12 items including an ID for PPP connection, a password for PPP connection, an access point telephone number, a Primary DNS server, a Secondary DNS server, a Proxy Server, a Port Number, an ID for POP authentication, a password for POP authentication, a POP server, an SMTP server and a mail address as shown in FIG. 14A. However, as described above, where the user who has purchased the video camera 11 performs the ISP connection registration process, it is necessary for the user of the video camera 11 only to set such three items including a Unified ID (which corresponds to the DI customer ID in FIG. 13), a password (which corresponds to the DI password in FIG. 13) and an access point telephone number (which corresponds to the access point telephone number in FIG. 13) as shown in FIG. 14B. Accordingly, even if the user is unfamiliar to such setting operation, it can perform operation for connection to the Internet simply.

Where the user itself of the video camera 11 is a member of the Internet service provider 17 already, it will operate the inputting section 77 based on the request from the customer database 52 to input the user ID of the Internet service provider 17. Thus, in this instance, the CPU 71 of the video camera 11 acquires the user ID of the Internet service provider 17 inputted from the user and controls the communication section 82 to transmit the user ID of the Internet service provider 17 to the customer database 52 at step S61 of FIG. 10.

The CPU 191 of the customer database 52 of the Internet service provider 17 receives and acquires the user ID of the Internet service provider 17 transmitted from the video camera 11 at step S81 of FIG. 11, and produces a table which describes a matching relationship between the Internet service provider ID of the user and the temporary ID and the temporary password included in the personal information of the user received by the process at step S71 and registers the table into the ISP connection at step S82.

The user will operate the inputting section 77 to set the video camera setting information as a requirement for connection to the Internet 10 at step S60 to the video camera 11. This setting is stored into the EEPROM 74. In order to allow the user to enjoy a service of the Internet service provider 17 based on the temporary ID and the temporary password, the CPU 191 produces a table which describes a matching relationship for matching the temporary ID and the temporary password issued from the network system 14 at step S33 of FIG. 9 and received by the process at step S71 with the Internet service provider ID of the user and registers the table into the ISP connection. at step S82.

The CPU 191 of the customer database 52 advances its processing after the process at step S80 or S82 of FIG. 11 to step S83, at which it transmits the information registered by the processing till then or, where the registration information is updated by the user, the updated information, to the network system 14.

The registration authentication platform 34 of the network system 14 receives the registration information from the Internet service provider 17 and registers it into the customer database 32. Further, the registration authentication platform 34 transmits the registration information to the video camera image station 41 of the network business center 15 so that the registration information may be reflected on the video camera image station 41.

Figure 15:
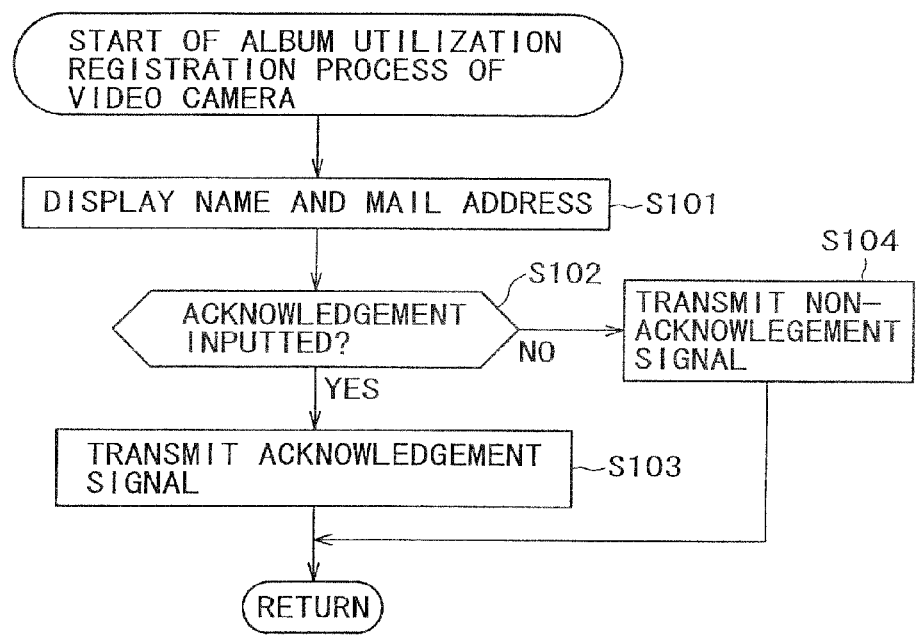
FIG. 15 is a flow chart illustrating an album utilization registration process of the video camera of FIG. 1.

Subsequently to such an ISP connection registration process, the album utilization registration process is executed. The album utilization registration is further described with reference to flow charts of FIGS. 15 and 16. FIG. 15 illustrates an album utilization registration process of the video camera 11 while FIG. 16 illustrates a corresponding album utilization registration process of the video camera image station 41.

After the simple registration process of the Internet service provider, the CPU 191 of the customer database 52 of the Internet service provider 17 passes the management right for processing of the video camera 11 to the video camera image station 41 of the network business center 15.

Figure 16:
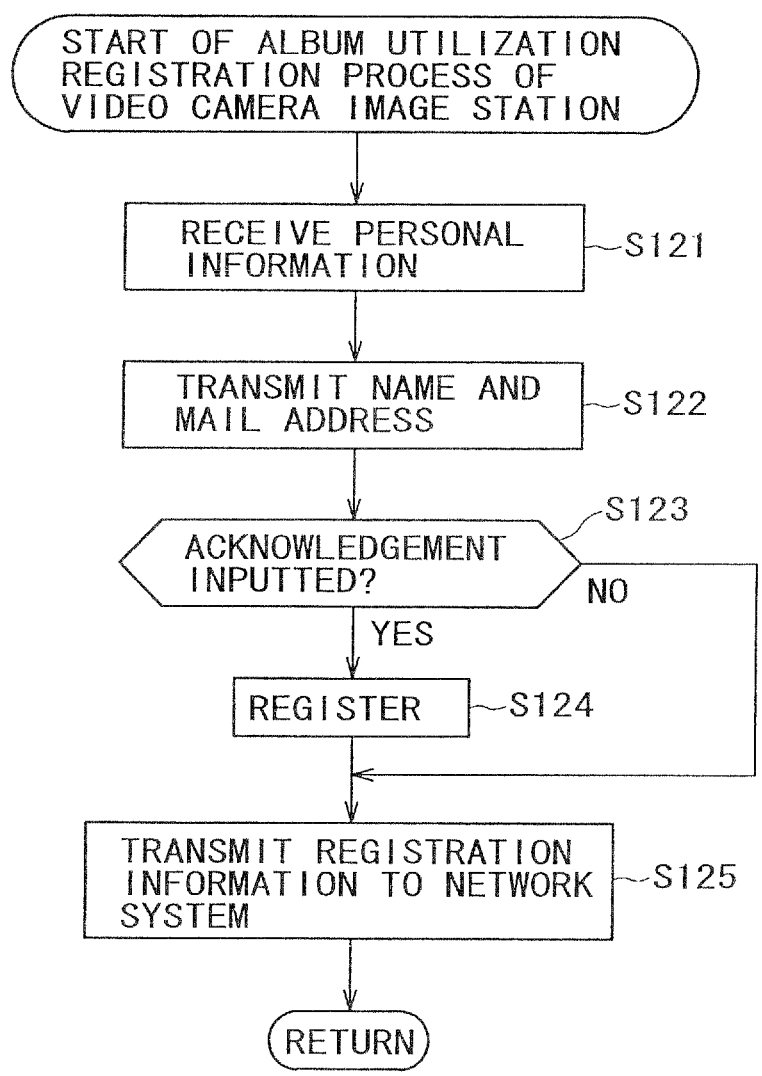
FIG. 16 is a flow chart illustrating an album registration utilization process of the image station for a video camera of FIG. 1.
Figure 34:
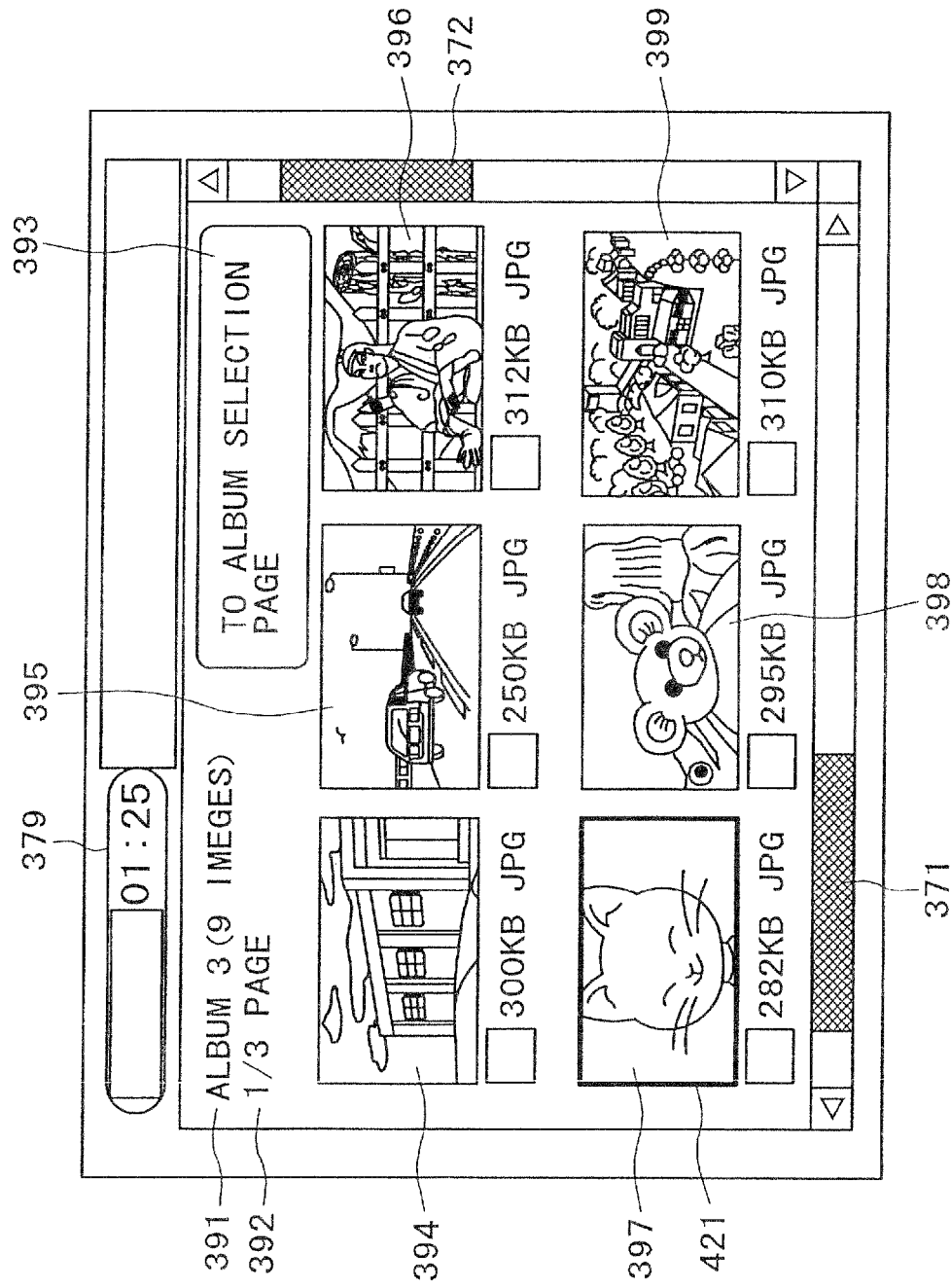
FIG. 34 is a view showing a further example of a screen displayed at step S169 of FIG. 23.

The CPU 151 of the video camera image station 41 receives the personal information of the video camera 11 transmitted from the customer database 32 of the network system 14 at step S34 of FIG. 34 through the communication section 159 and supplies the personal information to the storage section 158 so that the personal information is stored into the storage section 158 at step S121 of FIG. 16. The CPU 151 reads out the name and the mail address of the received personal information and transmits them to the video camera 11 at step S122.

After the CPU 71 of the video camera 11 receives the name and the mail address from the video camera image station 41, it outputs them to the LCD unit 78 so that they are displayed on the LCD unit 78 at step S101. The user of the video camera 11 will observe the display to discriminate whether or not the name and the mail address of the user itself are correct. It is to be noted that the mail address (E-mail address) is an E-mail address (FIG. 12) set in the member registration into the Internet service provider 17.

When the user of the video camera 11 confirms that the name and the mail address are correct, it will operate the inputting section 77 to input, if it acknowledges that the name and the mail address are used for album utilization registration, this. Thus, at step S102, the CPU 71 discriminates whether or not acknowledgement is inputted. If acknowledgement is inputted, then the processing advances to step S103, at which the CPU 71 causes an acknowledgement signal corresponding to the input to be transmitted to the video camera image station 41.

On the other hand, if the user does not acknowledge the album utilization registration, then the user will operate the inputting section 77 to input this. At this time, the CPU 71 causes a non-acknowledgement signal, which represents that the album utilization registration has not been acknowledged, to be transmitted to the video camera image station 41 at step S104.

The CPU 151 of the video camera image station 41 discriminates at step S123 of FIG. 16 whether or not an acknowledgement signal is inputted. If an acknowledgement signal is inputted, then the processing advances to step S124, at which the personal information received at step S121 is stored into the storage section 158.

On the other hand, if it is discriminated at step S123 that an acknowledgement signal is not inputted, then the process at step S124 is skipped.

The personal information corresponding to the temporary ID and the temporary password issued by the network system 14 is registered into the video camera image station 41 in this manner.

Thereafter, at step S125, the CPU 151 of the video camera image station 41 transmits, if it is inputted from the user that the registration information should be updated, this to the network system 14.

The customer database 32 of the network system 14 registers the update information into the customer database 32 itself and transmits it to the customer database 52 of the Internet service provider 17 so that it is registered into the customer database 52.

It is to be noted that, after the temporary ID and the temporary password are issued, the customer database 32 of the network system 14 sends a post card, on which the regular ID and the regular password are carried, to the address of the user. When the user receives the post card, it will replace the temporary ID and the temporary password with and utilize the regular ID and the regular password.

After the regular ID and the regular password are issued, the customer database 32 transmits them to the network business center 15 and the Internet service provider 17 through the Internet 10. In the network business center 15 and the Internet service provider 17, the regular ID and the regular password are registered individually. The temporary ID and the temporary password can be utilized only for a predetermined period of time (for example, for two weeks) after they are issued, and the network system 14, network business center 15 and Internet service provider 17 individually consider the temporary ID and the temporary password valid only for two weeks and reject accessing thereof if the temporary ID and the temporary password are used after the valid period elapses.

It is to be noted that, while, in the foregoing description, user registration is performed from the video camera 11 into the network system 14, it is otherwise possible to perform registration from a personal computer through the Internet 10 or registration by a post card.

Figure 17:
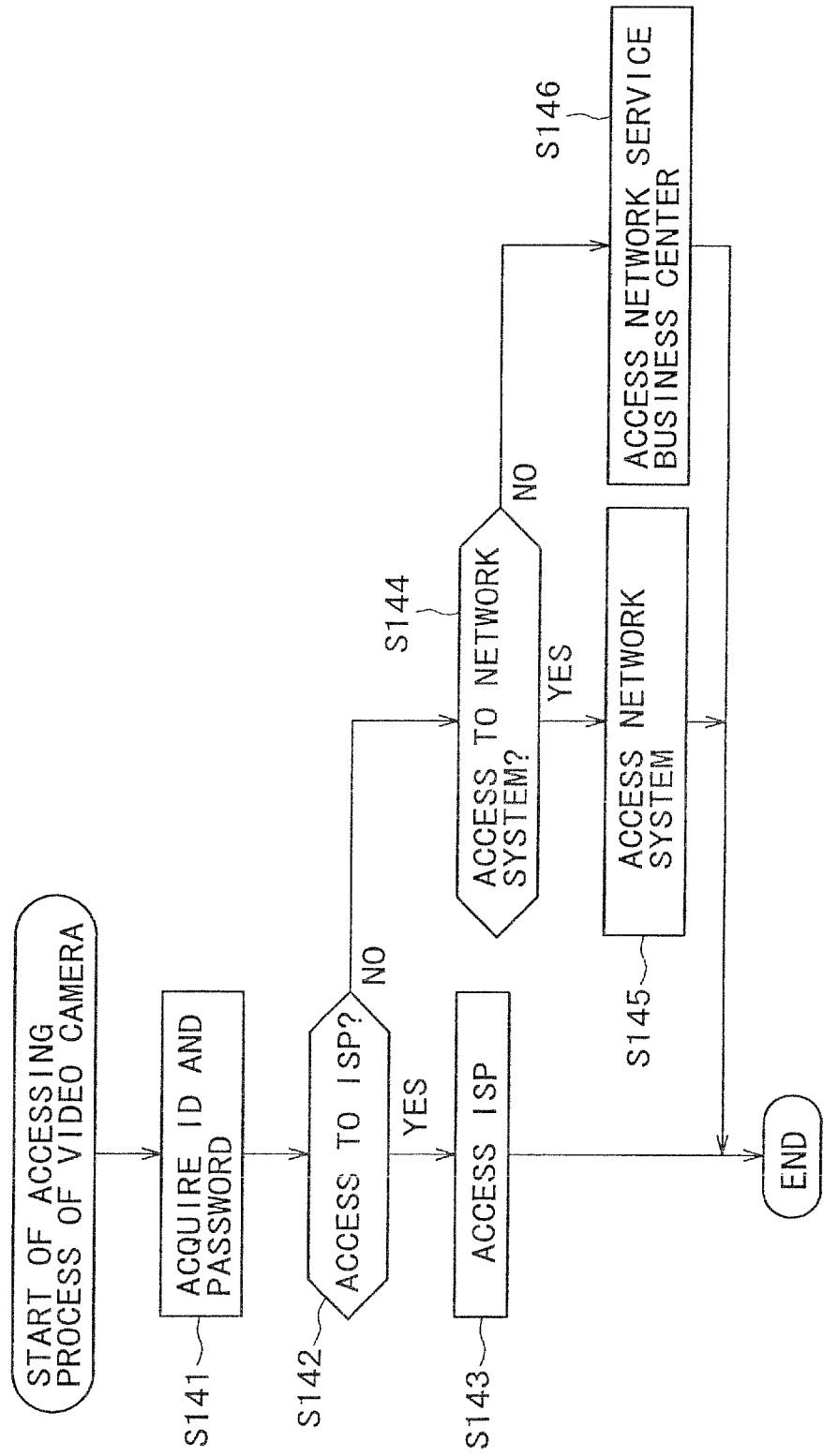
FIG. 17 is a flow chart illustrating an access process of the video camera of FIG. 1.

Subsequently, a process when the video camera 11 establishes a connection to the network system 14, network business center 15 or Internet service provider 17 is described with reference to a flow chart of FIG. 17. The user will operate the inputting section 77 to input the temporary ID and the temporary password allocated upon user registration into the network system 14 (or the regular ID and the regular password set later). At step S141, the CPU 71 acquires the ID and the password inputted based on the operation of the inputting section 77 by the user. Further, at step S142, the CPU 71 discriminates whether or not the access destination designated by the user is the Internet service provider 17.

If the access destination is the Internet service provider 17, then the processing advances to step S143, at which the CPU 71 executes a process of using the inputted ID and password to access the Internet service provider 17.

If it is discriminated at step S142 that the access designation is not the Internet service provider 17, then the processing advances to step S144, at which the CPU 71 discriminates whether or not the access destination is the network system 14. If the access destination is the network system 14, then the processing advances to step S145, at which the CPU 71 access the network system 14 based on the guest ID and password stored in advance in the ROM 72. Similarly, if it is discriminated at step S144 that the access destination is not the network system (if it is discriminated that the access destination is the network business center 15), the processing advances to step S146, at which the CPU 71 makes use of the ID and the password acquired at step S141 to access the network business center 15 through the Internet service provider 17.

Figure 18:
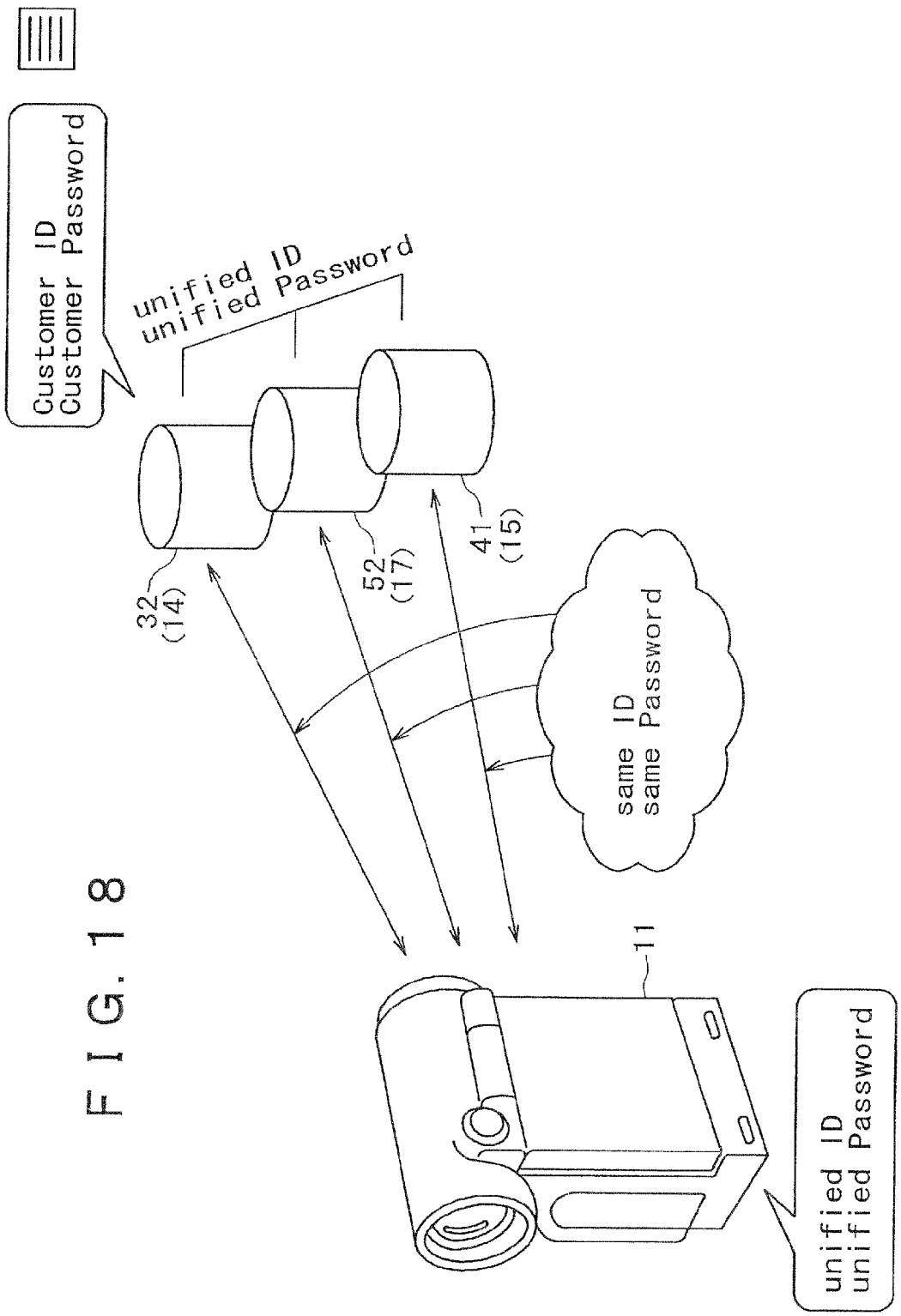
FIG. 18 is a view illustrating utilization of a unified ID and password.
Figure 22:
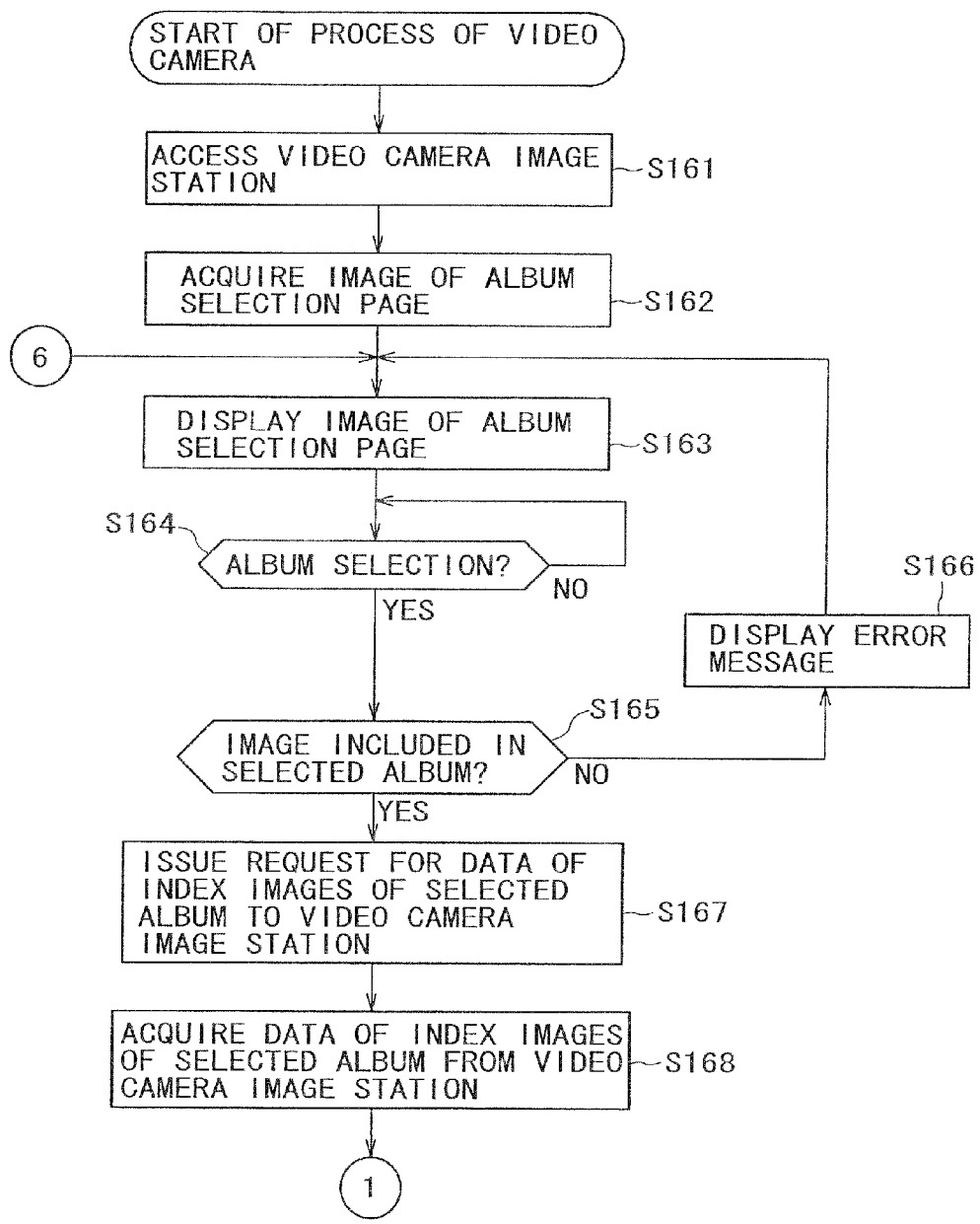
FIG. 22 is a flow chart illustrating an editing/reading process of the video camera of FIG. 1.
Figure 24:
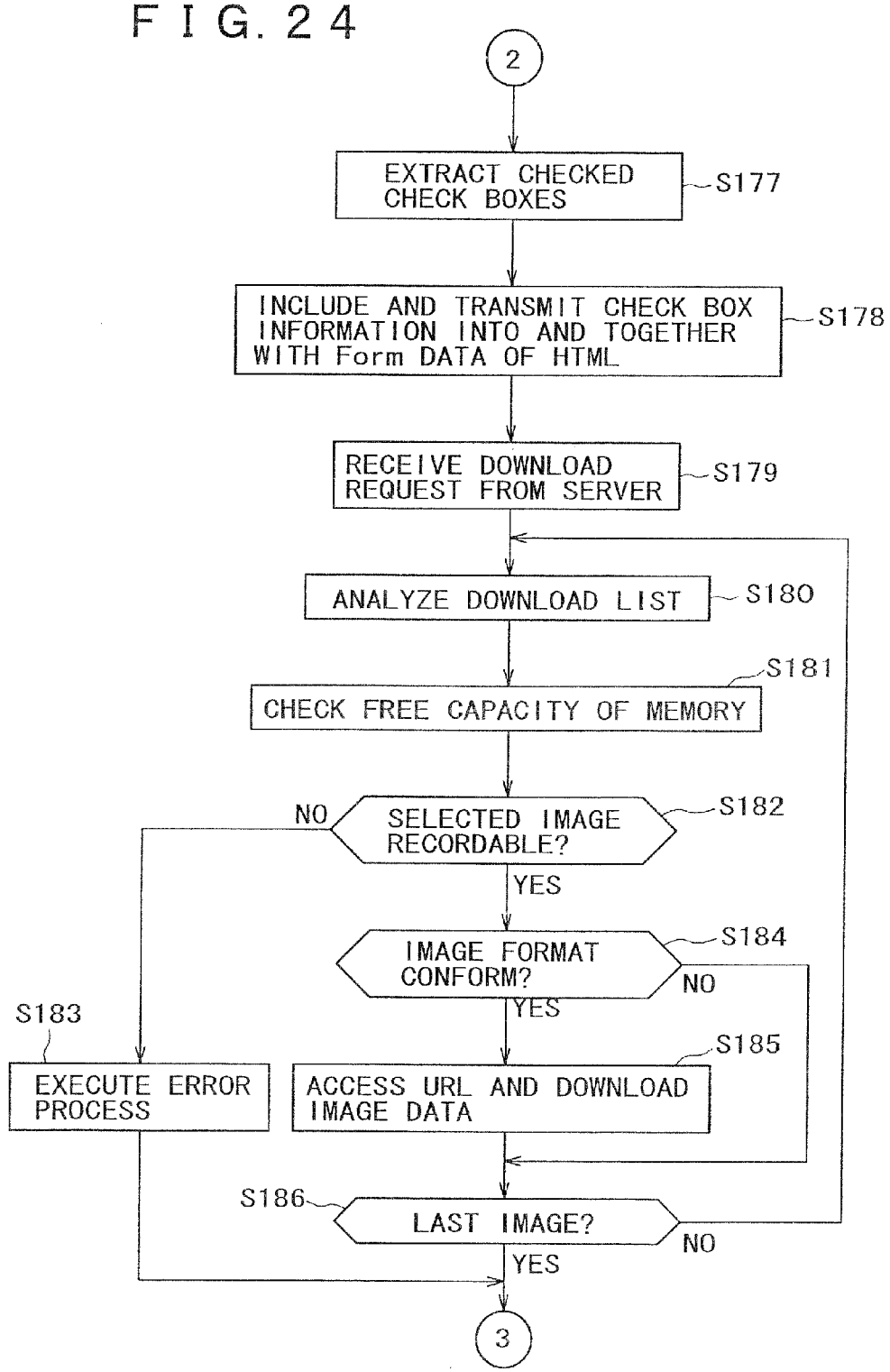
FIG. 24 is a flow chart continuing from that of FIG. 23 illustrating the editing/reading process of the video camera of FIG. 1.
Figure 25:
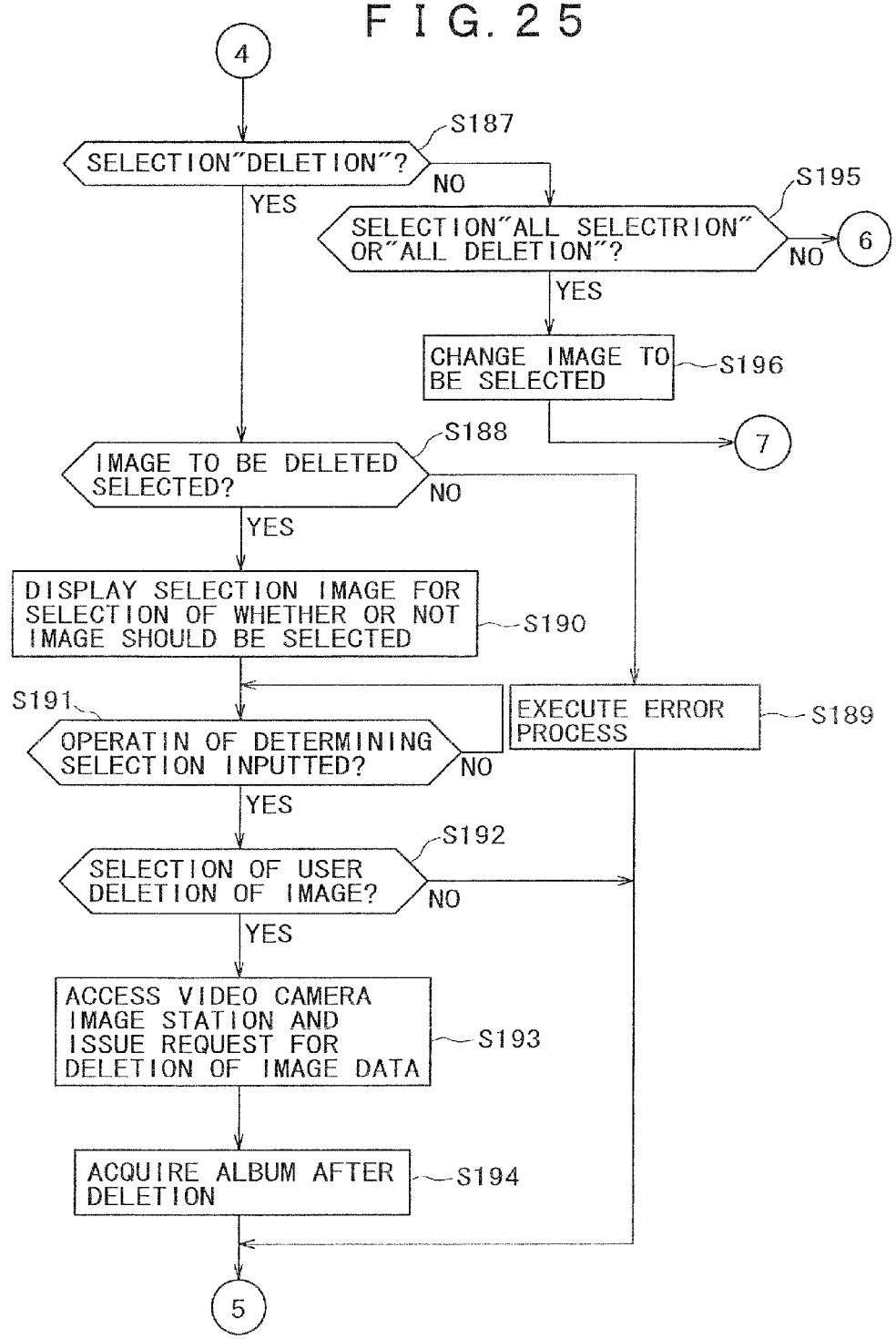
FIG. 25 is a flow chart continuing from that of FIG. 23 illustrating the editing/reading process of the video camera of FIG. 1.

In this manner, in the present service providing system, the user can enjoy a service provided using a temporary ID and a temporary password (same ID and password) issued upon user registration into the network system 14 as the IDs and the passwords for the network system 14, network business center 15 and Internet service provider 17 as seen in FIG. 18.

Incidentally, the user can transmit (upload) image data such as moving pictures or still pictures picked up by the video camera 11 and stored in the memory card 85 so that the image data are stored into the video camera image station 41. The video camera image station 41 stores image data separately for different users in the storage section 158. When a user stores image data into the storage section 158 of the video camera image station 41, each user has an upper limit (for example, 500 MB) to the storage capacity available to the user, and the user can freely store image data or read, download or delete stored image data within the range of the storage capacity.

It is to be noted that the user can store not only image data picked up using the video camera 11 but also image data picked up using some other image pickup apparatus or image data acquired through the Internet 10 into the video camera image station 41.

Further, each user of the video camera image station 41 can store a plurality of image data for each user in a form classified in some of 10 groups. Therefore, when a user wants to read particular image data from among the stored image data, it can operate the video camera 11 in such a sense as to pick up and read a desired album (group) from among several albums (groups) arranged for individual themes, and can register or search out desired image data rapidly.

It is to be noted that such a group as mentioned above is hereinafter referred to as album.

If the user operates the inputting section 77 to issue an instruction to read out a still image fetched by the image pickup element 80 and recorded on the memory card 85, then the CPU 71 reads out the image recorded on the memory card 85 and causes the LCD unit 78 to display the image. FIG. 19 illustrates an example of a display in this instance. Referring to FIG. 19, a battery remaining amount indication 301 is displayed at a left upper portion, and an image ID 302 is displaced just below the battery remaining amount indication 301, and the consecutive number of the displayed image and an image number 303 representative of the number of images stored in the memory card 85 are displayed at a right upper portion. In particular, the battery remaining amount indication 301 displays the remaining capacity of a battery (not shown) which serves as a power supplying source when the video camera 11 is driven. The image ID 302 of "DSC00034" is an identification number which is automatically allocated to the picked up image by the CPU 71. The image number 303 "29/30" represents that 30 image data are recorded in the memory card 85 and what is currently displayed on the LCD unit 78 is image data picked up 29th among them.

At a lower portion of FIG. 19, a minus button 304, a plus button 305, a network button 306, an image pickup button 307, an index button 308 and a function button 309 are displayed in order from the left (in the following description, a button displayed on the LCD unit 78 like the buttons mentioned is referred to as displayed button). The user can operate a predetermined button of the inputting section 77 to adjust a cursor to an arbitrary one of such displayed buttons and decide it so that a process corresponding to the selected displayed button is performed. When the cursor is adjusted, the display color of the displayed button changes to a different color, and therefore, the user can identify that the cursor is adjusted to the displayed button (identify the cursor from the color).

If the user inputs a predetermined operation from the inputting section 77 (operates a +button not shown) to select the minus button 304, then the CPU 71 reads out image data whose consecutive number is smaller by one than that of the image which has been displayed till then from the memory card 85 and controls the LCD unit 78 to display the image data. However, when the minus button 304 is selected, if the consecutive number of the image having been displayed is 1, the CPU 71 reads out image data having the greatest consecutive number from the memory card 85 and causes the image data to be displayed.

If the user inputs a predetermined operation from the inputting section 77 and selects the plus button 305, the CPU 71 reads out image data having a consecutive number greater by one than that of image data having been displayed till then from the memory card 85 and causes the image data to be displayed. However, when the plus button 305 is selected, if the consecutive number of the image having been displayed is the greatest consecutive number, the CPU 71 reads out image data whose consecutive number is 1 from the memory card 85 and causes the image data to be displayed.

If an operation for selecting the image pickup button 307 of FIG. 19 is inputted through the inputting section 77, the CPU 71 starts a series of processes for driving the image pickup element 80 so that an image of an image pickup object can be picked up.

If the index button 308 is selected, then the CPU 71 controls the LCD unit 78 to display indices to image data (including still pictures and moving pictures) recorded on the memory card 85 as displayed buttons. If one of the displayed buttons of the displayed indices is selected, then the CPU 71 reads out image data corresponding to the selected displayed button from the memory card 85 and controls the LCD unit 78 to display the image data.

If the function button 309 is selected, then the CPU 71 controls the LCD unit 78 to display a screen for guiding a change in setting of various functions of the video camera 11 such as, for example, selective setting of an image pickup method in accordance with an image pickup environment, erasure of picked up image data and time setting.

If the network button 306 is selected, then the CPU 71 controls the LCD unit 78 to change over the screen displayed on the LCD unit 78 from the screen of FIG. 19 to such a screen of a network menu as shown in FIG. 20. In FIG. 20, a screen title 321 is displayed at an upper portion of the screen, and a mail button 322, a Web album button 323, a browser button 324 and a setting button 325 are displayed at a central portion of the screen while an end button 326 is displayed at a right lower portion of the screen. If the user inputs a predetermined operation from the inputting section 77 to select the mail button 322, then the CPU 71 starts a series of processes for performing transmission and reception of an electronic mail through the Internet service provider 17. If the browser button 324 is selected by the user, then the CPU 71 establishes a connection to the information providing server 19 or the search server 20 desired by the user through the Internet 10 and controls the LCD unit 78 to display information acquired through the connection.

If the Web album button 323 is selected by the user, then the CPU 71 accesses the video camera image station 41 of the network business center 15 to execute an image reading/editing process which is hereinafter described.

If the setting button 325 is selected by the user, then the CPU 71 starts a process of changing the setting of one of the video camera 11, network system 14, Internet service provider 17 and network business center 15 regarding the network functions (functions including the functions regarding a mail, a browser and a Web album described above). If the end button 326 is selected by the user, then the CPU 71 ends the display of the screen of FIG. 20 and restores the screen of FIG. 19.

If the user selects the Web album button 323 on the display example of FIG. 20 through a predetermined operation of the inputting section 77, then the CPU 71 controls the LCD unit 78 to display such a screen of a Web album menu as shown in FIG. 21. In particular, in the display example of FIG. 21, a screen title 331, and an upload button 332, a reading/editing button 333 and an end button 334, which are displayed buttons, are displayed. If a predetermined operation is inputted from the inputting section 77 to select the upload button 332, then the CPU 71 starts a series of upload processes of supplying image data including still pictures and moving pictures stored in the memory card 85 to the Web album managed by the video camera image station 41 so that the image data are stored into the Web albums.

If the user adjusts the cursor to the reading/editing button 333 and decides it, then a series of processes regarding reading and editing of a Web album which are hereinafter described are started. If the end button 334 is selected, then the CPU 71 erases the screen of FIG. 21 displayed on the LCD unit 78 to restore the screen of FIG. 20.

Figure 26:
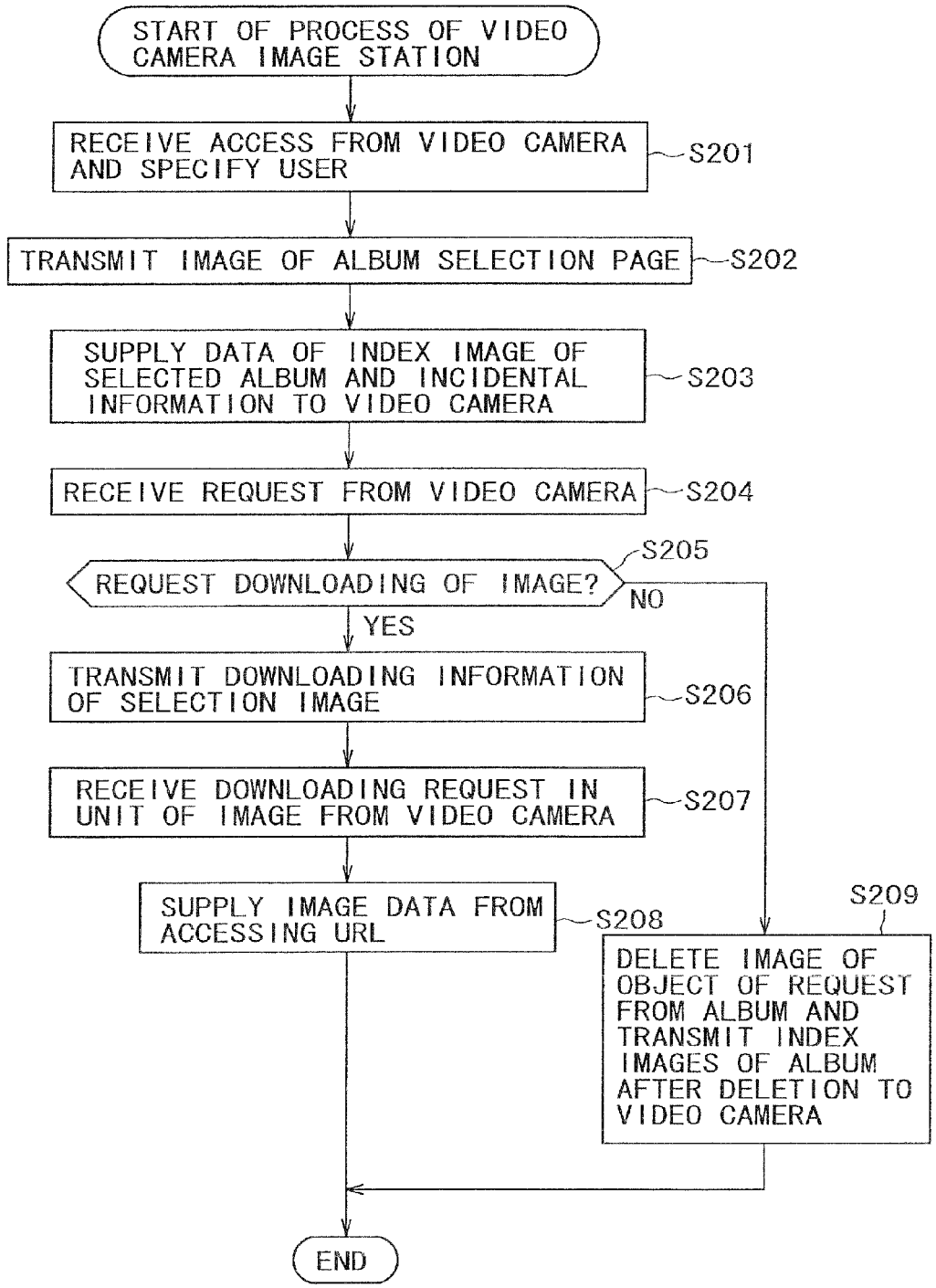
FIG. 26 is a flow chart illustrating a process of the image station for a video camera of FIG. 1 corresponding to the editing/reading process of the video camera of FIG. 1.

Subsequently, an image data reading and editing process in which the video camera 11 is used is described with reference to flow charts of FIGS. 22 to 26. FIGS. 22 to 25 illustrate a process of the video camera 11 when a reading/editing process is performed while FIG. 26 illustrates a corresponding process of the video camera image station 41.

If it is assumed that the user selects the reading/editing button 333 on the display example of FIG. 21, then the CPU 71 performs the series of accessing processes described hereinabove with reference to the flow chart of FIG. 17 to access the video camera image station 41 of the network business center 15 and issue a request to transmit an image of an album selection page at step S161.

It is to be noted that communication from the video camera 11 to the video camera image station 41 is performed from the Bluetooth adapter 12 through the public network 13, access point 51 of the Internet service provider 17 and the Internet 10 after the communication section 82 of the video camera 11 performs short distance radio communication with the Bluetooth adapter 12. On the contrary, communication from the video camera image station 41 to the video camera 11 is performed to the communication section 82 of the video camera 11 through the Internet 10, access point 51 of the Internet service provider 17, public network 13 and Bluetooth adapter 12. Transmission/reception between the video camera 11 and the video camera image station 41 are performed basically along this communication paths.

In the following description, where there is no necessity to provide particular description, description of the Bluetooth adapter 12, public network 13, access point 51 of the Internet service provider 17, and Internet 10 is omitted.

Figure 27:
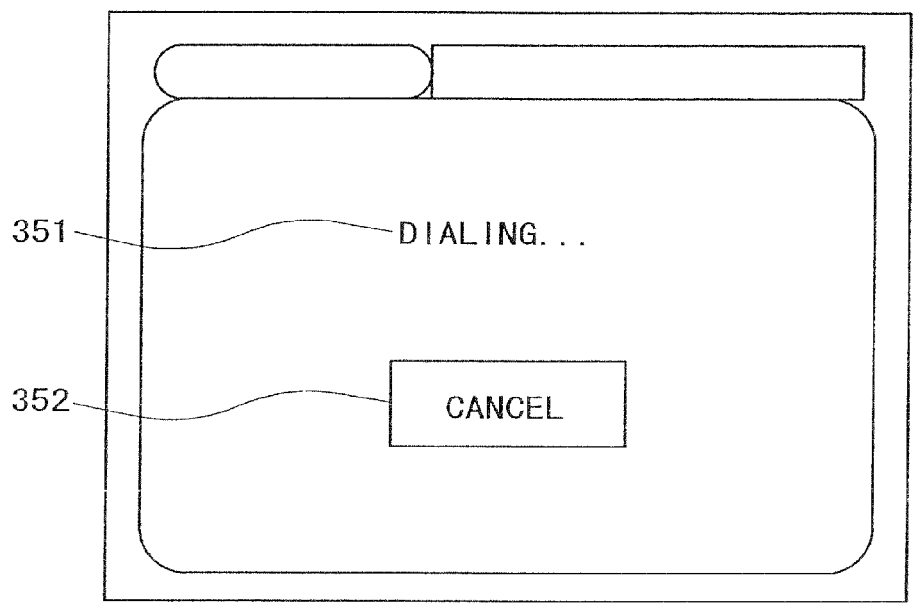
FIG. 27 is a view showing an example of a screen displayed on the LCD after a reading/editing button of FIG. 21 is selected.

Until after a communication line between the video camera 11 and the video camera image station 41 is connected, the CPU 71 of the video camera 11 controls the LCD unit 78 to display such an image as shown in FIG. 27. In the example of FIG. 27, a guide indication 351 of "Dialing..." is displayed. While the screen shown in FIG. 27 is displayed, the user can interrupt accessing to the video camera image station 41 at any time by selecting a cancel button 352 at the lower portion. If the cancel button 352 is operated, then the CPU 71 returns the screen to be displayed on the LCD unit 78 to the screen shown in FIG. 21.

If the video camera image station 41 of the network business center 15 is accessed from the video camera 11 through the communication section 159, then the CPU 151 refers to the personal information of the users stored in the storage section 158 to specify the user from the ID and the password included in the access information at step S201.

Figure 28:
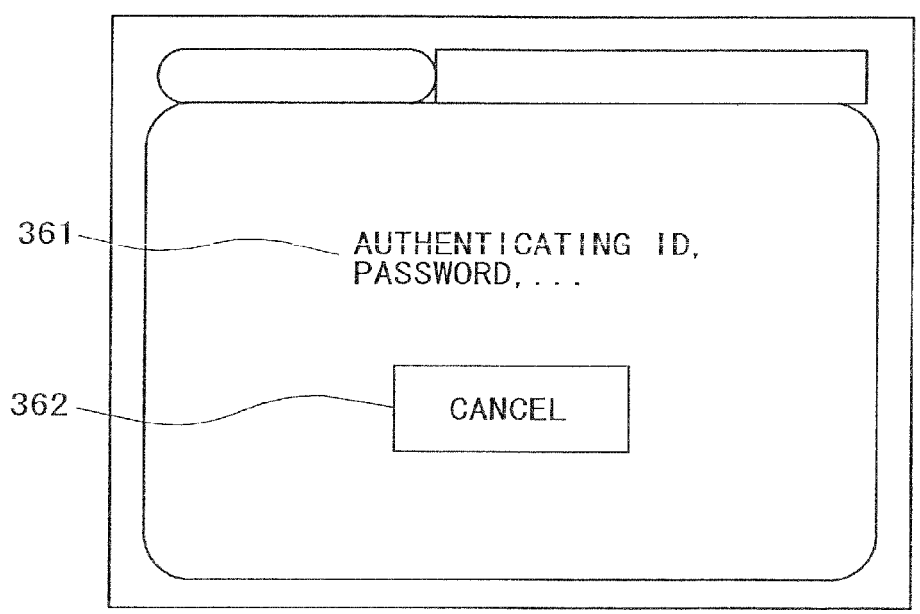
FIG. 28 is a view showing an example of a screen displayed on the LCD after the screen of FIG. 27 is displayed.

While the video camera image station 41 performs a process of specifying the user, the CPU 71 of the video camera 11 controls the LCD unit 78 to display a guide indication 361 of "Authenticating the ID and the password" as shown in FIG. 28. It is to be noted that, while the screen shown in FIG. 28 is displayed, the user can select a cancel button 362 at a lower portion to interrupt the communication with the video camera image station 41 at any time. When the cancel button 362 is operated, the CPU 71 returns the screen to be displayed on the LCD unit 78 to the screen shown in FIG. 21.

The video camera image station 41 manages registered users and albums of the individual users in a matching relationship, and at step S202, the CPU 151 of the video camera image station 41 reads out an image of the album selection page corresponding to the user specified at step S201 and incidental information to each album from the storage section 158 and transmits them to the video camera 11.

The CPU 71 of the video camera 11 acquires the image of the album selection page and the incidental information supplied from the video camera image station 41 through the communication section 82 at step S162, and controls the LCD unit 78 to display the image of the album selection page and urge the user to select an album at step S163.

Figure 29:
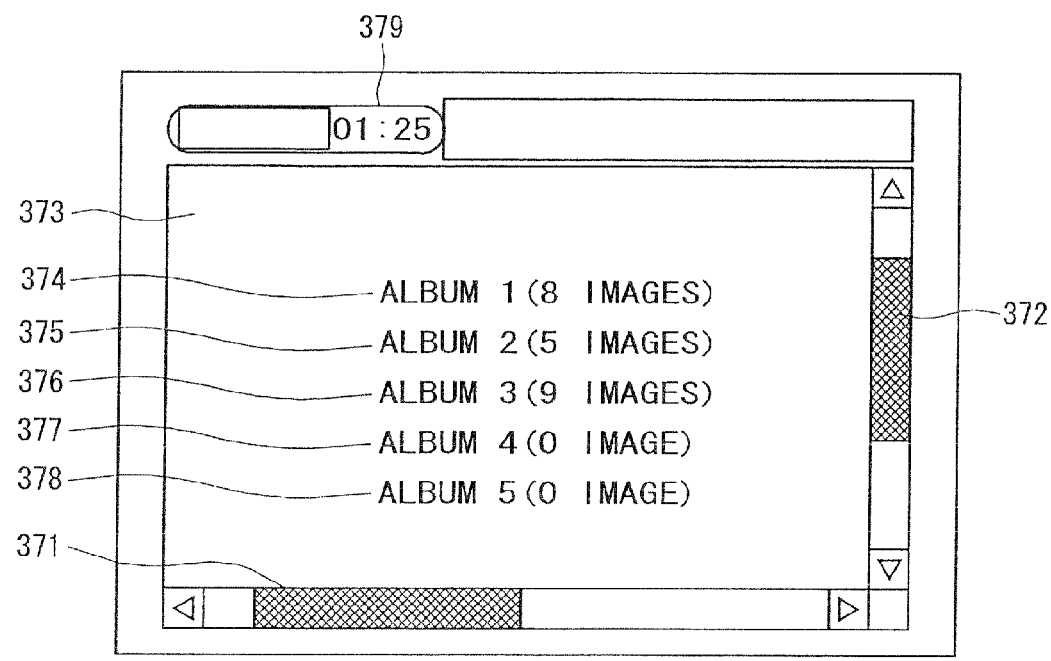
FIG. 29 is a view showing an example of an album selection page screen displayed on the LCD.

FIG. 29 shows an example of an image of the album selection page displayed on the LCD unit 78. Referring to FIG. 29, a horizontal scroll bar 371 and a vertical scroll bar 372 are displayed on the screen. In the screen 373, album indices 374 to 378 are displayed. Further, a time indication 379 for indicating the connection time to the present time is displayed at an upper portion of the screen.

It is to be noted that, while the time indication 379 is displayed also in the drawings used in the following description, description thereof is omitted suitably to avoid redundancy.

If the user inputs a predetermined operation to move the bar of the horizontal scroll bar 371 in a horizontal direction or move the vertical scroll bar 372 in a vertical direction, then the CPU 71 causes the display of the screen 373 to be scrolled in the horizontal or vertical direction.

When the user stores image data into the video camera image station 41, it can select a desired album from among a plurality of albums and store the image data into the selected album, and the album indices 374 to 378 are indices of the albums into which image data are to be stored in this manner.

An "Album 1 (8 images)" displayed on the album index 374 represents that the album name is "Album 1" and the number of images included in the Album 1 is 8. The album name may be varied to a name desired by the user by inputting a predetermined operation from the inputting section 77. Also the indications of the album indices 375 to 378 each represents an album name and the number of images included in the album similarly.

While, in FIG. 29, five album indices having album names of Album 1 to Album 5 are displayed, by scrolling the screen downwardly by a predetermined operation of the inputting section 77, album indices for the Album 6 and so forth (for example, up to the Album 10) can be displayed.

It is to be noted that the number of albums is not limited to the number (10) specified as above, but can be set arbitrarily by an undertaker by which the video camera image station 41 is managed.

At step S164, the CPU 71 of the video camera 11 waits until an operation of selecting an album by the user is inputted from the inputting section 77.

Figure 30:
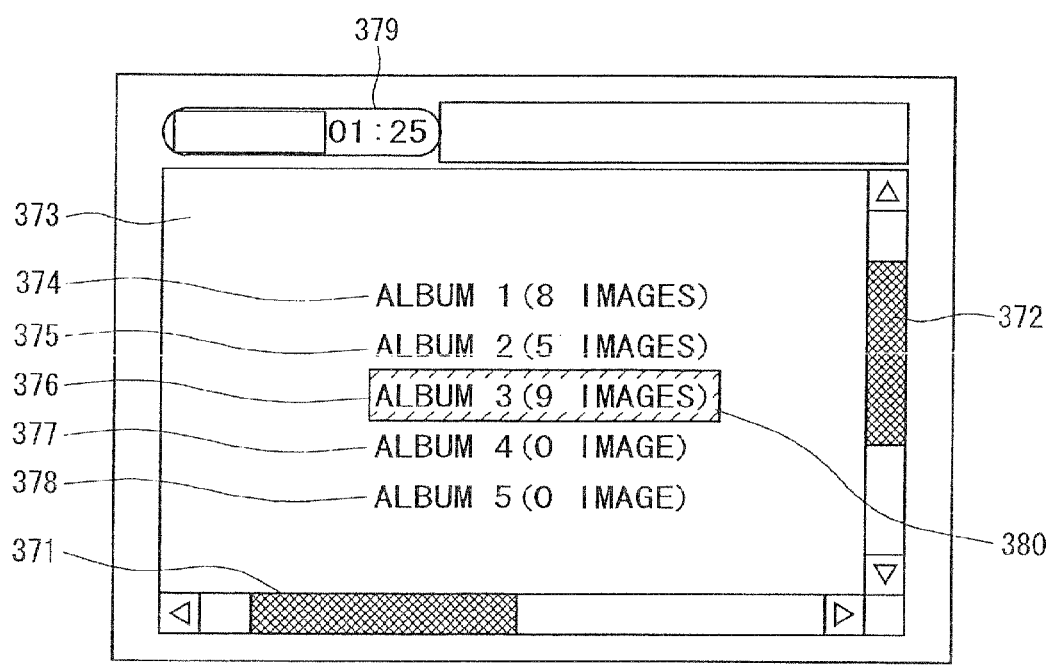
FIG. 30 is a view showing an example of an album selection page screen wherein a cursor is on an album.

FIG. 30 shows an example of a screen displayed on the LCD unit 78 in a waiting state. The screen is same as that of FIG. 29 except that a cursor 380 is adjusted to the album index 376. The user can select an album by adjusting the cursor 380 to an album to be read and edited by a predetermined operation of the inputting section 77, and when the cursor 380 is adjusted to an album, the album is displayed in a distinct manner from the other album indices.

On the album selection page, the number of image data included in each album is displayed on the right side of the name, and an album in which no image data is stored, that is, an album with regard to which "0 image" is displayed in the parentheses on the right side (for example, the "Album 4" of the album index 377), can be distinguished at a glance. However, the user may possibly select the album in error.

Therefore, if the user inputs an operation of adjusting the cursor 380 to a desire album (for example, the album index 377) from the inputting section 77, then the CPU 71 discriminates, at step S165, based on incidental information acquired from the video camera image station 41 at step S162 and corresponding to the individual albums, whether or not the selected album includes one or more images. If it is discriminated that the selected album includes no image, then the processing advances to step S166, at which the CPU 71 controls the LCD unit 78 to display such an error message as shown in FIG. 31.

Figure 31:
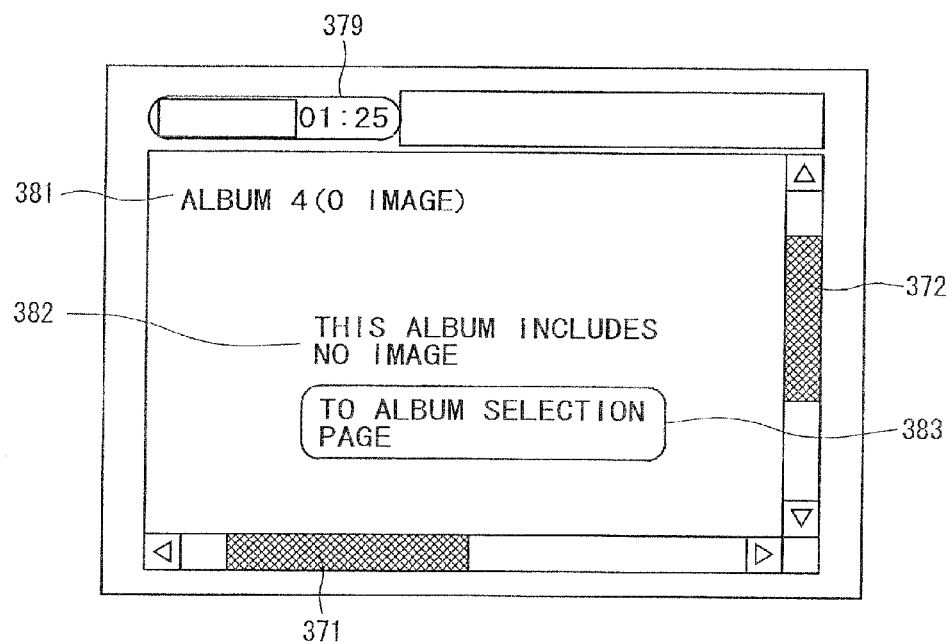
FIG. 31 is a view showing an example of a screen displayed at step S166 of FIG. 22.

In the example of FIG. 31, a time indication 379 is displayed at an upper portion of the screen and an album index 381 "Album 4 (0 image)" of the selected album is displayed below the time indication 379, and a guide indication 382 "This album includes no image" is displayed at a central portion of the screen while a transition button 383 is displayed at the lowest portion. The album index 381 "Album 4 (0 image)" indicates that the album name is "Album 4" and the number of image data included in the Album 4 is 0. If inputting of selecting the transition button 383 is performed by the user, then the processing returns to step S163 so that the processes described above are repeated.

If the CPU 71 discriminates at step S165 that the selected album includes an image, then the processing advances to step S167.

At step S167, the CPU 71 issues a request to the video camera image station 41 through the communication section 82 to transmit data of index images of the selected album.

At step S203, the CPU 151 of the video camera image station 41 reads out data of the index images of the album of the object of the request and image IDs corresponding to the images (information including the file size of each image data and information regarding the format) from the storage section 158 and controls the communication section 159 to supply the information to the video camera 11.

After the data of the index images of the album and the image IDs corresponding to the images are acquired through the communication section 82 at step S168, the CPU 71 controls, at step S169, the LCD unit 78 to display the index images of the album acquired at step S168 and urge the user to select an image to be downloaded.

FIGS. 32 to 36 show examples of the index images displayed on the LCD unit 78.

Figure 32:
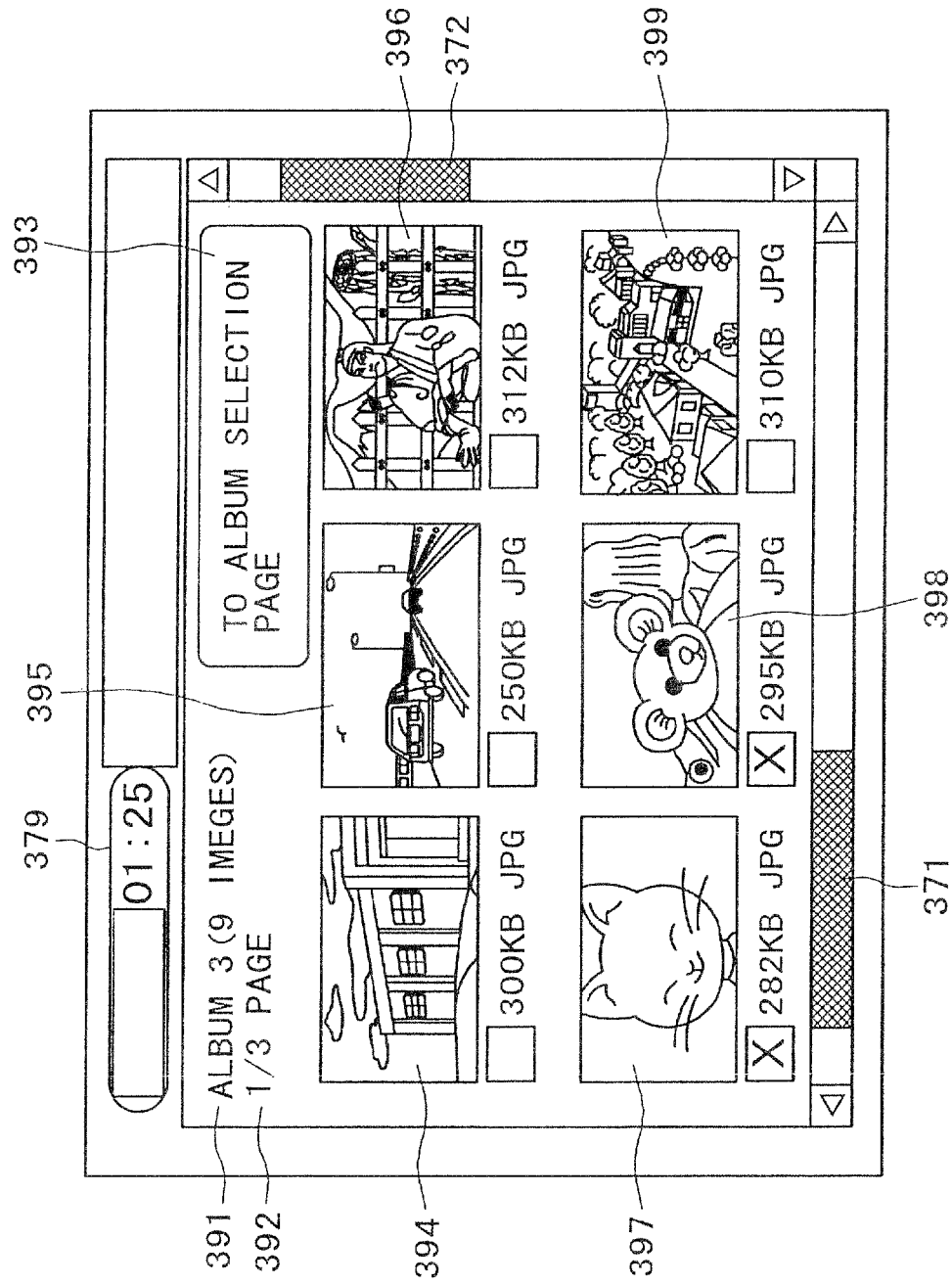
FIG. 32 is a view showing an example of a screen displayed at step S169 of FIG. 23.

Referring to FIG. 32, an album index 391 "Album 3 (9 images)" is displayed at a left upper portion and a displayed page number 392 "⅓ page" is displayed just below the album index 391, and a transition button 393 "To the album selection page" is displayed at a right portion. Further, index images 394 to 399 are displayed on the screen. Below each image, a square check box and information regarding the image (the data amount and the extension of the file) are displayed.

In FIG. 32, the album index 391 indicates the name of the displayed album, that is, of the album selected by the user at step S164. The displayed page number 392 "⅓ page" displayed just below the album index 391 indicates that the Album 3 includes 3 pages and the first page among them is displayed at present.

If the transition button 393 is selected by the user, then the processing returns to step S163, at which the CPU 71 controls the LCD unit 78 to display an image of the album selection page of FIG. 29.

At a central portion of the screen of FIG. 32, six index images (thumbnail images), that is, index images 394 to 399 are displayed, and below each index image, a square check box and the file size and the format of the image data are displayed. For example, in the case of the index image 394, "300 KB JPG" is displayed, and this indicates that the file size (data amount) is 300 KB and the extension of the file is JPG. This extension represents a compression method of the data, and JPG indicates that the compression method is the JPEG.

It is to be noted that, where image data recorded in the video camera image station 41 are a still picture, image data whose size is reduced to reduce the file size are used for the index image.

Where corresponding image data recorded in the video camera image station 41 are moving pictures, image data of an image of a frame selected arbitrarily from among the moving pictures by the user which have a reduced size are produced and used as an index image.

The user can designate an index image of an image to be downloaded (or deleted) from the album by inserting a check into a check box positioned below the index image by a predetermined operation of the inputting section 77. If such designation is performed, then the CPU 71 causes a mark x to be displayed in the check box immediately below the index image as indicated, for example, by the index image 397.

Incidentally, while, for example, the Album 3 includes nine images as seen from "Album 3 (9 images)" displayed for the album index 391, the LCD unit 78 cannot sometimes display nine index images (thumbnail images) at a time. In such an instance, if the user inputs a predetermined operation from the inputting section 77, then the CPU 71 scrolls the displayed screen in a horizontal direction so that the remaining images on the other page are displayed.

Also it is possible to scroll the displayed screen in a vertical direction by inputting a predetermined operation from the inputting section 77. If the displayed screen is scrolled in a vertical direction, then the screen shown in FIG. 33 is displayed on the LCD unit 78.

Figure 33:
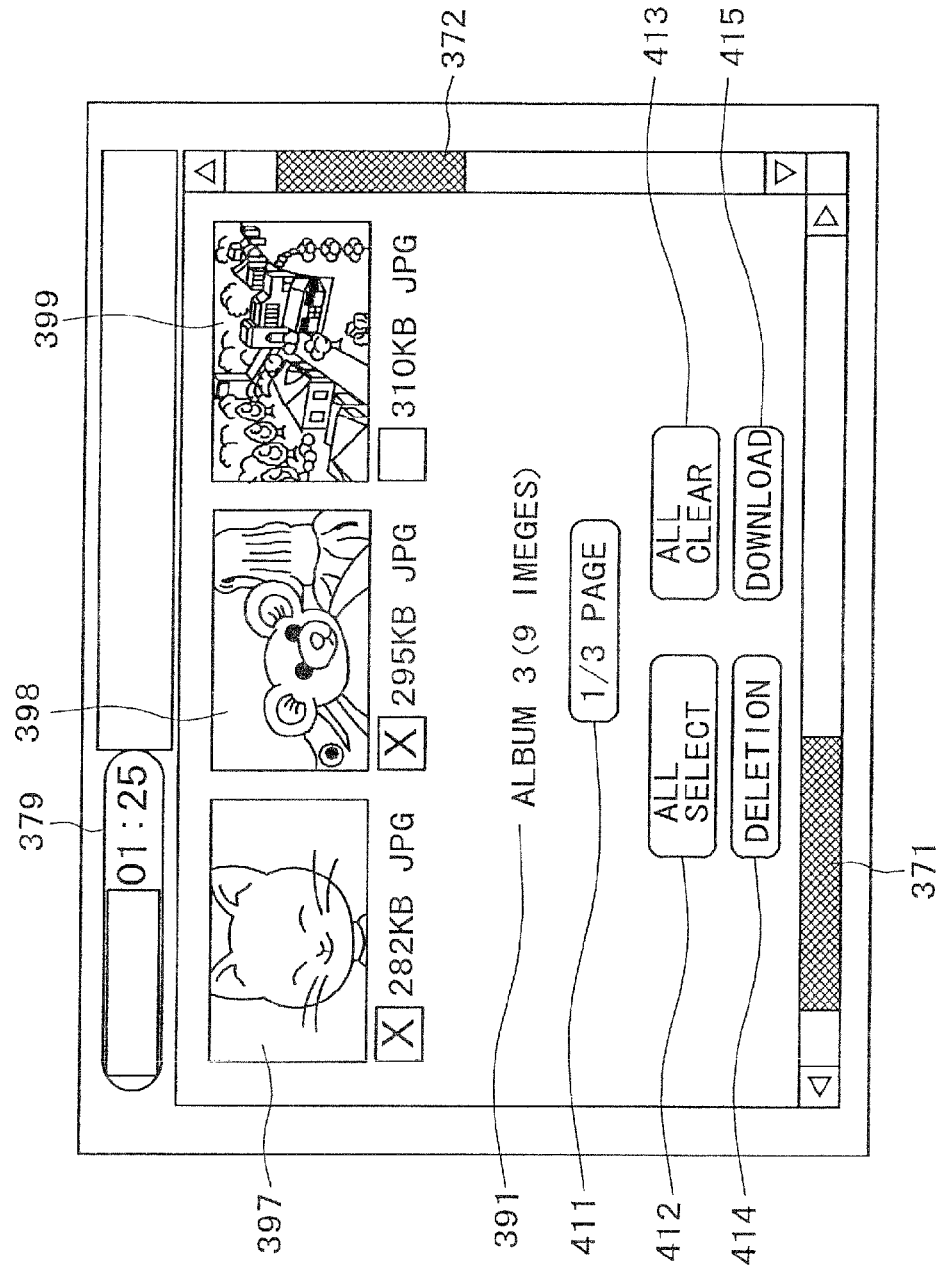
FIG. 33 is a view showing another example of a screen displayed at step S169 of FIG. 23.

Referring to FIG. 33, the three index images 397 to 399 displayed at a lower portion in FIG. 32 are displayed at an upper portion of the screen, and the album index 391 "Album 3 (9 images)" is displayed at a central portion of the screen. Just below the album index 391, a page number 411 is displayed. The album index 391 and the page number 411 individually correspond to those displayed in FIG. 32.

At a lower portion of FIG. 33, an all selection button 412, an all clear button 413, a deletion button 414 and a download button 415 which are displayed buttons are displayed.

If the user inputs a predetermined operation to the inputting section 77 to select the all selection button 412, then the CPU 71 places a check into the check boxes of all of the images in the displayed page. In contrast, if the user selects the all clear button 413, then the CPU 71 erases, if a check is displayed in one or more of the check boxes in the displayed page, all of the displayed checks.

Through the use of the all selection button 412 or the all clear button 413, when the user wants to place a check into the check boxes of all of the images in the displayed page or erase such check or checks, the user can save the time to place (erase) a check for each one image.

If the deletion button 414 is selected by the user, then the CPU 71 starts a process of erasing the image corresponding to each of the checked index images from the album (hereinafter described as processes at steps beginning with step S188).

If the download button 415 is selected by the user, then the CPU 71 starts a process of downloading image data of the image corresponding to each of the checked index images from the video camera image station 41.

While, in the examples of the index image displayed on the LCD unit 78 shown in FIGS. 32 and 33, six index images in the maximum are displayed on the LCD unit 78, also it is possible to display, for example, only one of the displayed index images in an enlarged scale.

For example, when the index image 397 is to be displayed in an enlarged scale, the cursor 421 is first adjusted to the index image 397 by inputting a predetermined operation to the inputting section 77 from the user. FIG. 34 shows the index image 397 to which the cursor 421 is adjusted.

As shown in FIG. 34, the user can perform a predetermined operation of the inputting section 77 to input an operation of adjusting the cursor 421 to a desired one of the index images and determining the index image to display an image selected through the cursor 421 in an enlarged scale.

Figure 35:
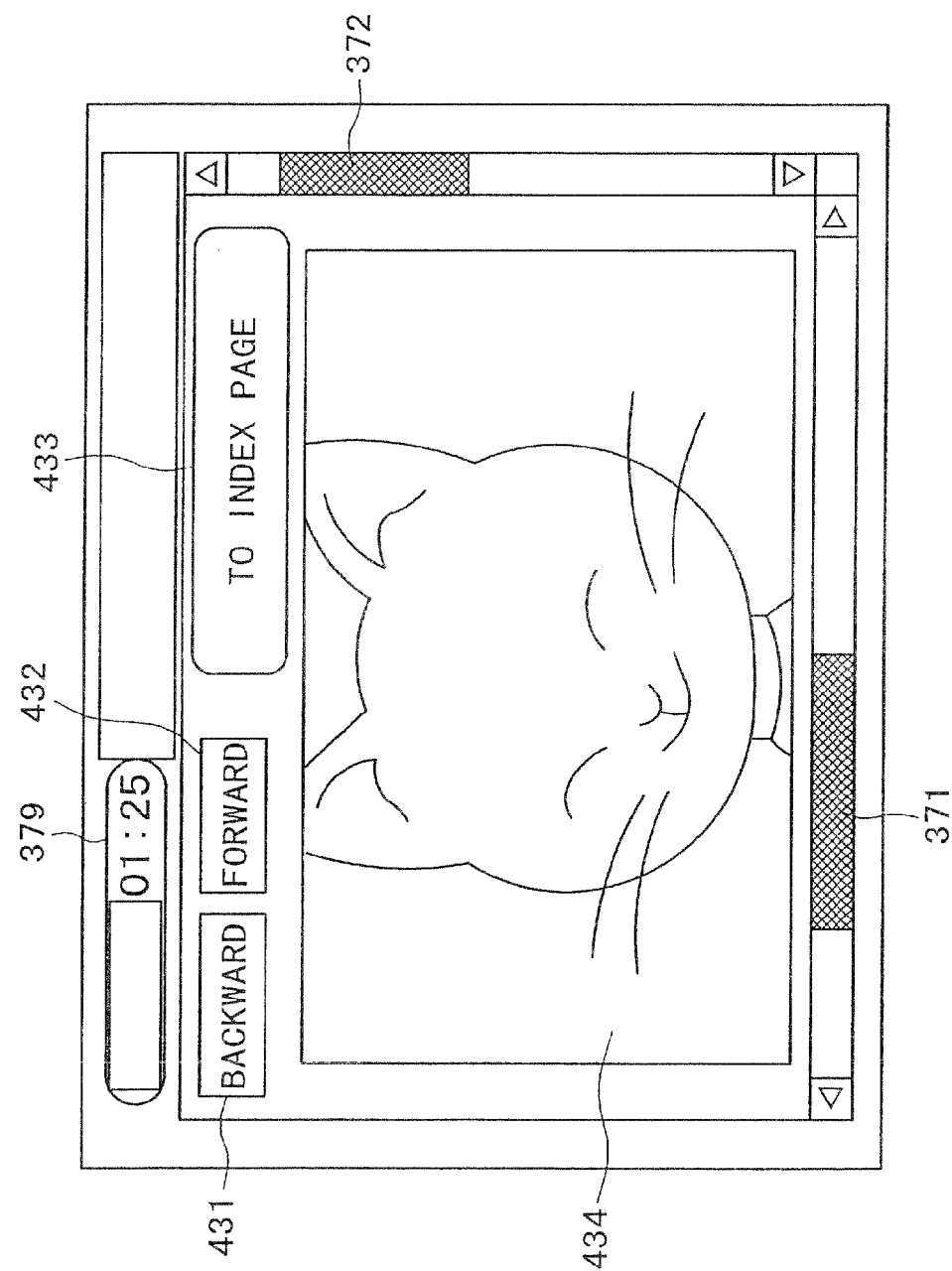
FIG. 35 is a view showing a still further example of a screen displayed at step S169 of FIG. 23.

When the enlarging instruction is issued, the CPU 71 issues a request for transmission of the enlarged image to the video camera image station 41, receives image data transmitted thereto in response to the request and controls the LCD unit 78 to display the image data. FIG. 35 shows an example of the display in this instance.

In FIG. 35, displayed buttons of a transition button 431 "Backward", another transition button 432 "Forward" and a further transition button 433 "To the index page" are displayed at an upper portion of the screen, and an enlarged index image 434 is displayed at a central portion of the screen. Further, a horizontal scroll bar 371 and a vertical scroll bar 372 are displayed on the screen.

Images included in an album have predetermined consecutive numbers assigned thereto in advance, and if an operation of selecting the transition button 431 "Backward" is inputted from the inputting section 77, then the CPU 71 controls so that an index image having a consecutive number preceding by one to that of the index image being currently displayed is displayed in an enlarged scale. On the contrary, if an operation of selecting the transition button 432 "Forward" is inputted, then the CPU 71 controls so that an index image having a consecutive number immediately succeeding to that of the currently displayed index image.

If a predetermined operation of selecting the transition button 433 "To the index page" at a right upper portion of the screen shown in FIG. 35 is inputted, then the CPU 71 controls so that the display is returned to the screen of the list display of index images of FIG. 32.

The user can input a predetermined operation to the inputting section 77 to operate the vertical scroll bar 372 to scroll the screen shown in FIG. 35 downwardly. If this scrolling instruction is issued, then the CPU 71 controls the LCD unit 78 to display such a screen as shown in FIG. 36.

Figure 36:
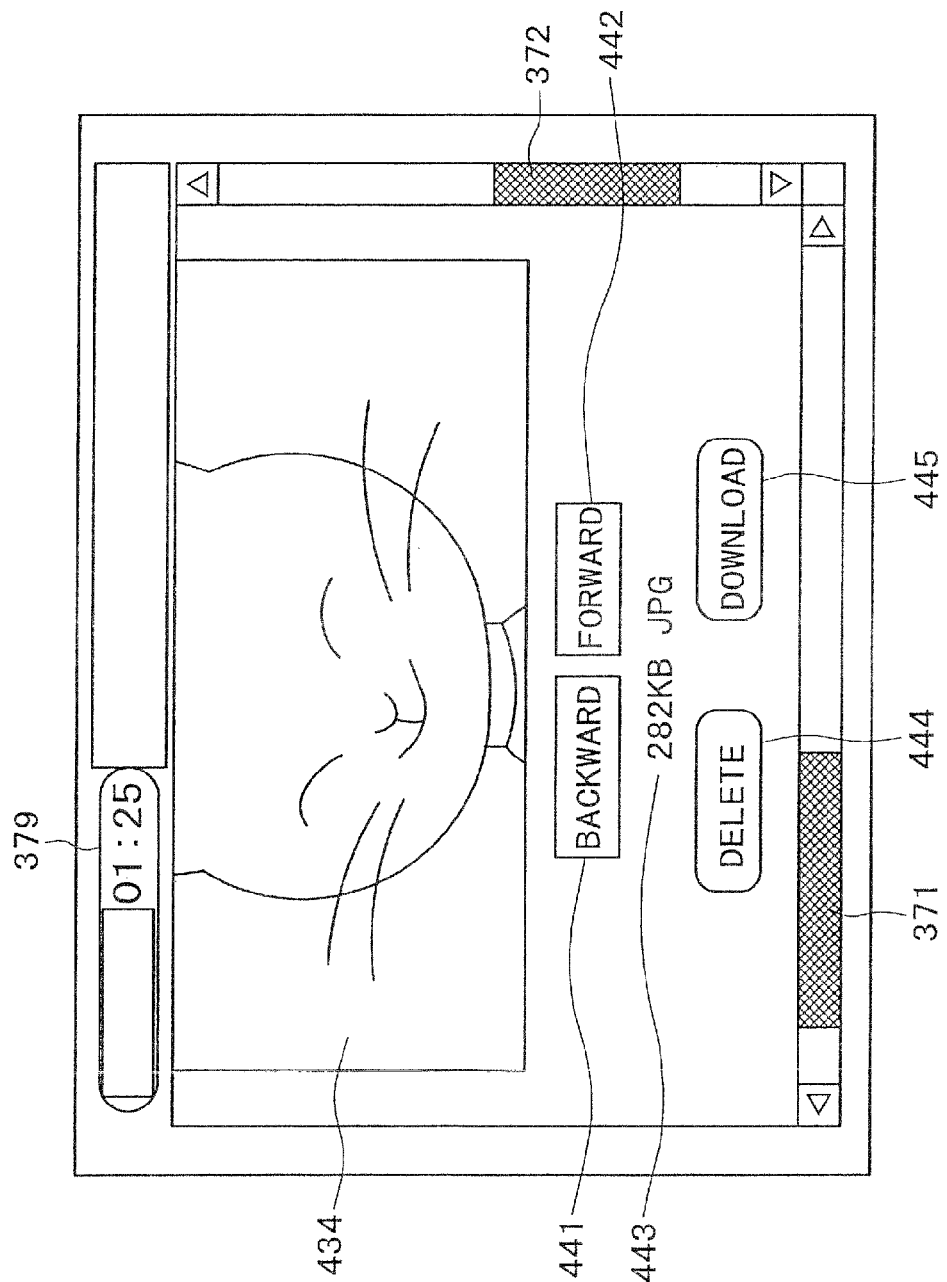
FIG. 36 is a view showing a yet further example of a screen displayed at step S169 of FIG. 23.

In FIG. 36, a portion lower than the index image 434 shown in FIG. 35 is displayed. Below the index image 434, a transition button 441 "Backward" and another transition button 442 "Forward" are displayed. Further below them, image information 443, that is, the file size and an indication of the format "282 KB JPG" of the image, are displayed, and a deletion button 444 and a download button 445 are displayed at a lowermost portion. The transition button 441 "Backward" and the transition button 442 "Forward" have same functions as those of the transition button 431 "Backward" and the transition button 432 "Forward", respectively.

The deletion button 444 and the download button 445 have functions same as those of the corresponding buttons of FIG. 33, that is, the deletion button 414 and the download button 415, respectively. It is to be noted, however, that, while, in the example of FIG. 33, all of images corresponding to the index images having checks applied to the check boxes thereof are downloaded (or deleted) from the album, in the example of FIG. 36, only an image corresponding to the index image displayed in an enlarged scale is downloaded (or deleted).

In order to execute the processes described above, the CPU 71 waits at step S170 that a displayed button is selected by the user. When a displayed button is selected, the processing advances to step S171, at which the CPU 71 discriminates whether or not the displayed button selected by the user is the download button 415 (or download button 445). If the displayed button selected by the user is the download button 415 (or download button 445), then the processing advances to step S172, at which the CPU 71 discriminates whether or not an image to be downloaded is selected. In particular, the CPU 71 discriminates whether or not a check is placed in at least one or more of the check boxes on the display example shown in FIG. 32 or 33.

It is to be noted that, if it is discriminated at step S170 that the image displayed on the LCD unit 78 when a displayed button is selected is the index image displayed in an enlarged scale as shown in FIG. 35 or 36, then the CPU 71 discriminates at step S172 that the index image displayed in an enlarged scale is selected.

Figure 37:
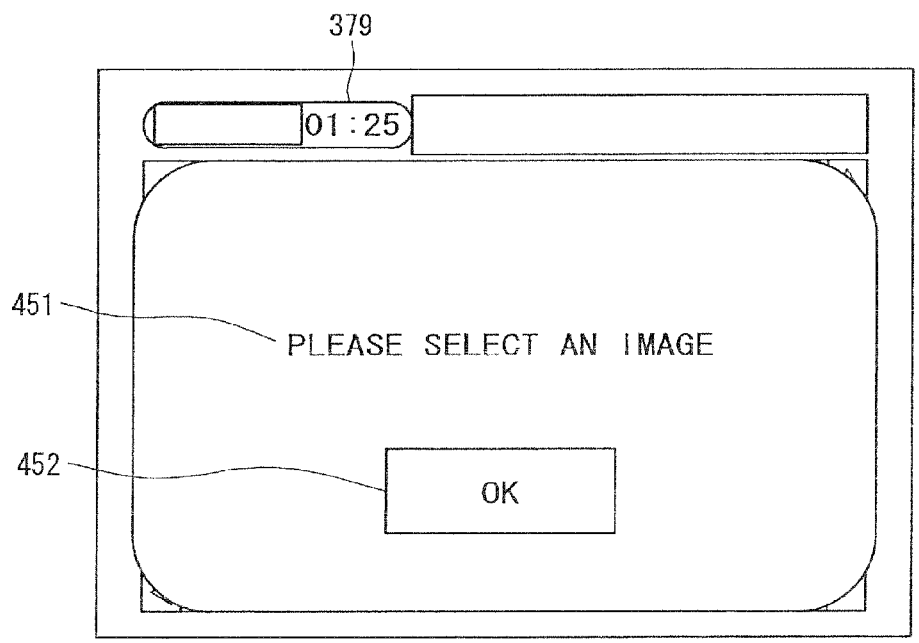
FIG. 37 is a view showing an example of a screen displayed on the LCD at step S173 of FIG. 23 and step S189 of FIG. 25.

If it is discriminated at step S172 that an image to be downloaded is not selected, then the processing advances to step S173, at which the CPU 71 controls the LCD unit 78 to display such an error message as shown in FIG. 37. In the display example of FIG. 37, a guide indication 451 "Please select an image" is displayed at a central portion of the screen. If an input of selecting a OK button 452 below the guide indication 451 is performed by the user, then the processing returns to step S169, at which the CPU 71 controls the LCD unit 78 to display such an index image or images as shown in one of FIGS. 32 to 36 so that the processes described above are repeated.

Figure 38:
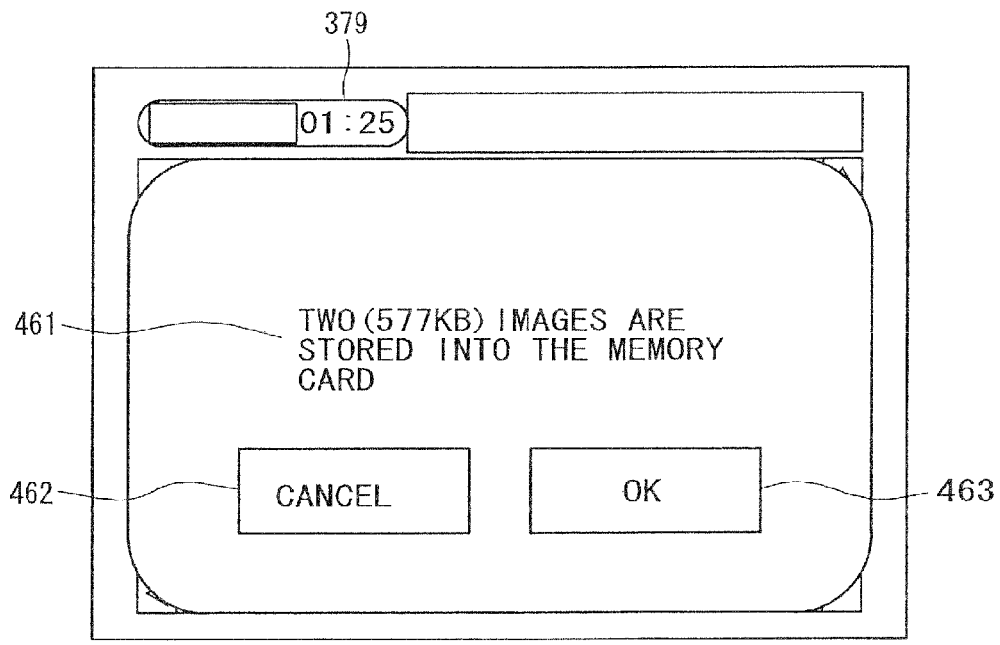
FIG. 38 is a view showing an example of a screen displayed on the LCD at step S174 of FIG. 23.

If the CPU 71 discriminates at step S172 that an image to be downloaded is selected, then the processing advances to step S174, at which the CPU 71 controls the LCD unit 78 to display such an image as shown in FIG. 38 and urges the user to perform selection of whether or not downloading should be performed. As shown in FIG. 38, a guide indication 461 "Two (577 KB) images are stored into the memory card" and the number (two) of images to be downloaded as well as a total file size (577 KB) of the image data to be downloaded are displayed at a central portion of the screen. A cancel button 462 and an OK button 463 are displayed at a lower portion of the screen. The user can perform a predetermined operation to the inputting section 77 to select the cancel button 462 or the OK button 463. It is to be noted that, on the screen of FIG. 38, the cursor is adjusted to the cancel button 462 as default. Then, if it is determined which one of the cancel button 462 and the OK button 463 should be selected, the user can adjust the cursor to the desired displayed button and depress a predetermined button of the inputting section 77 to decide the selection.

At step S175, the CPU 71 waits until an operation of deciding the selection is inputted to the inputting section 77 by the user. If an operation of deciding the selection is inputted by the user, then the processing advances to step S176.

If it is discriminated at step S176 that the selection inputted to the inputting section 77 by the user is not a downloading instruction (if it is discriminated that the cancel button 462 is selected), then the processing returns to step S169 so that the processes described hereinabove are repeated.

If it is discriminated at step S176 that the selection inputted to the inputting section 77 by the user is a downloading instruction (if it is discriminated that the OK button 463 is selected), then the processing advances to step S177, at which the CPU 71 extracts those check boxes for the index images shown in FIG. 32 or 33 in which a check is placed. Then at step S178, the CPU 71 produces Form data of the HTML (Hyper Text Markup Language) which includes the check box information extracted at step S177 and transmits the Form data to the video camera image station 41.

The CPU 151 of the video camera image station 41 is accessed from the video camera 11 at step S204 and discriminates at step S205 whether or not the request from the video camera 11 is downloading of image data. If the CPU 151 discriminates that the request is downloading, then the processing advances to step S206.

The storage section 158 of the video camera image station 41 stores the images in the album and the check boxes in a matching relationship, and at step S206, the CPU 151 of the video camera image station 41 reads out the check box information included in the Form data of the HTML transmitted from the video camera 11 and transmits a download list of the images corresponding to the check boxes to the video camera 11. It is to be noted that the download list is information including the format of the image data, the file size and the URL (Uniform Resource Locator) of the accessing destination for accessing when the image data are to be downloaded.

The communication section 82 of the video camera 11 receives the download list of the selected images from the video camera image station 41 at step S179.

At step S180, the CPU 71 analyzes the image information based on the download list received at step S179. In particular, the CPU 71 picks up the download list corresponding to the image having the lowest consecutive number from among the one or more images selected for downloading and extracts information regarding the file size and the format of the image.

It is to be noted that the information included in the download list is not displayed on the LCD unit 78.

At step S181, the CPU 71 accesses the memory card 85 through the memory card interface 84 and calculates a free storage capacity of the memory card 85.

At step S182, the CPU 71 compares the file size of the image analyzed at step S180 with the free storage capacity of the memory card 85 calculated at step S181 to discriminate whether or not the file size of the image is greater than the free storage capacity thereby to discriminate the selected image can be recorded into the memory card 85. If the file size is greater than the free capacity, that is, if it is discriminated that the selected image cannot be recorded into the memory card 85, then the processing advances to step S183, at which an error process is executed.

Figure 39:
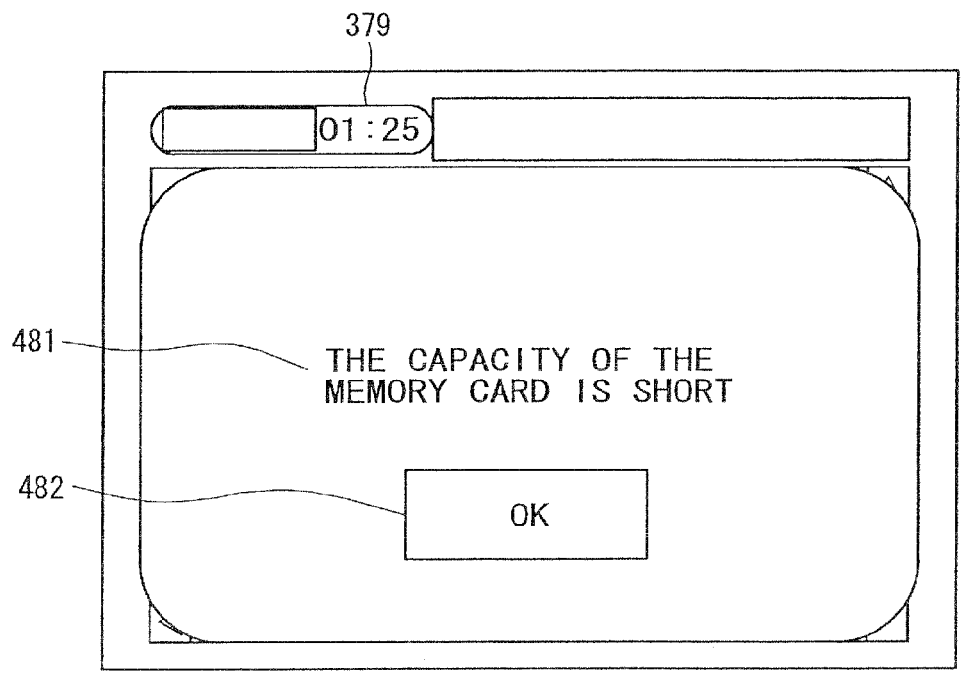
FIG. 39 is a view showing an example of a screen displayed on the LCD at step S183 of FIG. 24.

In particular, the CPU 71 controls the LCD unit 78 to display a screen shown in FIG. 39. In FIG. 39, a guide indication 481 "The capacity of the memory card is short" is displayed at a central portion of the screen. If an input of selecting an OK button 482 at a lower portion is performed by the user, then the processing advances to step S169 so that the processes described above are repeated.

If the CPU 71 discriminates at step S182 that the selected image cannot be recorded into the memory card 85, then the processing advances to step S184.

A list of downloadable formats for an image is stored in advance in the ROM 72, and at step S184, the CPU 71 refers to the list of downloadable formats for an image stored in the ROM 72 in advance to discriminate whether or not the format of the image analyzed at step S180 is a downloadable format. If the selected image data do not have a downloadable format, then the step S185 is skipped and the processing advances to step S186.

If the CPU 71 discriminates at step S184 that the image data are image data of a downloadable format, then the processing advances to step S185, at which the CPU 71 reads out the URL corresponding to the image to be downloaded from the download list acquired at step S179 and accesses the corresponding URL of the video camera image station 41 through the communication section 82.

At this time, the corresponding URL of the video camera image station 41 receives an access from the video camera 11 at step S207 and performs a process of supplying image data to the video camera 11 from the accessed URL at step S208.

The video camera 11 starts downloading of the image data. The image data downloaded by the video camera 11 are recorded into the memory card 85 from the communication section 82 through the memory card interface 84.

Figure 40:
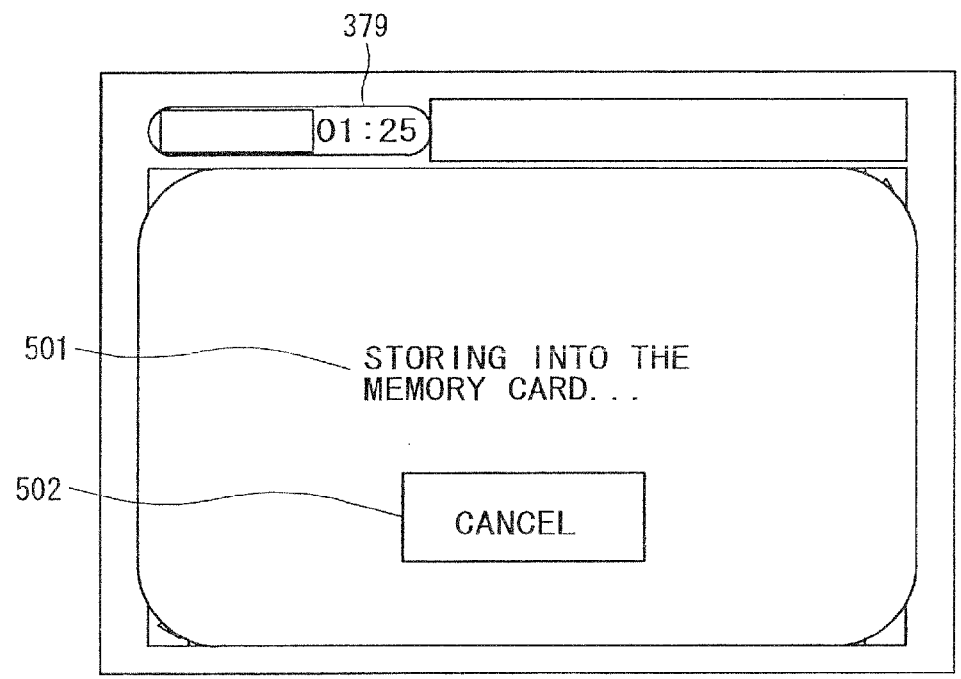
FIG. 40 is a view showing an example of a screen displayed on the LCD at step S185 of FIG. 24.

It is to be noted that, during the downloading, the CPU 71 controls the LCD unit 78 to display such a screen as shown in FIG. 40. In particular, a guide indication 501 "Storing into the memory card . . . " is displayed at a central portion of the screen, and a cancel button 502 is displayed at a lower portion.

When the user wants to interrupt the downloading during the downloading, it can interrupt the downloading by inputting a predetermined operation of selecting the cancel button 502 from the inputting section 77. After the downloading is interrupted, the CPU 71 returns the processing to step S169 so that the processes described hereinabove are repeated.

After the downloading comes to an end, the processing advances to step S186.

At step S186, the CPU 71 discriminates whether or not there remains an image which has not been downloaded as yet in the selected images, and if there remains an image which has not been downloaded as yet, then the processing returns to step S180 so that the processes described above are repeated. However, any image with regard to which it has been discriminated whether or not it should be downloaded when the downloading information of that image which has the lowest consecutive number is picked up from among the one or more images selected by the user is not picked up any more.

In this manner, when the video camera 11 downloads the selected images in order beginning with the lowest consecutive number, also the video camera image station 41 repeats a corresponding process, that is, the processes at steps S207 and S208 to successively supply the image data.

While the video camera 11 successively downloads the selected images in such a manner as described above, if it is discriminated at step S186 that there does not remain an image which has not been downloaded in the selected images (that is, if it is discriminated that all of the selected images have been downloaded), then the CPU 71 controls the LCD unit 78 to display such a screen as shown in FIG. 41. In particular, a guide indication 511 "Stored" is displayed at a central portion of the screen, and an OK button 512 is displayed at a lower portion. If a predetermined operation of the inputting section 77 is performed, then the OK button 512 is selected, and when the OK button 512 is selected, the CPU 71 returns the processing to step S169 so that the processes described above are repeated.

Further, after the supply of all of the images of an object of the request from the video camera 11 to the video camera 11 is completed, the video camera image station 41 ends the series of processes and waits until it is accessed from the video camera 11. If the video camera image station 41 receives an access from the video camera 11, then the video camera image station 41 executes a process corresponding to the request from the video camera 11.

A downloading operation of image data from the video camera image station 41 to the video camera 11 is performed in such a manner as described above.

On the other hand, if the CPU 71 discriminates at step S171 of FIG. 23 that the displayed button selected by the user does not indicate an instruction to start downloading, then the processing advances to step S187.

At step S187, the CPU 71 discriminates whether or not the displayed button selected by the user is the deletion button 414 (or the deletion button 444). If the displayed button selected by the user is the deletion button 414 (or the deletion button 444), then the processing advances to step S188, at which the CPU 71 discriminates whether or not an image to be deleted is selected. In particular, the CPU 71 discriminates whether or not a check is placed in at least one or more of the check boxes in FIG. 32 or 33.

It is to be noted that, if the image displayed on the LCD unit 78 at a point of time when a displayed button is selected at step S170 is an enlarged displayed index image as shown in FIG. 35 or 36, the CPU 71 discriminates at step S185 that the index image displayed in an enlarged scale is selected.

If the CPU 71 discriminates at step S188 that an image to be deleted is not selected, then the processing advances to step S189, at which the LCD unit 78 displays such an error message as shown in FIG. 37. Since description of FIG. 37 is given hereinabove, it is omitted. If an input of selecting the OK button 452 at a lower portion of the screen is performed by the user, then the processing returns to step S169, at which the CPU 71 controls the LCD unit 78 to display such an index image or images as shown in one of FIGS. 32 to 36 so that the processes described above are repeated.

If the CPU 71 discriminates at step S188 that an image to be deleted is selected, then the processing advances to step S190, at which the CPU 71 controls the LCD unit 78 to display a screen shown in FIG. 42.

In FIG. 42, a guide indication 521 "May the two images be deleted from this album?" is displayed at a central portion of the screen, and a cancel button 522 and an OK button 523 are displayed at a portion below the guide indication 521. The user can select the cancel button 522 or the OK button 523 by performing a predetermined operation of the inputting section 77 to adjust the cursor and make a decision. It is to be noted that, on the screen of FIG. 42, the cursor is adjusted to the cancel button 522 as default. Then, the user can adjust the cursor to a desired displayed button and depress a predetermined button of the inputting section 77 to decide the selection.

At step S191, the CPU 71 waits until an operation of deciding the selection is inputted to the inputting section 77 from the user. If an operation to decide the selection is inputted by the user, then the processing advances to step S192.

The CPU 71 discriminates at step S192 whether or not the selection inputted to the inputting section 77 by the user is an instruction to delete an image, and if the selection is not an instruction for deletion (when the cancel button 522 is selected), then the processing returns to step S169 so that the processes described hereinabove are repeated.

If the CPU 71 discriminates at step S192 that the selection inputted to the inputting section 77 by the user is the OK button 523, then the processing advances to step S193, at which the CPU 71 accesses the video camera image station 41 through the communication section 82 and issues a request to delete the image data designated by the user from the album.

The CPU 151 of the video camera image station 41 receives the request from the video camera 11 at step S204 and discriminates at step S205 whether or not the request from the video camera 11 is downloading of the image data. If the CPU 151 discriminates that the request is not downloading (that the request is deletion of the image), then the processing advances to step S209, at which the CPU 151 performs deletion of the image data of an object of the request from the album. Then, the CPU 151 performs a process of producing index images of the latest album wherein the remaining image data after the deletion are re-arranged and incidental information and supplying the index images and the incidental information to the video camera 11 thereby ending the series of processes, and then waits until it is accessed from the video camera 11. If the CPU 151 receives an access from the video camera 11, then the processing returns to step S201 so that the processes described above are repeated.

Figure 43:
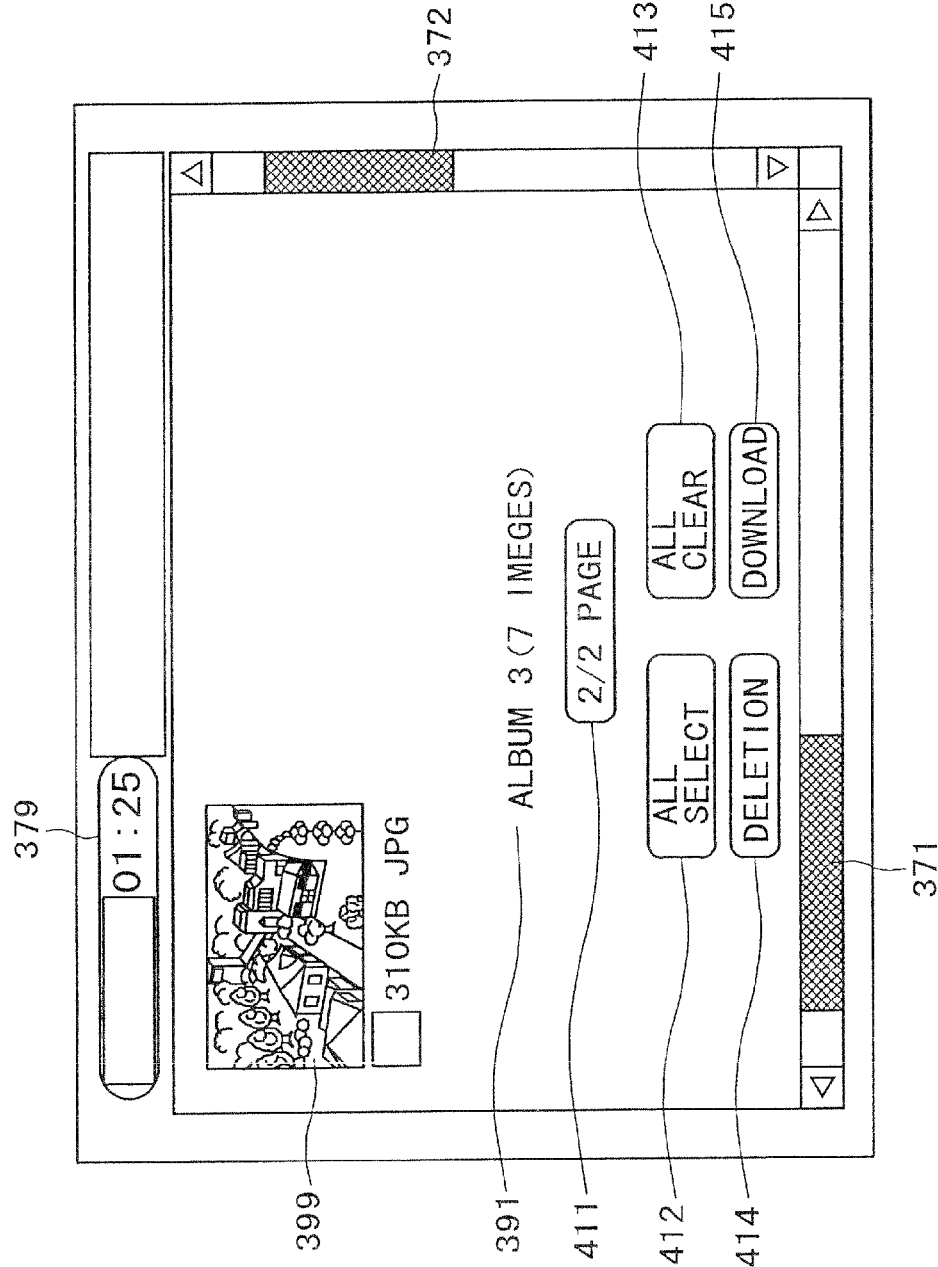
FIG. 43 is a view showing another example of a screen displayed on the LCD at step S169 of FIG. 23.

If the communication section 82 of the video camera 11 receives the index images and the incidental information of the new album from the video camera image station 41 at step S194, then the processing returns to step S169, at which the CPU 71 controls the LCD unit 78 to display the received index images of the album. FIG. 43 shows an example of a screen displayed after the index image 397 and the index image 398 are selected and then deleted on the screen of FIG. 33. In FIG. 43, the index image 397 and the index image 398 displayed in FIG. 33 are erased and the index image 399 is displayed at a position displaced to the left side. The displayed portion other than this is similar to that in FIG. 33.

Deletion of image data from an album is performed in such a manner as described above.

Then, if the CPU 71 discriminates at step S187 that the displayed button selected by the user is not the deletion button 414, then the processing advances to step S195, at which the CPU 71 discriminates whether or not the selected displayed button is the all selection button 412 or the all clear button 413. If the selected displayed button is the all selection button 412 or the all clear button 413, then the processing advances to step S196, at which the CPU 71 places, if the selected button is the all selection button 412, a check into all of the check boxes of the index screens of the screen shown in FIGS. 32 and 33. If the selected button is the all clear button 413, then the CPU 71 erases the checks of all of the check boxes of the index screen of such a screen as shown in FIGS. 32 and 33. Thereafter, the processing returns to step S170 so that the processes described above are repeated.

If the CPU 71 discriminates at step S195 that the selected displayed button is none of the all selection button 412 and the all clear button 413, or in other words, if the selected displayed button is the transition button 393 "To the album selection page", then the processing advances to step S163 so that the processes described above are repeated.

The user can perform reading and editing of an album using the video camera 11 in such a manner as described above.

It is to be noted that, during the series of processes described above, the user can interrupt the processing at any time by inputting a predetermined operation set in advance to the inputting section 77.

Further, the user can make use of a predetermined ID and password to access the video camera image station 41 from a personal computer for universal use connected to a network to read and edit image data.

While the series of processes described above can be executed by hardware, it may otherwise be executed by software. Where the series of processes is executed by software, a program which constructs the software is installed from a network or a recording medium into a computer incorporated in hardware for exclusive use or, for example, a personal computer for universal use which can execute various functions by installing various programs.

The recording medium is formed as a package medium formed from, as shown in FIGS. 3 to 6, a magnetic disk 91 (including a flexible disk), 131, 171 or 211, an optical disk 92 (including a CD-ROM (Compact Disc-Read Only Memory) and a DVD (Digital Versatile Disk)), 132, 172 or 212, or a magneto-optical disk 93 (including an MD (Mini-Disk)), 133, 173 or 213, or a semiconductor memory 94, 134, 174 or 214 which has the program recorded thereon or therein and is distributed in order to provide the program separately from an apparatus body, or else is formed from a ROM 72, 112, 152 or 192 or a hard disk included in a storage section 118, 158 or 198 which is provided to a user in a state wherein it is incorporated in the apparatus body in advance.

It is to be noted that, in the present specification, the steps which describe the program stored in a program storage medium may be but need not necessarily be processed in a time series in the order as described, and include processes which are executed in parallel or individually without being processed in a time series.

Further, in the present specification, the term system represents an entire apparatus which is composed of a plurality of apparatus.

Industrial Applicability

As described above, with the information processing system of the present invention, the first information processing apparatus displays indices to images transmitted from the second information processing apparatus and accepts selection of one or more of the images desired to be downloaded by a user. Further, the first information processing apparatus discriminates whether or not the image data are downloadable based on discrimination information transmitted from the second information processing apparatus, issues a request for transmission of the image data to the second information processing apparatus if it is discriminated that the image data are downloadable, and records the image data transmitted from the second information processing apparatus onto a recording medium. The second information processing apparatus stores the image data transmitted from the first information processing apparatus for each user, accepts an access from the first information processing apparatus, specifies the user of the first information processing apparatus, transmits, in response to the transmission request for indices to the images from the first information processing apparatus, indices to the images to the first information processing apparatus, transmits the discrimination information to the first information processing apparatus in response to the transmission request for discrimination information from the first information processing apparatus, and transmits the image data to the first information processing apparatus in response to the transmission request for the image data from the first information processing apparatus. Consequently, a system wherein one or more image data can be downloaded simply by a simple operation can be implemented.

With the first information processing apparatus and method, recording medium and program of the present invention, a request for transmission of indices to images managed by a different information processing apparatus is issued to the different information processing apparatus through the network, and the indices to the images transmitted from the different information processing apparatus are displayed and selection of one or more of the images desired to be downloaded by a user is accepted. Further, a request for transmission of discrimination information of the image data corresponding to the image or images is issued to the different information processing means, and it is discriminated based on the discrimination information transmitted from the different information processing apparatus whether or not the image data are downloadable. Then, a request for transmission of the image data to the different information processing apparatus is issued if it is discriminated that the image data are downloadable, and the image data transmitted from the different information processing apparatus are recorded onto a recording medium. Consequently, one or more image data can be downloaded simply by a simple operation.

With the second information processing apparatus and method, recording medium and program of the present invention, in response to a transmission request for indices to images from the different information processing apparatus, indices to the images are transmitted to the different information processing apparatus, and then discrimination information is transmitted to the different information processing apparatus in response to a transmission request for discrimination information from the different information processing apparatus. Then, one or more of the image data are transmitted to the different information processing apparatus in response to a transmission request for the image data from the different information processing apparatus. Consequently, one or more image data can be downloaded simply by a simple operation.

The invention claimed is:

1. An information processing apparatus, comprising:
specification circuitry configured to accept an access from a different information processing apparatus to specify a user of said different information processing apparatus;
first transmission circuitry configured to transmit, in response to a transmission request for index information to images stored on a server from said different information processing apparatus, the index information to the images to said different information processing apparatus, wherein the index information representing an album name of an album for image data;
second transmission circuitry configured to transmit for display, to said different information processing apparatus, an index image of image data included in the album based on a transmission request for display of the index image of a selected album from said different information processing apparatus;
third transmission circuitry configured to transmit for display, to said different information processing apparatus, an enlarged index image corresponding to selected index image based on a transmission request for display of an enlarged index image from said different information processing apparatus, and to transmit for display, to said different information processing apparatus, consecutive enlarged index images for display based on forward or backward selection input from said different information process apparatus; and
fourth transmission circuitry configured to transmit, for storage, selected image data corresponding to one of the transmitted consecutive enlarged index images to said different information processing apparatus based on a transmission request for storage from said different information processing apparatus in order to download the selected image data to said different information processing apparatus for storage.

2. The information processing apparatus according to claim 1, further comprising fifth transmission circuitry configured to transmit storage location of the images to said different information processing apparatus in response to a transmission request for the storage location of the images from said different information processing apparatus.

3. The information processing apparatus according to claim 1, wherein the index information also representing a number of images included in the album.

4. The information processing apparatus according to claim 1, further comprising deletion circuitry configured to delete a selected index image based on a deletion request from said different information processing apparatus.

5. An information processing method for an information processing apparatus including circuitry, comprising the steps of:
accepting, by the circuitry, an access from a different information processing apparatus to specify a user of said different information processing apparatus;
transmitting, by the circuitry, in response to a transmission request for index information to images stored on a server from said different information processing apparatus, the index information to the images to said different information processing apparatus, wherein the index information representing an album name of an album for image data;
transmitting to said different information processing apparatus for display, by the circuitry, an index image of image data included in the album based on a transmission request for display of the index image of a selected album from said different information processing apparatus;
transmitting to said different information processing apparatus for display, by the circuitry, an enlarged index image corresponding to selected index image based on a transmission request for display of an enlarged index image from said different information processing apparatus, and transmitting to said different information processing apparatus for display consecutive enlarged index images based on forward or backward selection input from said different information processing apparatus; and
transmitting selected image data, corresponding to the transmitted consecutive enlarged index images, to said different information processing apparatus for storage based on a transmission request for storage from said different information processing apparatus in order to download the selected image data to said different information processing apparatus for storage.

6. The information processing method according to claim 5, further comprising a step of transmitting storage location of the images to said different information processing apparatus in response to a transmission request for the storage location of the images from said different information processing apparatus.

7. The information processing method according to claim 5, wherein the index information also representing a number of images included in the album.

8. The information processing method according to claim 5, further comprising a deletion step deleting a selected index image based on a deletion request from said different information processing apparatus.

9. The information processing method according to claim 5, wherein said index image is displayed on said different information processing apparatus.

10. A non-transitory computer recording medium on which a computer-readable program is recorded for execution by a computer for an information processing apparatus including circuitry, characterized in that the program comprises:
accepting, by the circuitry, an access from a different information processing apparatus to specify a user of said different information processing apparatus;
transmitting by the circuitry, in response to a transmission request for index information to images stored on a server from said different information processing apparatus, the index information to the images to said different information processing apparatus, wherein the index information representing an album name of an album for image data;
transmitting for display to said different information processing apparatus, by the circuitry, an index image of image data included in the album based on a transmission request for display of the index image of a selected album from said different information processing apparatus;
transmitting to said different information processing apparatus for display, by the circuitry, an enlarged index image corresponding to selected index image based on a transmission request for display of an enlarged index image from said different information processing apparatus, and transmitting to said different information processing apparatus for display consecutive enlarged index images based on forward or backward selection input from said different information processing apparatus; and transmitting selected image data, corresponding to one of the transmitted consecutive enlarged index images, to said different information processing apparatus for storage based on a transmission request for storage from said different information processing apparatus in order to download a selected image to said different information processing apparatus for storage.

11. The non-transitory computer recording medium according to claim 10, further comprising a step of transmitting storage location of the images to said different information processing apparatus in response to a transmission request for the storage location of the images from said different information processing apparatus.

12. The non-transitory computer recording medium according to claim 10, wherein the index information also representing a number of images included in the album.

13. The non-transitory computer recording medium according to claim 10, further comprising a deletion step of deleting a selected index image based on a deletion request from said different information processing apparatus.

14. The non-transitory computer recording medium according to claim 10, wherein said index image is displayed on said different information processing apparatus.

15. An information processing system, comprising:
circuitry configured to:
   accept an access from an information processing apparatus to specify a user of said information processing apparatus;
   transmit, in response to a transmission request for index information to images stored on a server from said information processing apparatus, the index information to the images to said information processing apparatus, wherein the index information representing an album name of an album for image data;
   transmit to said information processing apparatus, for display, an index image of image data included in the album based on a transmission request for display of the index image of a selected album from said information processing apparatus;
   transmit to said information processing apparatus, for display, an enlarged index image corresponding to selected index image based on a transmission request for display of an enlarged index image from said information processing apparatus, and transmit to said information processing apparatus for display consecutive enlarged index images based on forward or backward selection input from said information processing apparatus; and
   transmit selected image data, corresponding to one of the transmitted consecutive enlarged index images, to said information processing apparatus for storage based on a transmission request for storage from said information processing apparatus in order to download the selected image data to said information processing apparatus for storage.

16. The information processing system according to claim 15, the circuitry further configured to transmit storage location of the images to said information processing apparatus in response to a transmission request for the storage location of the images from said information processing apparatus.

17. The information processing system according to claim 16, wherein the index information also representing a number of images included in the album.

18. The information processing system according to claim 15, the circuitry further configured to delete a selected index image based on a deletion request from said information processing apparatus.

19. An information processing apparatus, comprising:
circuitry configured to:
   accept an access from a different information processing apparatus based on a password, wherein the information processing apparatus is connected to the different information processing apparatus via a network;
   transmit, based on a transmission request for index information for images stored in a recording medium from the different information processing apparatus, the index information to the different information processing apparatus, wherein the index information represents information of a plurality of an image group;
   transmit to the different information processing apparatus, for display, an index image of image data included in the image group based on a transmission request for display of the index image of a selected image group from said information processing apparatus;
   transmit to the different information processing apparatus, for display, an enlarged index image corresponding to selected index image based on a transmission request for display of an enlarged index image from the different information processing apparatus, and transmit to the different information processing apparatus for display consecutive enlarged index images based on forward or backward selection input from said information processing apparatus; and
   transmit selected image data, corresponding to one of the transmitted consecutive enlarged index images, to the different information processing apparatus for storage based on a transmission request for storage from the different information processing apparatus in order to download the selected image data to the different information processing apparatus for storage.

20. The information processing apparatus according to claim 19, further comprising a step of transmitting storage location of the images to said different information processing apparatus in response to a transmission request for the storage location of the images from said different information processing apparatus.

21. The information processing apparatus according to claim 19, wherein the index information also representing a number of images included in the album.

22. The information processing apparatus according to claim 19, further comprising a deletion step of deleting a selected index image based on a deletion request from said different information processing apparatus.

23. An information processing method for an information processing apparatus including circuitry, comprising the steps of:
   accepting, by the circuitry, an access from a different information processing apparatus based on a password, wherein the information processing apparatus is connected to the different information processing apparatus via a network;
   transmitting by the circuitry, based on a transmission request for index information for images stored in a recording medium from the different information processing apparatus, the index information to the different information processing apparatus, wherein the index information represents information of a plurality of an image group;
   transmitting to the different information processing apparatus, for display, an index image of image data included in the image group based on a transmission request for display of the index image of a selected image group from said information processing apparatus;

transmitting to the different information processing apparatus, for display, an enlarged index image corresponding to selected index image based on a transmission request for display of an enlarged index image from the different information processing apparatus, and transmitting to the different information processing apparatus for display consecutive enlarged index images based on forward or backward selection input from said information processing apparatus; and transmitting selected image data, corresponding to one of the transmitted consecutive enlarged index images, to the different information processing apparatus for storage based on a transmission request for storage from the different information processing apparatus in order to download the selected image data to the different information processing apparatus for storage.

* * * * *

UNITED STATES PATENT AND TRADEMARK OFFICE
CERTIFICATE OF CORRECTION

PATENT NO. : 9,237,268 B2  
APPLICATION NO. : 13/961240  
DATED : January 12, 2016  
INVENTOR(S) : Masayuki Kuwata et al.

Page 1 of 1

It is certified that error appears in the above-identified patent and that said Letters Patent is hereby corrected as shown below:

In the CLAIMS:

COLUMN 36, LINE 18 (Claim 19), after the word "said", please insert --different--

COLUMN 36, LINE 27 (Claim 19), after the word "said", please insert --different--

COLUMN 36, LINE 37 (Claim 20), please delete "further comprising a step of transmitting" and replace it with --the circuitry further configured to transmit--

COLUMN 36, LINE 46 (Claim 22), please delete "a deletion step of deleting" and replace it with --the circuitry further configured to delete--

COLUMN 37, LINE 2 (Claim 23), after the words "from said", please insert --different--

COLUMN 37, LINE 10 (Claim 23), after the words "from said", please insert --different--

Signed and Sealed this  
Tenth Day of May, 2016

Michelle K. Lee  
*Director of the United States Patent and Trademark Office*